(12) United States Patent
Taniguchi et al.

(10) Patent No.: US 6,779,620 B2
(45) Date of Patent: Aug. 24, 2004

(54) ARRANGEMENT STRUCTURE OF THE ENGINE AUXILIARY EQUIPMENT IN VEHICLES SUCH AS A MOTORCYCLE

(75) Inventors: Masayuki Taniguchi, Saitama (JP); Kenta Nakamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 14 days.

(21) Appl. No.: 10/237,602

(22) Filed: Sep. 10, 2002

(65) Prior Publication Data

US 2003/0079926 A1 May 1, 2003

(30) Foreign Application Priority Data

Sep. 17, 2001 (JP) .......................................... 2001-282437

(51) Int. Cl.⁷ .......................... B60K 11/04; B62D 61/02

(52) U.S. Cl. ..................................... 180/219; 180/68.5

(58) Field of Search ................................ 180/219, 220, 180/228, 68.5; 296/78.1

(56) References Cited

U.S. PATENT DOCUMENTS

| | | | | |
|---|---|---|---|---|
| 4,445,585 A | * | 5/1984 | Imani | 180/68.5 |
| 4,452,330 A | * | 6/1984 | Matsuyama | 180/219 |
| 4,469,190 A | * | 9/1984 | Yamaguchi | 180/219 |
| 4,700,795 A | * | 10/1987 | Yashima et al. | 180/219 |
| 4,830,134 A | * | 5/1989 | Hashimoto | 180/219 |
| 4,964,483 A | * | 10/1990 | Yokoyama et al. | 180/219 |
| 5,211,255 A | * | 5/1993 | Fukuda | 180/219 |
| 6,234,265 B1 | * | 5/2001 | Wollmer | 180/219 |

* cited by examiner

*Primary Examiner*—Lesley D. Morris
*Assistant Examiner*—Matt Luby
(74) *Attorney, Agent, or Firm*—Birch, Stewart, Kolasch & Birch, LLP

(57) ABSTRACT

In a motorcycle in which a main seat, a fuel tank, and an engine are supported by a vehicle body frame, a center cover is disposed so as to be laid across a pair of left and right pipe support members. A fuel pump and an ignition coil are supported by and positioned on the center cover. The aforementioned arrangement provides support for auxiliary equipment for the engine without the necessity of using a special supporting member and without impairing the layout of members, such as a battery case in the vicinity of the engine.

17 Claims, 41 Drawing Sheets

ARRANGEMENT STRUCTURE OF THE ENGINE AUXILIARY EQUIPMENT IN VEHICLES SUCH AS A MOTORCYCLE

BACKGROUND OF THE INVENTION

CROSS-REFERENCES TO RELATED APPLICATIONS

This nonprovisional application claims priority under 35 U.S.C. §119(a) on Patent Application No. 2001-282437 filed in Japan on Sep. 17, 2001, the entirety of which is herein incorporated by reference.

1. Field of the Invention

The present invention relates to a structural arrangement of engine auxiliary equipment in vehicles, and more particularly to arrangements for a vehicle such as a motorcycle.

2. Description of the Background Art

In general, a motorcycle of the background art is provided with an engine mounted as a drive source. Various pieces of auxiliary equipment for the engine such as a fuel pump, an ignition coil and the like are disposed in the vicinity of the engine. In the background art, engine auxiliary equipment is supported via a stay extending from the vehicle body frame or is mounted by the use of a wall portion of a box member, e.g., such as a battery case or the like.

In the aforementioned structural arrangement, when supporting the auxiliary equipment on the vehicle body frame via the stay, a special stay must be provided in the structure. Accordingly, the number of components, the corresponding costs and the weight all increase. When the equipment is mounted by the use of the wall portion of the box member such as the battery case or the like, space for the battery case itself and for mounting the engine auxiliary equipment in the vicinity thereof must be provided for in the vehicle design. Accordingly, numerous restrictions are imposed in the layout of a box member such as the battery case or the like.

SUMMARY OF THE INVENTION

The present invention overcomes the shortcomings associated with the background art and achieves other advantages not realized by the background art.

An object of the present invention is to provide a structural arrangement of engine auxiliary equipment in vehicles such as a motorcycle in which a special supporting member is not necessary.

An object of the present invention is to provide a structural arrangement in which the engine auxiliary equipment can be supported without impairing layout and design flexibility, e.g., the positioning of members such as a battery case or the like in the vicinity of the engine.

One or more of these and other objects are accomplished by a vehicle comprising a pair of left and right pipe members; a main seat being disposed above the pair of left and right pipe members; a fuel tank being disposed forward of the main seat; an engine being disposed below the fuel tank; a vehicle body frame, the vehicle body frame including the pair of right and left pipe members; and a center cover being disposed across the pair of left and right members and forming a support structure for supporting at least one piece of auxiliary equipment for the engine.

One or more of these and other objects are further accomplished by a vehicle body frame comprising a cross pipe having an engine hanger; a pair of left and right pipe members; a main seat being disposed above the pair of left and right pipe members; a fuel tank being disposed forward of the main seat; a center cover being disposed across the pair of left and right members and forming a support structure for supporting at least one piece of auxiliary equipment for an engine; and a bracket being mounted on the cross pipe of the vehicle frame, the bracket being attached with the engine hanger for supporting the engine and crossing over the pair of left and right pipe members of the vehicle body frame, wherein the center cover is supported and mounted on the left and right center pipes via the engine hanger.

The center cover laid across the pair of left and right pipe members of the vehicle body frame supports the engine auxiliary equipment, and a special stay for mounting the engine auxiliary equipment is not necessary. Consequently, the number of components may be reduced by a number corresponding to the number of members typically required for mounting the special stay. Even for the layout of other members such as a battery case or the like, it is not necessary to assemble the engine auxiliary equipment on the battery case. Therefore, since the space for arranging the battery case itself is sufficient, the freedom of design layout for the battery case or the like increases.

In addition, it is not necessary to provide the vehicle body frame with a specific portion on which the engine auxiliary equipment is to be mounted, thereby increasing the freedom of design of the vehicle body frame. Since the left and right pipe members of the vehicle body frame are connected by the center cover, the strength of the vehicle body frame can be enhanced by the center cover which is an exterior member. Since the fuel pump or the ignition coil can be disposed in the vicinity of the engine, the length of a fuel pipe and electrical wiring extended therefrom can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
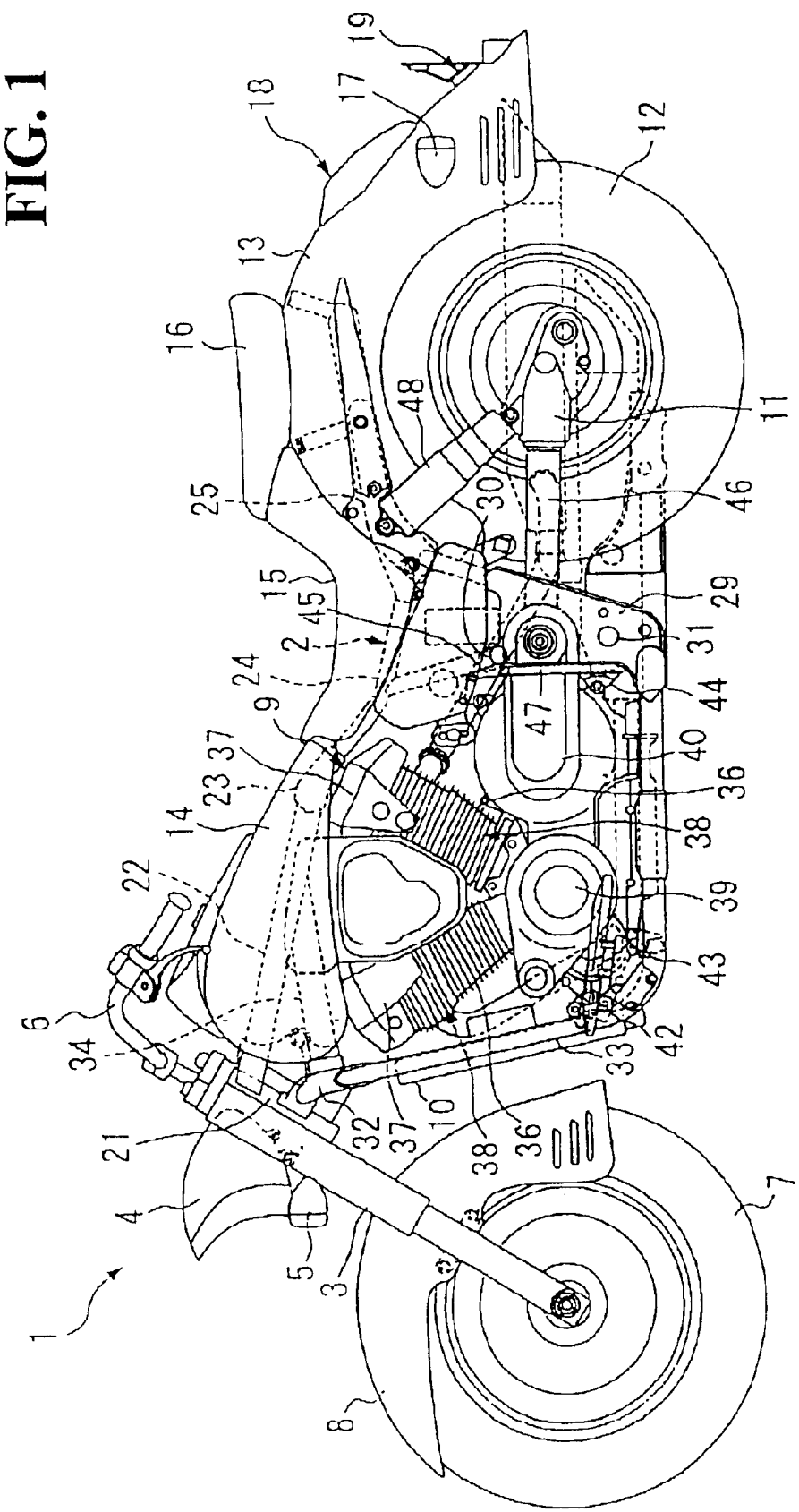
FIG. 1 is a side view showing a motorcycle according to one embodiment of the present invention.

The present invention will hereinafter be described with reference to the accompanying drawings. In the following description, the terms referring to relative direction such as front, rear, left, and right represent directions with respect to the vehicle body. FIG. 1 is a side view of a motorcycle according to an embodiment of the present invention. The motorcycle 1 is a so-called American type motorcycle, including a vehicle body frame 2, a pair of left and right front forks 3 rotatably supported at the front end of the vehicle body frame 2, a headlight 4 provided on the upper part of the front forks 3, a pair of left and right front blinkers 5 provided on the front forks 3 at the position lower than the headlight 4, and a steering handle 6 mounted at the upper end of the front forks 3 and disposed on the upper front of the vehicle body.

The motorcycle 1 includes a front wheel 7 rotatably supported by the front forks 3, a front fender 8 supported by the front forks 3 for covering the upper side of the front wheel 7, an engine 9 supported by the vehicle body frame 2, a radiator 10 disposed forwardly of the engine 9, and rear swing arm units 11 mounted on the rear portion of the vehicle body so as to be pivotable about the lateral axis by the vehicle body frame 2. A rear wheel 12 is rotatably suspended at the rear ends of the rear swing arm units 11 and is rotated by a driving force of the engine 9. A rear fender 13 is supported by the vehicle body frame 2 for covering the upper side of the rear wheel 12.

The motorcycle 1 further includes a teardrop shaped fuel tank 14 disposed on the upper part of the vehicle body frame 2, a main seat 15 disposed rearwardly of the fuel tank 14 for the driver to sit on, a pillion seat 16 provided rearwardly of the main seat 15 on the rear fender 13 for a fellow passenger to sit on, a pair of left and right rear blinkers 17 provided on the rear portion of the rear fender 13, a brake lamp 18 provided at the center of the rear portion of the rear fender 13, and a license plate mounting portion 19 provided at the rear end of the rear fender 13.

Figure 2:
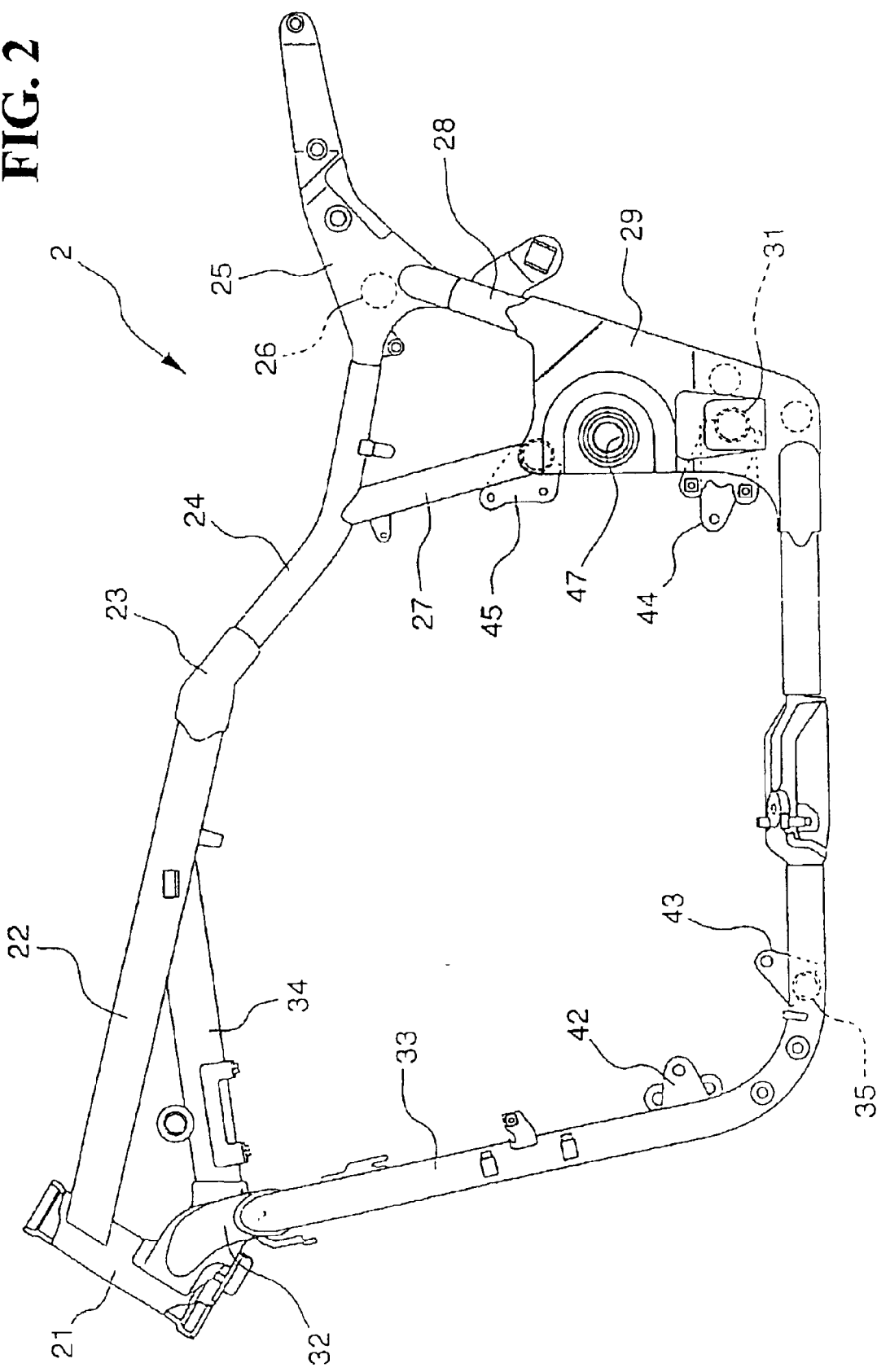
FIG. 2 is a side view showing a vehicle body frame of the motorcycle according to one embodiment of the present invention.
Figure 3:
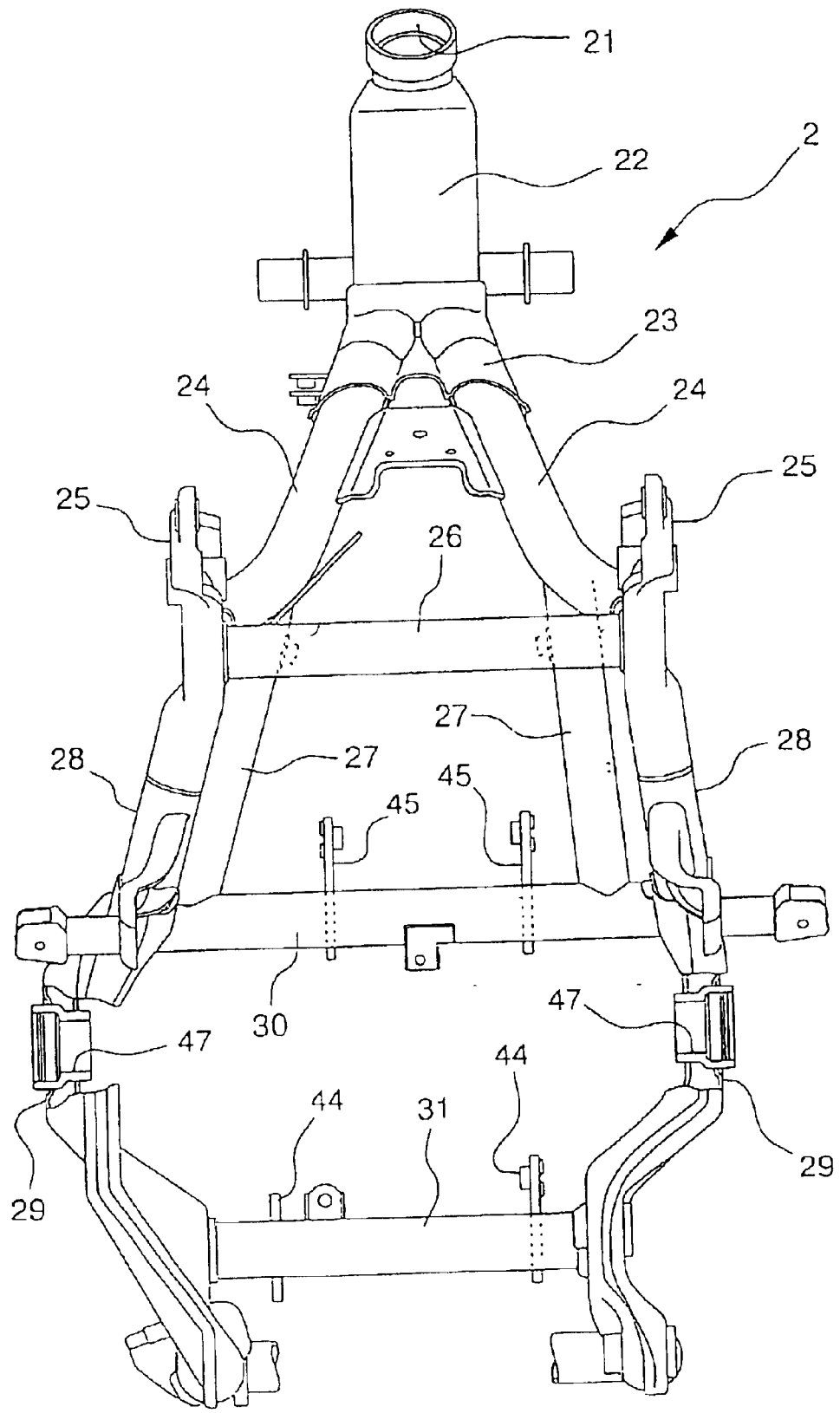
FIG. 3 is a rear view showing the vehicle body frame of the motorcycle according to one embodiment of the present invention.

The vehicle frame 2 includes, as shown in FIG. 2 and FIG. 3, a head pipe 21 at the front end, a main pipe 22 extending rearwardly from the upper portion of the head pipe 21, an upper pipe joint 23 welded at the rear portion of the main pipe 22, and a pair of left and right center upper pipes 24 bifurcated from the upper pipe joint 23 to the left and right and extending rearwardly therefrom. A pair of left and right rear brackets 25 being connected to the respective center upper pipes 24, a rear cross pipe 26 for connecting the left and right rear brackets 25 with each other, center pipes 27 extending downward from the respective center upper pipes 24, rear pipes 28 extending downward from the respective rear brackets 25, and a pair of left and right pivot plates 29 to be connected to the lower side of the center pipes 27 and the rear pipes 28 are also provided.

A cross pipe 30 for connecting the left and right pivot plates 29 at the upper portions thereof with each other and a cross pipe 31 for connecting the left and right pivot plates 29 at the lower portions thereof with each other are provided. A gusset 32 welded at the lower portion of the head pipe 21, a pair of left and right down pipes 33 bifurcated to the left and right from the gusset 32 and extending somewhat obliquely downward toward the rear and then extending rearward in the substantially horizontal direction from the lower portion thereof to be connected to the pivot plates 29, a sub pipe 34 for connecting the gusset 32 and the main pipe 22 at the lower side of the main pipe 22, and a front cross pipe 35 for connecting the left and right down pipes 33 with each other are also provided as shown.

The engine 9 is a V-type, two-cylinder, four-cycle engine having a pair of front and rear cylinder blocks 38 provided with a cylinder head portion 37 and a cylinder portion 36. The engine also includes 9 a crankcase 39 provided below these cylinder blocks 38 so as to be continued therefrom, and a transmission 40 is connected to the rear side of the crankcase 39 of the engine 9. The engine 9 and the transmission 40 are supported on the vehicle body frame 2 in such a manner that the front portion of the crankcase 39 is connected to the down pipes 33 via a bracket 42, the midsection of the crankcase 39 is connected to the front cross pipe 35 via a bracket 43, the lower portion on the rear side of the transmission 40 is connected to the cross pipe 31 via a bracket 44, and the upper portion on the rear side of the transmission 40 is connected to the cross pipe 30 via a bracket 45.

The rear swing arm units 11 include a pair of left and right fork portions 46 extending rearward from the base portions of the front ends thereof, and are capable of a pivotal motion in the vertical direction about pivots 47 by being supported at the base portion by the pivots 47 provided on the left and right pivot plates 29. A pair of left and right rear shock absorbers 48 are interposed between the respective extremities of the rear swing arm units 11 and the respective rear brackets 25, so that vibration applied on the rear wheel 12 from the road surface is alleviated and absorbed.

Figure 4:
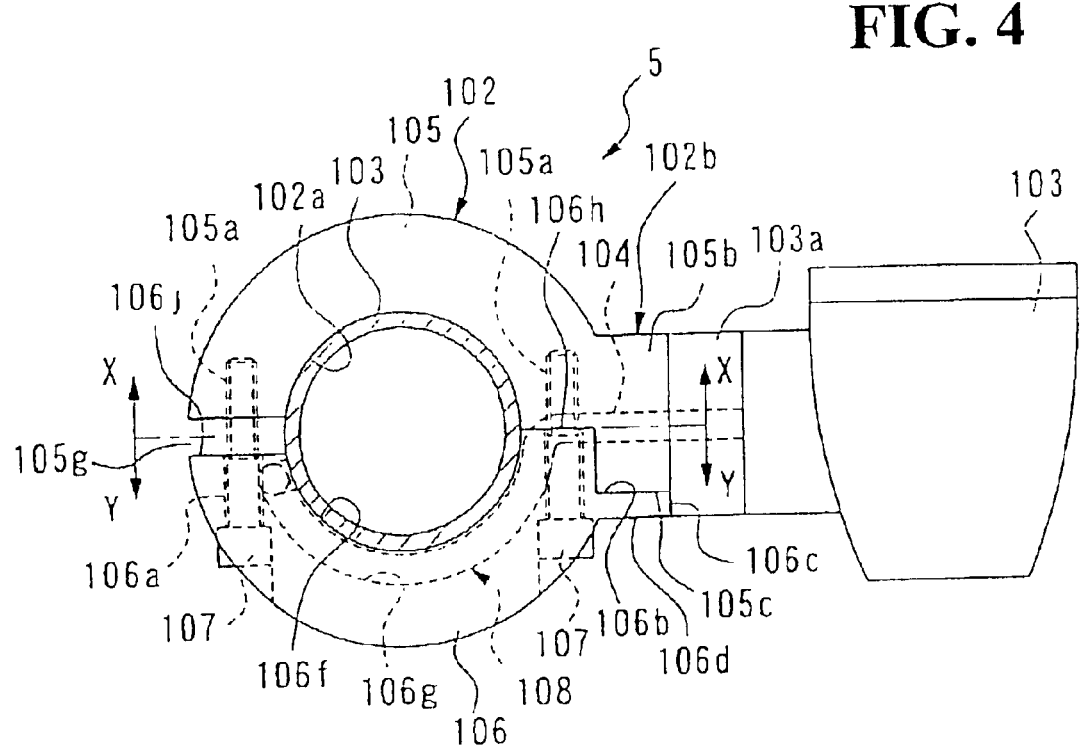
FIG. 4 is a plan view of the blinker device of the motorcycle according to one embodiment of the present invention.
Figure 5:
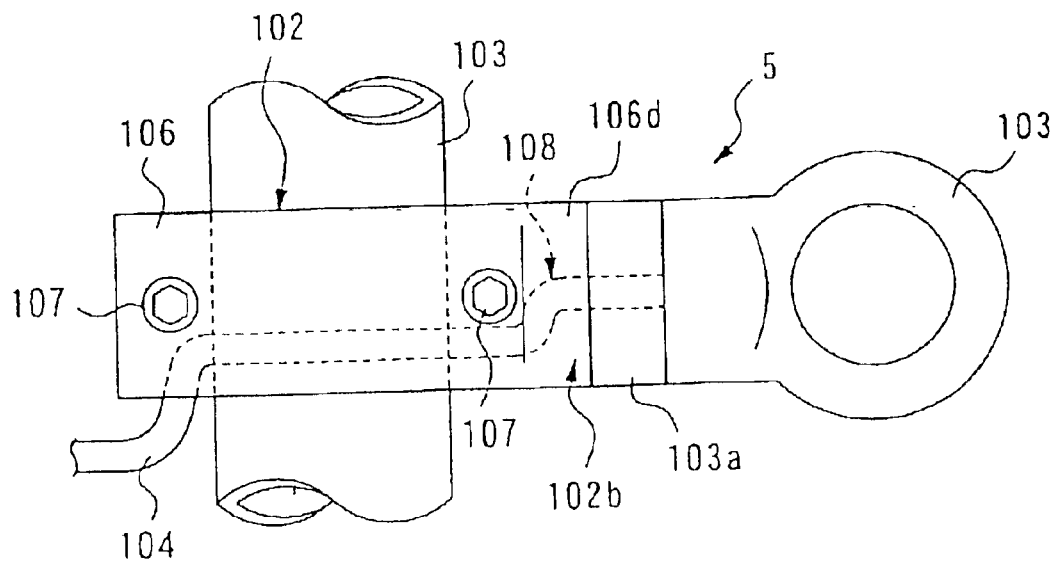
FIG. 5 is a side view of the blinker device of the motorcycle according to one embodiment of the present invention.

The front blinker (blinker device) 5 includes, as shown in FIG. 4 and FIG. 5, a blinker holder 102 attached on the front fork 3 of the motorcycle 1, a blinker 103 supported by the outside portion of the blinker holder 102 via a blinker supporting base portion 103a, and a blinker cord 104 extended from the blinker 103 and drawn out through the interior of the blinker holder 102. The blinker holder 102 includes a pair of holder members 105, 106 formed by dividing a cylindrical body formed with a shaft hole 102a having an inner diameter substantially the same as the diameter of the outer periphery of the front fork 3 and with a column shaped projection 102b on one side (outside) into substantially halves along a plane laid in the direction of the axis of the cylindrical body, and is detachably mounted on the front fork 3 by disposing the respective holder members 105, 106 so as to interpose the front fork 3 therebetween from the front and back, and screwing and tightening bolts 107, 107 into the screw holes 105a, 105a formed on both sides of one of the (the front) holder member 105 through the bolt holes 106a, 106a formed on both sides of the holder member 106 on the other (the rear) holder member 106.

The projection 105b of the outer side portion of the one holder member 105 is substantially column shaped portion having a notched plane 105c on the side of the other holder member 106, so that the blinker 103 is supported by the holder member 105 by connecting the projection 105b detachably to the blinker supporting base portion 103a of the blinker 103 by means of a certain tightening means such as a screw or the like.

Figure 6:
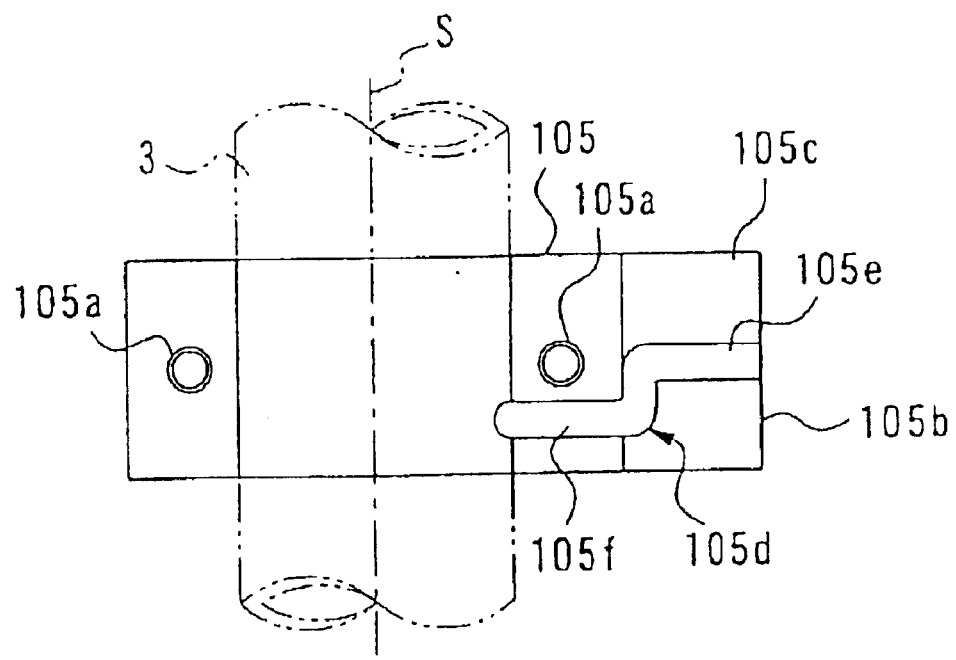
FIG. 6 is a view of the blinker device of the motorcycle according to one embodiment of the present invention when viewed in the direction of the arrow X—X in FIG. 4.

The one holder member 105 is, as shown in FIG. 6, formed with a groove 105d of crank shape in side view opening toward the outer end (toward the side of the blinker supporting base portion 103a) and toward the other holder member 106 so as to extend along the direction of the axis of the projection 105b (the direction orthogonal to the direction S of the axis of the blinker holder 102) to the proximal section of the screw hole 105a and then circumvent the screw hole 105 downward and continue to the inner peripheral portion being in contact with the outer peripheral surface of the front fork 3 of the holder member 105.

The portion 105f of the groove 105d positioned downwardly of the screw hole 105a is formed in a substantially semi-circular shape in lateral cross section. The groove portion 105e along the direction of the axis of the projection 105b of the groove 105d may be formed as a hole closed on the side of the other holder member 106 but not as a groove. The groove width of the groove 105d or the diameter of the hole formed instead of the groove 105d is formed so as to be slightly larger than the diameter of the blinker cord 104.

Figure 7:
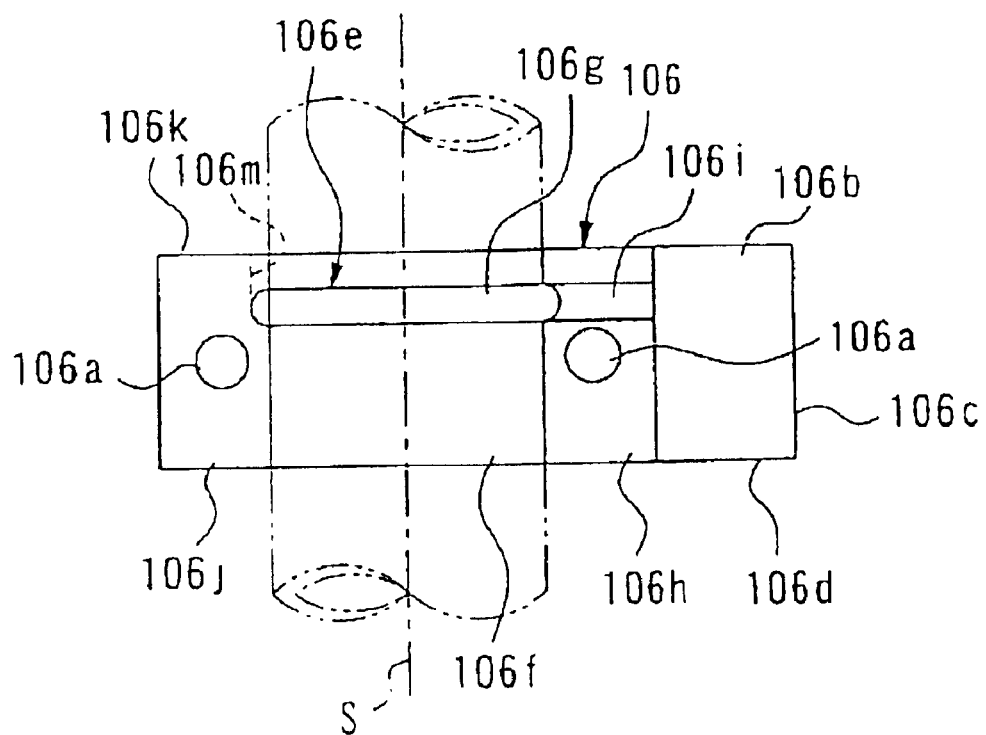
FIG. 7 is a view of the blinker device of the motorcycle according to one embodiment of the present invention when viewed in the direction of the arrow Y—Y in FIG. 4.

The other holder member 106 is formed at the outer end (the side of the blinker supporting base portion 103a) with a projection 106d forming a cylindrical projection 102b together with the projection 105b by abutting the joint surface 106b thereof against the notched plane 105c of the projection 105b of the one holder member 105 and abutting the outer end portion 106c thereof against the blinker supporting base portion 103a, as shown in FIG. 7. The inner side of the other holder member 106 is formed with a groove 106e being connected into the groove portion 105f on the one holder member 105 at one end, extending in the direction orthogonal to the direction S of the shaft hole 102a of the blinker holder 102, and then opening downward at the other end (the other side of the projection 106d).

The groove 106e includes an annular groove 106g having dimensions slightly larger than the diameter of the blinker cord 104 in depth and width and being formed circumferentially along the arcuate inner peripheral surface 106f that is to be brought into contact with the front fork 3. A groove portion 106i is connected into one end (the side where the projection 106b resides) of the annular grove 106g, formed along the contact surface 106h of the other holder member 106 that is to be brought into contact with the one holder member 105 and having a semi-circular lateral cross section of a diameter slightly larger than the diameter of the blinker cord 104.

A groove portion 106m is formed at a position in the vicinity of the opposed surface 106j of the other holder member 106 facing toward the one holder member 105 with a gap 105g interposed therebetween and is connected to the other end (the end opposite from the projection 106b) of the annular groove 106g at the upper end (lower end in FIG. 7) thereof, opening on the lower end surface (upper end surface in FIG. 7) 106k of the other holder member 106 at the lower end (upper end in FIG. 7) thereof, and having dimensions slightly larger than the diameter of the blinker cord 104 in depth and width.

The groove 105d of the one holder member 105 and the groove 106e of the other holder member 106 form a cord insertion hole 108 in the blinker holder 102 for receiving the blinker cord 104 therethrough. The blinker cord 104 drawn out from the blinker supporting base portion 103a of the blinker 103 passes through the groove portion 105e of the projection 105b, circumvents the bolt hole 105a, and passes from the groove portions 105f, 106i through the annular groove 106g, then along the outer periphery of the front fork 3 by half a round, and then through the groove portion 106m. The cord 104 nd is pulled out from the lower end of the other holder member 106 to be wired toward the required location.

Though it is not shown, a seal is provided at the mounting section between the projection 102b (projection 105b, 106b) of the blinker holder 102 and the blinker supporting base portion 103a of the blinker 103, so that rainwater is prevented from entering into the interior of the blinker 103 through the cord insertion hole 108. Though the front blinker is shown as being mounted on the pipe on the right side (the right side when viewed toward the traveling direction of the motorcycle 1) of the front fork 3, the front blinker (blinker device) mounted on the left side of the front fork 3 has the same construction as the right front blinker 5 except for being symmetrical.

Figure 8:
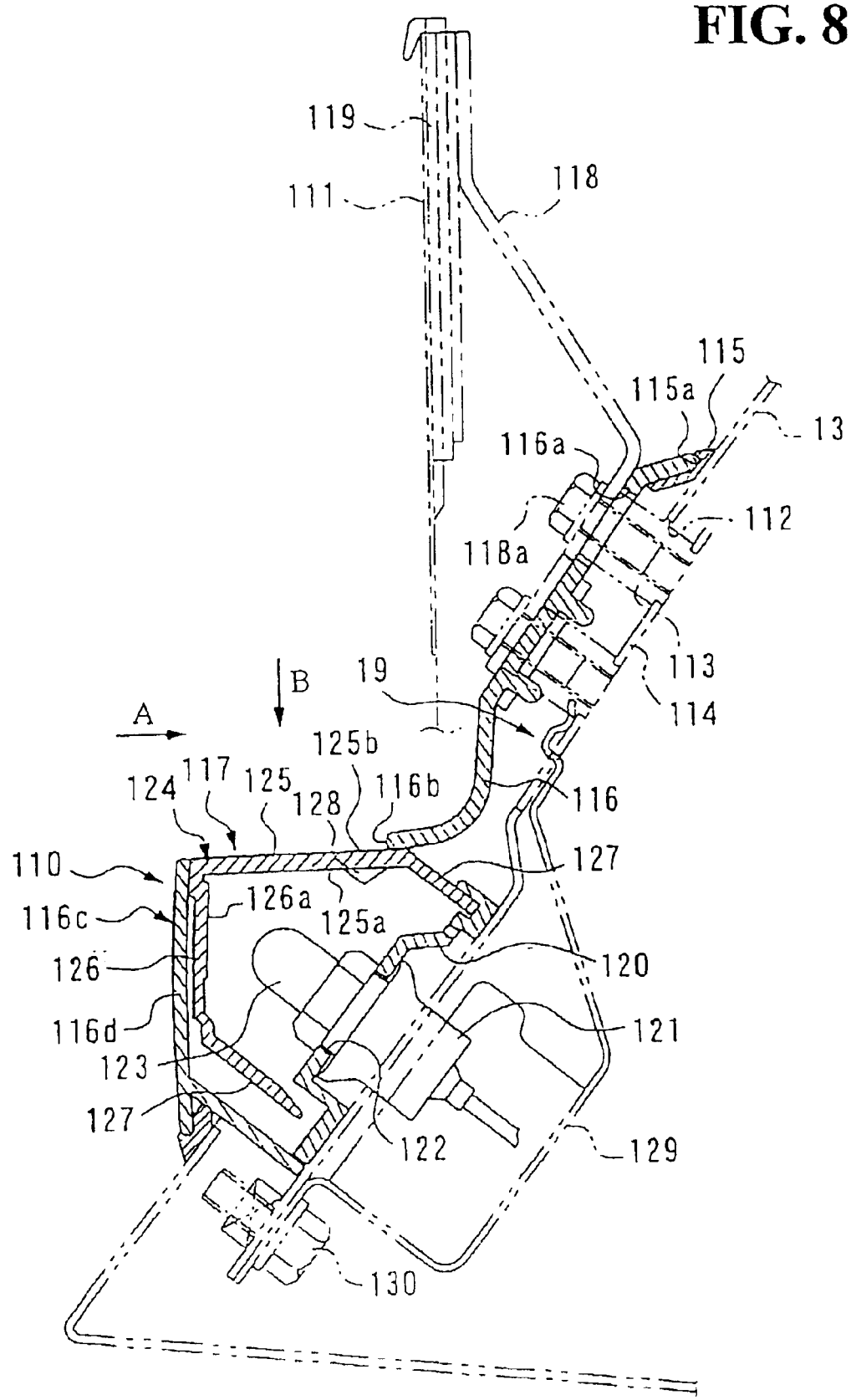
FIG. 8 is a view of the vertical cross sectional view of the license light of the motorcycle according to one embodiment of the present invention.
Figure 9:
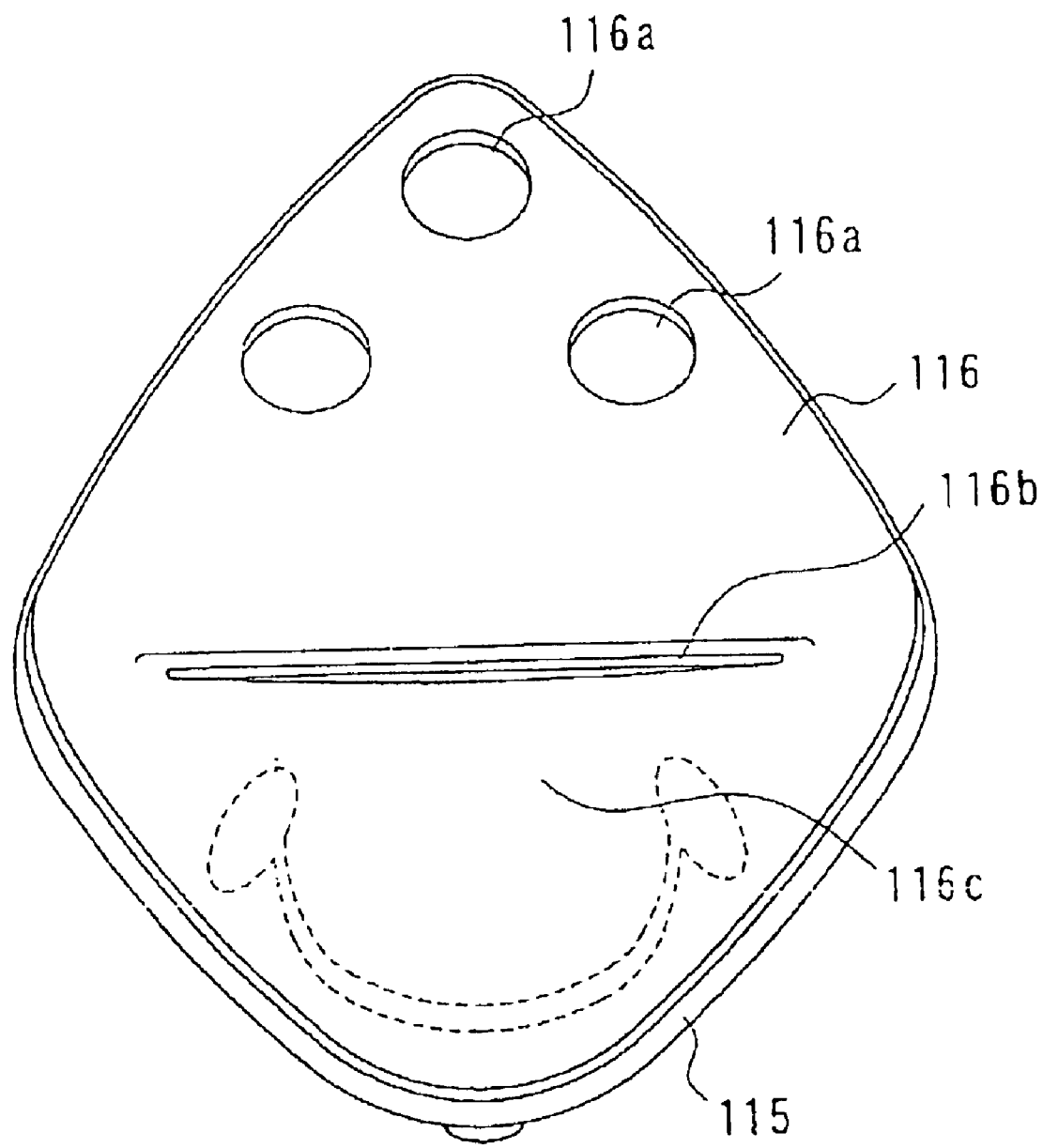
FIG. 9 is a view of the motorcycle according to one embodiment of the present invention when viewed in direction (a) shown in FIG. 8.

The license plate mounting unit 19 is provided with a license light 110 and the license plate (number plate) 111 that will be illuminated thereby. As shown in FIG. 8, a mounting plate 114 having three female screw members 113 on the upper side thereof at the positions on the back side thereof corresponding to the substantially diamond-shaped openings 112 is fixed on the rear end portion of the rear fender 13. A substantially diamond ring shaped cushion rubber 115 in the shape of a ring configured like a diamond is fixed on the front side so as to surround the peripheral edge of the opening 112, and then the peripheral edge of a substantially rounded diamond-shaped light cover 116 (See FIG. 9) of the license light 110 is fitted into the annular groove 115a formed along the periphery of the cushion rubber 115 so as to cover the opening 112.

The light cover 116 is provided with three insertion holes 116a through which the female screw members 113 are inserted on the upper portion thereof, and with a light storage section 116c having an opening 116b in the shape of a substantially circular arc or triangle with a rounded projection on the lower portion thereof so as to project rearwardly of the vehicle body when viewed from above, and a light body 117 of the license light 110 is attached in the light storage section 116c. A mounting plate 118 is fixed to the female screw member 113 of the mounting plate 114 inserted into the insertion hole 116a of the light cover 116 with a bolt 118a, so that the number plate 111 is secured to the mounting plate 118 via a supporting plate 119.

The lamp body 117 includes a base 120, a lamp 123 affixed at its screwed portion with the socket 121 and secured to the base 120 though a bayonet mounting hole 122 formed on the base 120, and a lens 124 fixed to the base 120 so as to surround the lamp 123. The lens 124 includes a horizontal upper surface 125 in the shape of a substantially circular arc or of a triangle having a rounded projection being projected toward the rear of the vehicle body when viewed from above, a vertical side surface 126 connected around the upper surface 125 with the face down, and a cylindrical surface 127 in the shape of a cylinder connected along the base portions of the upper surface 125 and the side surface 126, so that the cross section taken along the centerline of the vehicle body is a substantially pentagonal shape with one side (obliquely lower side) opened. A part of the free end of the cylindrical surface 127 is joined to the surface of the base 120 by welding or the like, whereby the lens 124 is joined integrally to the base 120.

Figure 10:
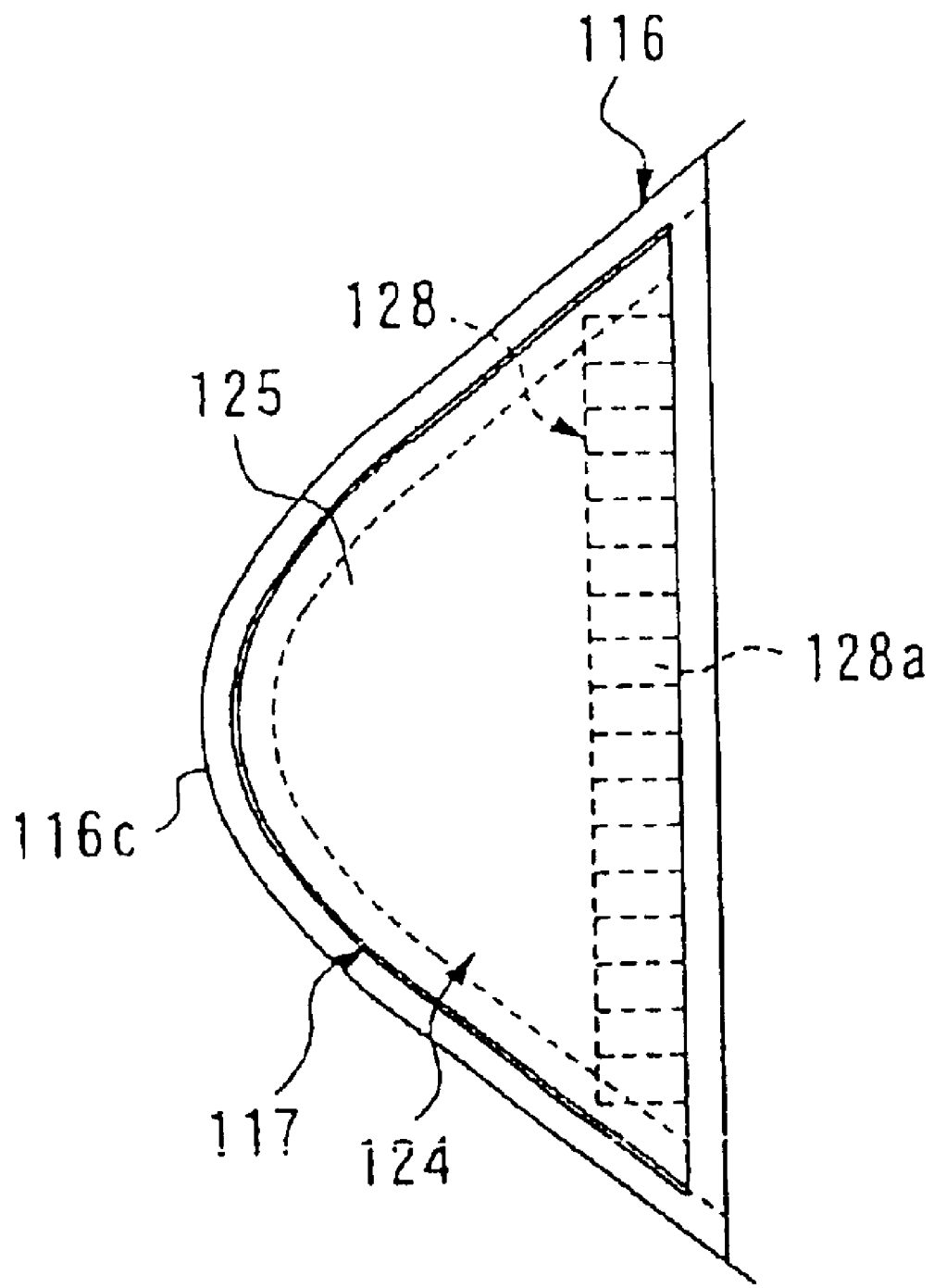
FIG. 10 is a drawing of the motorcycle according to one embodiment of the present invention when viewed in direction (b) shown in FIG. 8.

The upper surface 125 of the lens 124 has, as shown in FIG. 10, a profile in the shape of a substantially circular arc or triangle having a rounded projection being projected toward the rear of the vehicle body when viewed from above, and one of the lens surfaces 125a (the inner side being adjacent to the lamp 123) is formed with prism 128 on the proximal side, and the other lens surface 125b (the outside being away from the lamp) is a smooth surface. The prism 128 includes a plurality of prism elements 128a being oriented in parallel with the centerline of the vehicle body and disposed in the direction at a right angle with respect to the centerline. Each prism element 128a is a quadrangular pyramid elongated in the fore-and-aft direction and having a top projecting toward the lamp 123, and is formed integrally with the lens surface 125a of the upper surface 125 as so-called fish-eye cut surface.

The side surface 126 is formed into a curved surface almost along the profile of the upper surface 125, and is formed with a reflecting surface 126a applied with surface roughening for reflecting light of the lamp 123 on the upper side of the inner surface being adjacent to the lamp 123 over the range in the vicinity of the prism 128 on the curved surface. The lamp body 117 is mounted in the light storage section 116c by being inserted into the light storage section 116c of the light cover 116 with the projection of the lens 124 faced toward the rear of the vehicle body and the upper surface 125 faced upward so that the upper surface 125 is exposed from the opening 116b and the side surface 126 is abutted against the back side surface of the rear wall surface 116d formed in the same curved surface as the side surface 126 of the lens 124, and securing its side surface 126 to the back surface of the rear wall surface 116d with a bolt (not shown). A back surface cover 129 for covering the socket side 122 of the lamp 123 is inserted into and engaged with the engaging hole formed on the mounting plate 114 on the upper end side thereof and fixed to the mounting plate 114 with a bolt 130 on the lower end side thereof.

Figure 11:
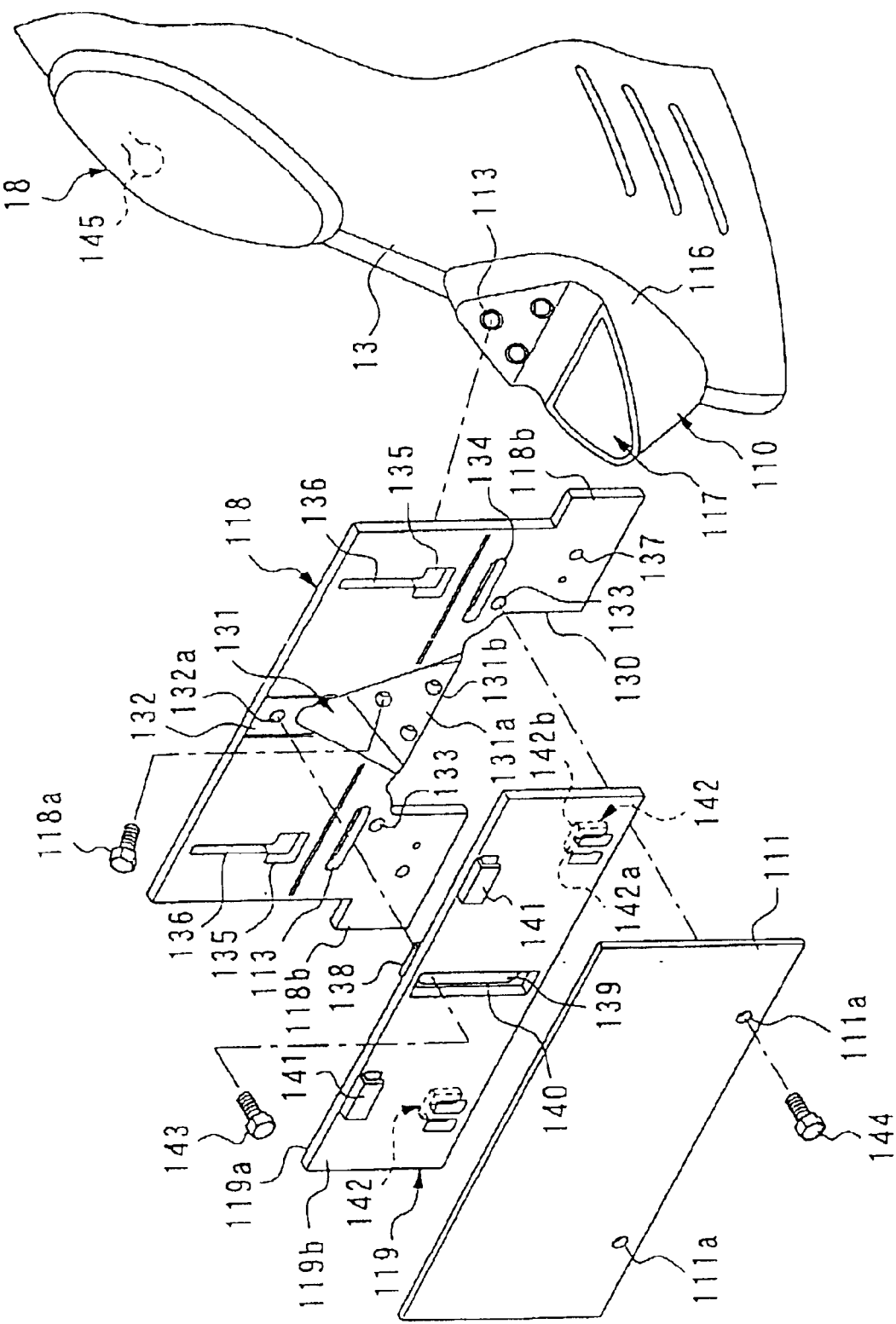
FIG. 11 is a perspective view showing the mounting structure of the license plate of the blinker device of the motorcycle according to one embodiment of the present invention.

Referring now to FIG. 11, the mounting plate 118 and the supporting plate 119 for mounting the license plate 111 on the license plate mounting unit 19 are described. The mounting plate 118 is formed of a substantially rectangular plate material having overhanging portions 118b, 118b on the lower side thereof with lateral lengths slightly longer than vertical lengths and projecting on the left and the right sides, and is formed with a substantially laterally elongated rectangular notch 130 at the center on the lower end thereof, a recess 131 in the shape of a triangular pyramid upwardly of the notch 130, and a bolt hole 132a formed in the flat recess 132 which is formed continuously upward from the recess 131.

A triangular mounting plate portion 131a corresponding to the bottom surface of the recess 131 in the shape of triangular pyramid is inclined so as to be higher on the front side of the vehicle body, and is formed with three bolt holes 131b near the positions corresponding to the three apexes of the triangle, so that the mounting plate 118 is attached on the license plate mounting unit 19 on the upper front of the light body 117 of the license light 110 with the plate surface oriented vertically by screwing and tightening the bolt 118a inserted through the bolt hole 131b into the female screw member 113 fixed on the mounting plate 114 of the license plate mounting unit 19 (See FIG. 8).

In addition, the mounting plate 118 is formed with bolt holes 133, 133 for mounting the license plate at the symmetrical positions near the upper end of the notch 130 on both sides, laterally elongated holes 134, 134 positioned slightly upwardly thereof, holes positioned upwardly of the elongated holes 134, 134 including square holes 135, 135 at the lower sides thereof and vertically elongated slide holes 136, 136 connected to the square holes 135, 135 at the upper ends there of and extended upward to the positions near the upper end of the mounting plate 118, and reflector mounting holes 137, 137 are formed at the positions lower than the bolt holes 133 on the both sides of the notch 130.

The supporting plate 119 is formed of a laterally elongated rectangular plate material having the same width as the width of the upper half portion of the mounting plate 118, and formed with a projecting seat portion 138 for abutment against the rear surface of the recess 132 of the mounting plate 118 at the center of the front surface 119a thereof, a laterally elongated bolt hole 139 through the seat portion 138, and a seat surface 140 formed on the back surface 119b as a recess surrounding the bolt hole 139.

The supporting plate 119 is formed with a hooking strips 141, 141 on the back surface 119b on both sides at the symmetrical positions at the upper end so as to project from the back side and be bent downward, and engaging portions 142, 142 having T-shaped lateral cross section on both sides at the symmetrical positions near the lower end so as to project toward the side of the front surface 119a. The engaging portions 141, 141 are square shaped in front view and are able to be inserted through the square holes 135, 135 formed on the mounting plate 118, so that the vertical portion 142a of T-shape of the engaging portion 142 is passed through the sliding hole 136 on the mounting plate 118 and the lateral portion 142b of T-shape can engage the front surface of the mounting plate 118.

With the mounting plate 118 and the supporting plate 119 thus constructed, the engaging portions 142, 142 on the supporting plate 119 are inserted through the square holes 135, 135 on the mounting plate 118 so that both plates are brought into abutment with their back sides mated, and then the supporting plate 119 is slid upward with respect to the mounting plate 118. Since the vertical side portion 142a of the engaging portions 142, 142 on the supporting plate 119 is inserted into the sliding holes 136, 136 of the mounting plate 118, and thus the lateral side potion 142b engages the mounting plate 118, the mounting plate 118 and the supporting plate 119 do not move with respect to each other in the fore-and-aft direction. In this state, the height of the supporting plate 119 with respect to the mounting plate 118 is determined, and a mounting bolt 143 is inserted through the bolt hole 139 and the bolt hole 132a on the mounting plate 118 from the back side of the supporting plate 119, the nut is screwed on the front side of the mounting plate 118 for temporarily fastening the supporting plate 119 on the mounting plate 118.

Subsequently, the license plate 111 is mated to the back surface of the supporting plate 119 with the upper edge abutted against the inner side of the hooking strips 141, 141 on the supporting plate 119, the bolt holes 111a, 111a formed on both sides of the lower end portion are aligned with the bolt holes 133, 133 or the elongated holes 134, 134 on the mounting plate 118. Subsequently, the mounting bolt 144 is inserted therethrough from the back side of the license plate 111, and the nut is screwed and tightened on the side of the front surface of the mounting plate 118, so that the license plate 111 is secured on the mounting plate 118.

When aligning the bolt holes 111a, 111a of the license plate 111 and the bolt holes 133, 133 or the elongated holes 134, 134 on the mounting plate 118, the supporting plate 119 is moved and adjusted in the vertical direction with respect to the mounting plate 118 via the engagement between the slide holes 136, 136 and the engaging portions 142, 142. When those holes are aligned, the mounting bolt 143, which was inserted through the bolt hole 139 of the supporting plate 119 and the bolt hole 132a of the mounting plate 118 and temporarily fastened, is securely fastened to fixedly secure the supporting plate 119 to the mounting plate 118.

The color tones of the mounting plate 118 and the supporting plate 119 are black by using a black material or applying a black color on the suitable material. The mounting surface for the license plate constructed by combining the mounting plate 118 and the supporting plate 119 is determined to have dimensions in width and height sufficient for accommodating the license plate 111 the specification of which differs depending on the places of destination of the motorcycle, and the back surface of the license plate 111 is not irradiated directly by the tail light 145 in the brake lamp unit 18 mounted on the rear fender 13 forwardly of the mounting plate 118 and the supporting plate 119.

Figure 12:
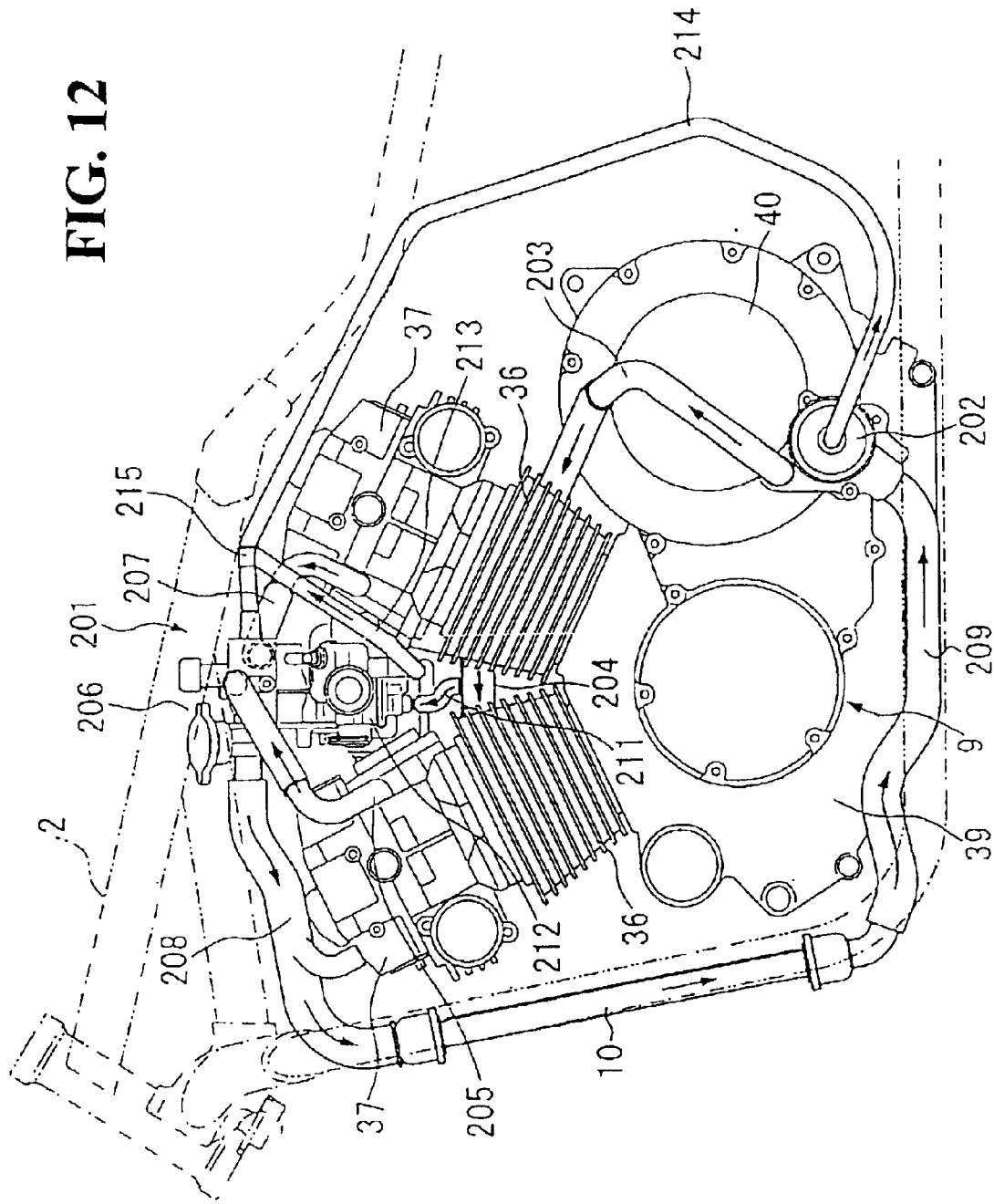
FIG. 12 is an enlarged side view with a side surface cover at a center portion of the motorcycle removed according to one embodiment of the present invention.

Engine cooling by a radiator 10 and the heating device 201 for a carburetor associated therewith will be described hereinafter. As shown in FIG. 12, a transmission 40 of the engine 9 is provided with a cooling water pump 202 on the side thereof, and an discharge port of the cooling water pump 202 is connected to an engine cooling water intake port of a right cylinder section 36 in FIG. 12 of the engine 9 through the engine cooling water wiring 203. Engine cooling water drawn or flowing into the right cylinder section 36 is diverged into two routes after passing a water jacket, not shown, formed on a wall portion of the cylinder section 36, one of which reaches the engine cooling water discharge port formed on the side of the cylinder section 36 opposite from the engine cooling water intake port. The other one of which reaches the engine cooling water discharge port formed on the upper surface of the right cylinder head section 37 upwardly thereof.

The engine cooling water discharge port of the right cylinder section 36 is connected to the engine cooling water intake port of the left cylinder portion 36 via the engine cooling water communication pipe 204. Engine cooling water drawn or flowing into the left cylinder section 36 passes through the water jacket, not shown, formed on the wall portion of the same cylinder section 36, and then reaches the engine cooling water discharge port formed on the upper surface of the left cylinder head section 37 upwardly thereof. The engine cooling water discharge port of the left cylinder head section 37 is then connected to an intake port of a valve case of a thermostat valve 206 disposed downwardly of a main pipe 22 via an engine cooling water piping 205. The engine cooling water discharge port of the right cylinder head section 37 is connected to the intake port of the valve case of the thermostat valve 206 via the engine cooling water piping 207.

The discharge port of the thermostat valve 206 is connected to the upper intake port of the radiator 10 via the engine cooling water piping 208, and the lower discharge port of the radiator 10 is connected to the suction opening of the cooling water pump 202 via the engine cooling water piping 209. A carburetor heating piping 211 is bifurcated from the engine cooling water communication pipe 204 connecting the left and the right cylinder sections 36, 36, and the extremity of the carburetor heating piping 211 is connected to the engine cooling water intake port formed on the carburetor 212. A carburetor heating piping 213 extends from the engine cooling water discharge port provided on the carburetor 212, and this carburetor heating piping 213 located on the downstream side is connected to the by-pass piping 214 for connecting the discharge port of the valve case of the thermostat valve 206 and the suction opening of the cooling water pump 202 via a junction 215.

The engine cooling water piping 203, the engine cooling water communication pipe 204, the engine cooling water piping 205, 207, 208, 209 constitute a radiator piping that is a circulation route connecting the engine 9 and the radiator 10. The inner diameters of the engine cooling water piping 208, 209 of this radiator piping are determined to be larger than the inner diameter of the by-pass piping 214.

The thermostat valve 206 is opened and closed according to the temperature of engine cooling water flowing therein. For example, when the valve 206 is "closed", the engine cooling water piping 205, 207 is not brought into communication with the engine cooling water piping 208, but is brought into communication only with the by-pass piping 214. When the valve 206 is "opened", the engine cooling water piping 205, 207 is brought into communication both with the engine cooling water piping 208 and the by-pass piping 214.

Though the cooling water pump 202 is actuated with actuation of the engine 9, the thermostat valve 206 is kept closed when the temperature of engine cooling water does not reach the prescribed temperature. Accordingly, engine cooling water circulates the route from the cooling water pump 202 through the engine cooling water piping 203, the left and right cylinder sections 36, the engine cooling water piping 205, 207, the valve case of the thermostat valve 206, and the by-pass piping 214 and flows back again to the cooling pump 202.

In this case, when suitably heated engine cooling water after passing the right cylinder section 36 passes through the engine cooling water communication pipe 204, a part of it is diverged and led through the carburetor heating piping 211 to the carburetor 212 to heat up the carburetor 212. Engine cooling water that was used for heating up passes through the carburetor heating piping 213 and the by-pass piping 214 and then flows back again to the cooling water pump 202.

Subsequently, when the temperature of engine cooling water increases and exceeds a prescribed temperature, the thermostat valve 206 opens. Accordingly, the route from the engine cooling piping 205, 207 through the engine cooling water piping 208 to the radiator 10, and from there through the engine cooling water piping 209 back to the cooling water pump 202 again is opened, and thus engine cooling water circulates also into this route. In other words, engine cooling using the radiator 10 starts. In this case, the flow rate of engine cooling water flowing through the by-pass piping 214 decreases due to piping resistance, and thus the flow rate of engine cooling water flowing in the route passing through the radiator 10 side (radiator piping system) increases. Therefore, the flow rate of engine cooling water flowing through the carburetor 212 decreases consequently, and thus excessive heating of the carburetor 212 is prevented.

Figure 13:
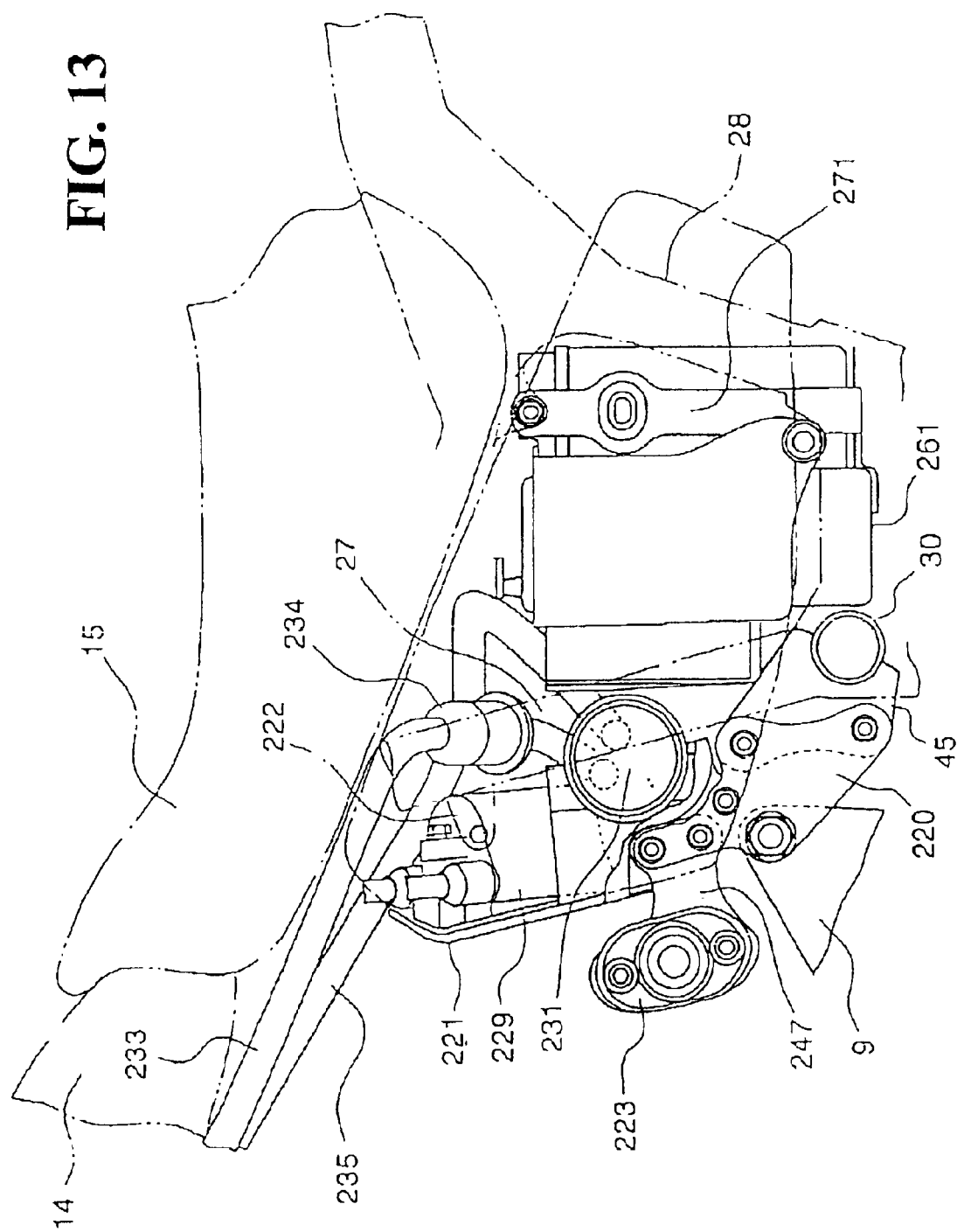
FIG. 13 is an enlarged side view with a side surface cover at a center portion of the motorcycle removed according to one embodiment of the present invention.

The structure of the engine auxiliary equipment at the substantially center of the vehicle body and the mounting structure of the ignition switch will now be described hereinafter. As shown in FIG. 13, the bracket 45 mounted on the cross pipe 30 of the vehicle frame 2 is attached with an engine hanger 220 for supporting the engine 9 so as to cross over a pair of left and right pipe members 24, 27 of the vehicle body frame. A center cover 221 is supported and mounted on the left and right center pipes 24, 27, 30 on the front side thereof via the engine hanger 220. The bracket 222 is mounted on the center pipe 27 (See FIG. 17). The engine hanger 220 functions to support the engine 9 and the center cover 221, as well as the ignition switch 223. This will be described in greater detail hereinafter.

Figure 15:
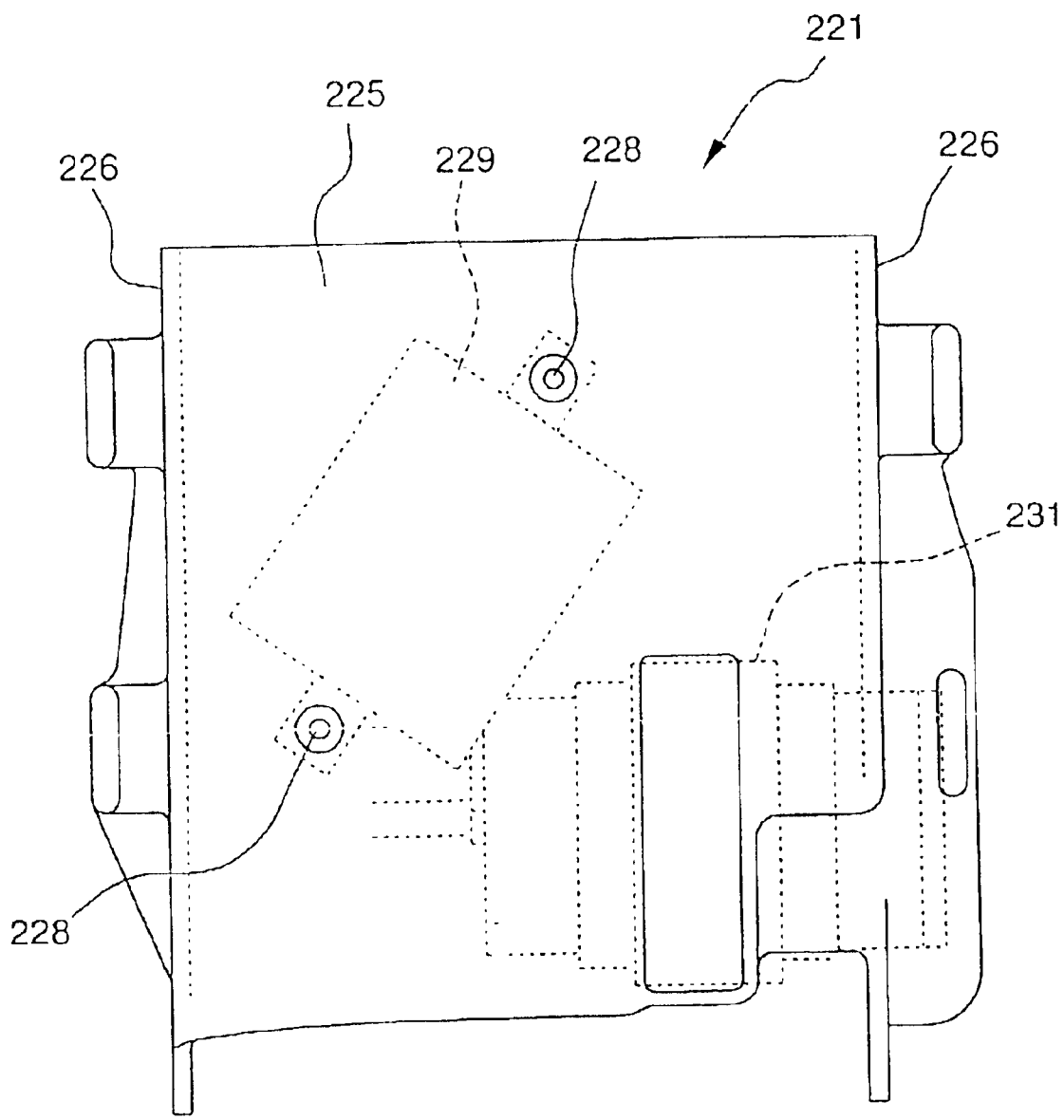
FIG. 15 is a front view of a center cover of the motorcycle according to one embodiment of the present invention.
Figure 16:
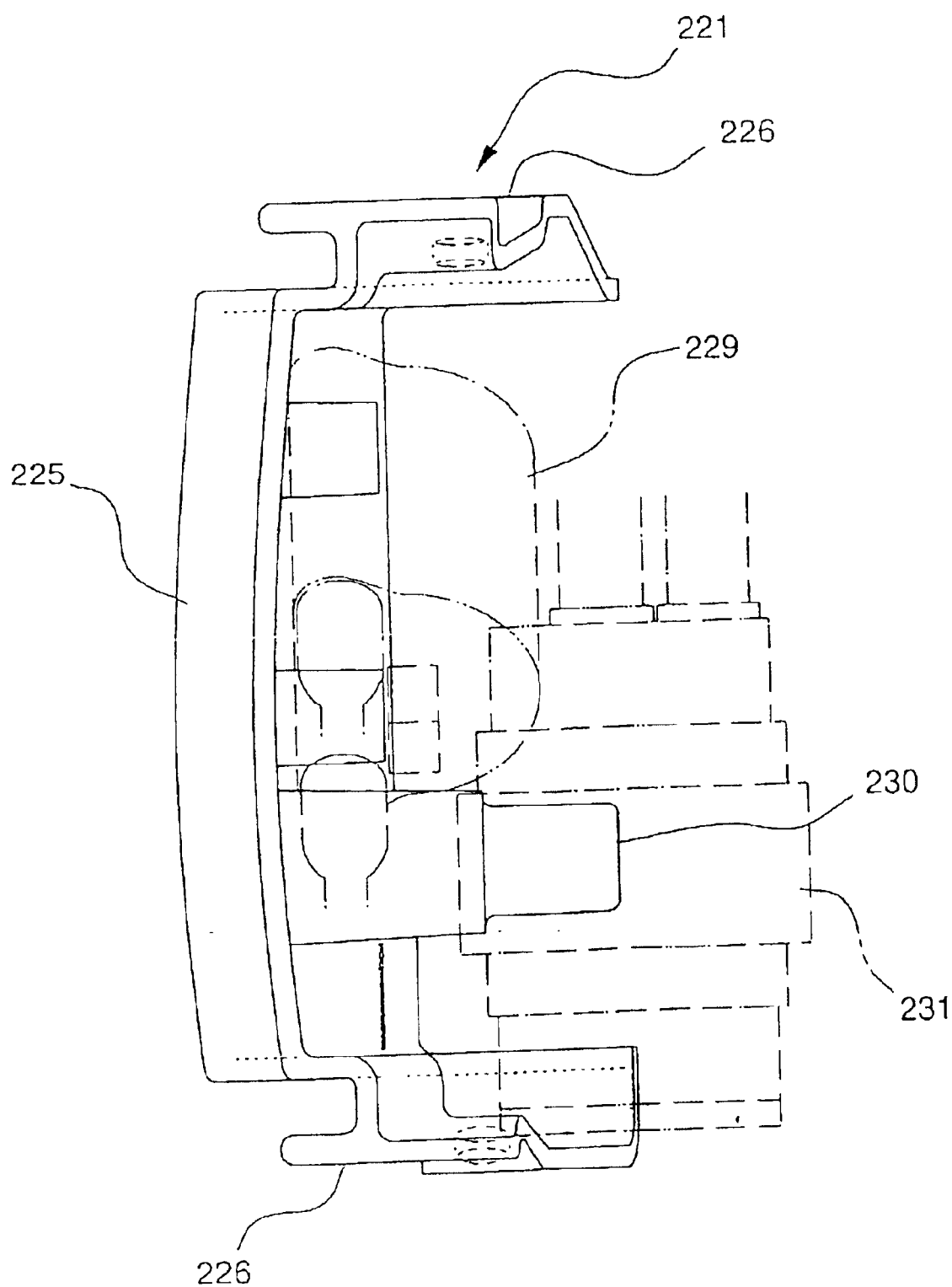
FIG. 16 is a plan view of the center cover of the motorcycle according to one embodiment of the present invention.
Figure 17:
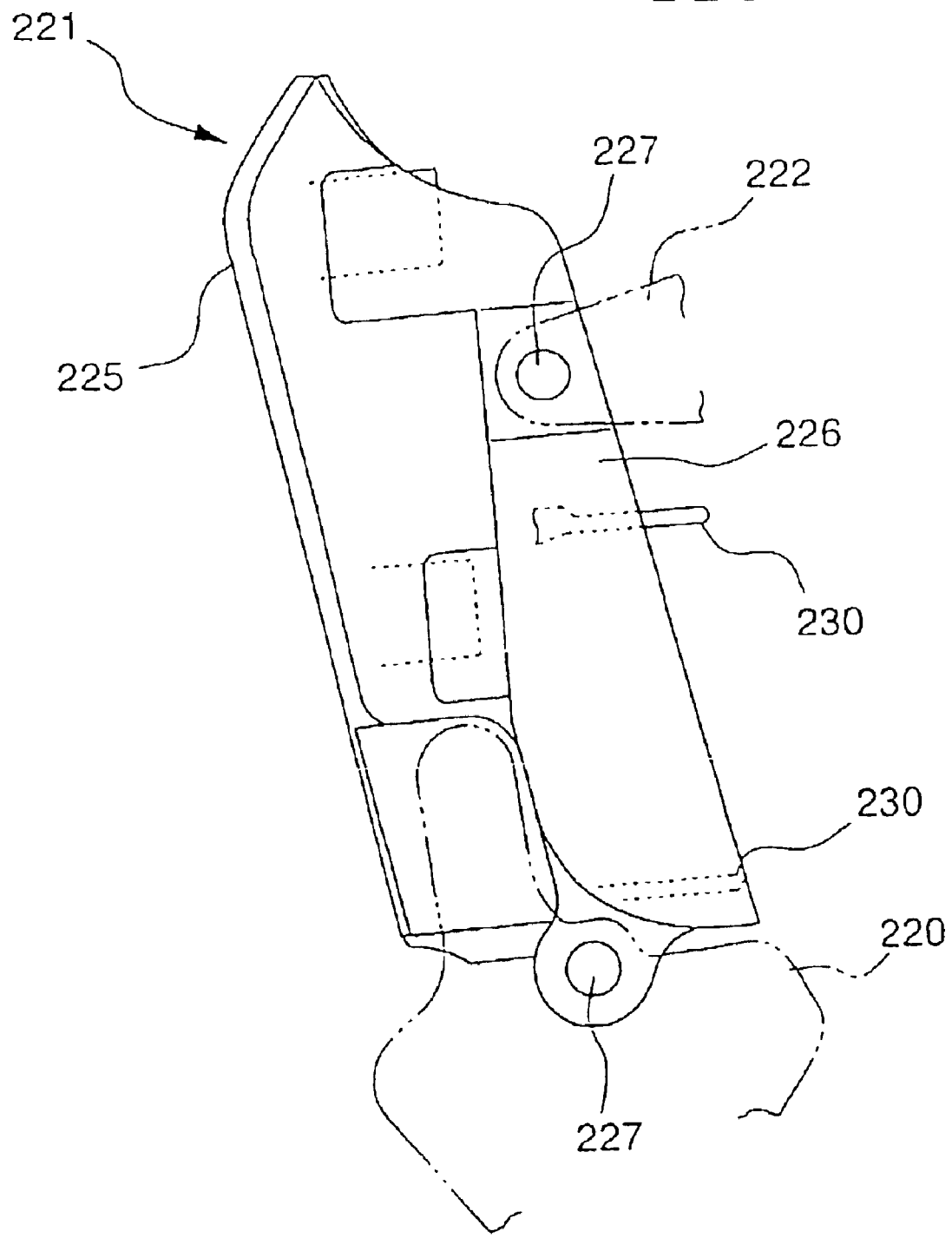
FIG. 17 is a side view of the center cover of the motorcycle according to one embodiment of the present invention.

As shown in FIG. 15 to FIG. 18, the center cover 221 is formed of a resin having a plate shaped portion 225 formed into a substantially square shape, and an upright portion 226 provided on the left and right sides of the plate shaped portion 225 so as to extend rearward with respect to the vehicle body when the center cover 221 is assembled to the vehicle body frame. As shown in FIG. 17, the left and right upright portions 226 are, as shown in FIG. 17, provided respectively with engaged holes 227 one over another, by tightening suitable fasteners such as bolts with these engaged holes 227 aligned with the engaging holes formed on the engine hanger 220 and on the bracket 222, whereby the center cover 221 is secured on the vehicle body frame 2.

Figure 18:
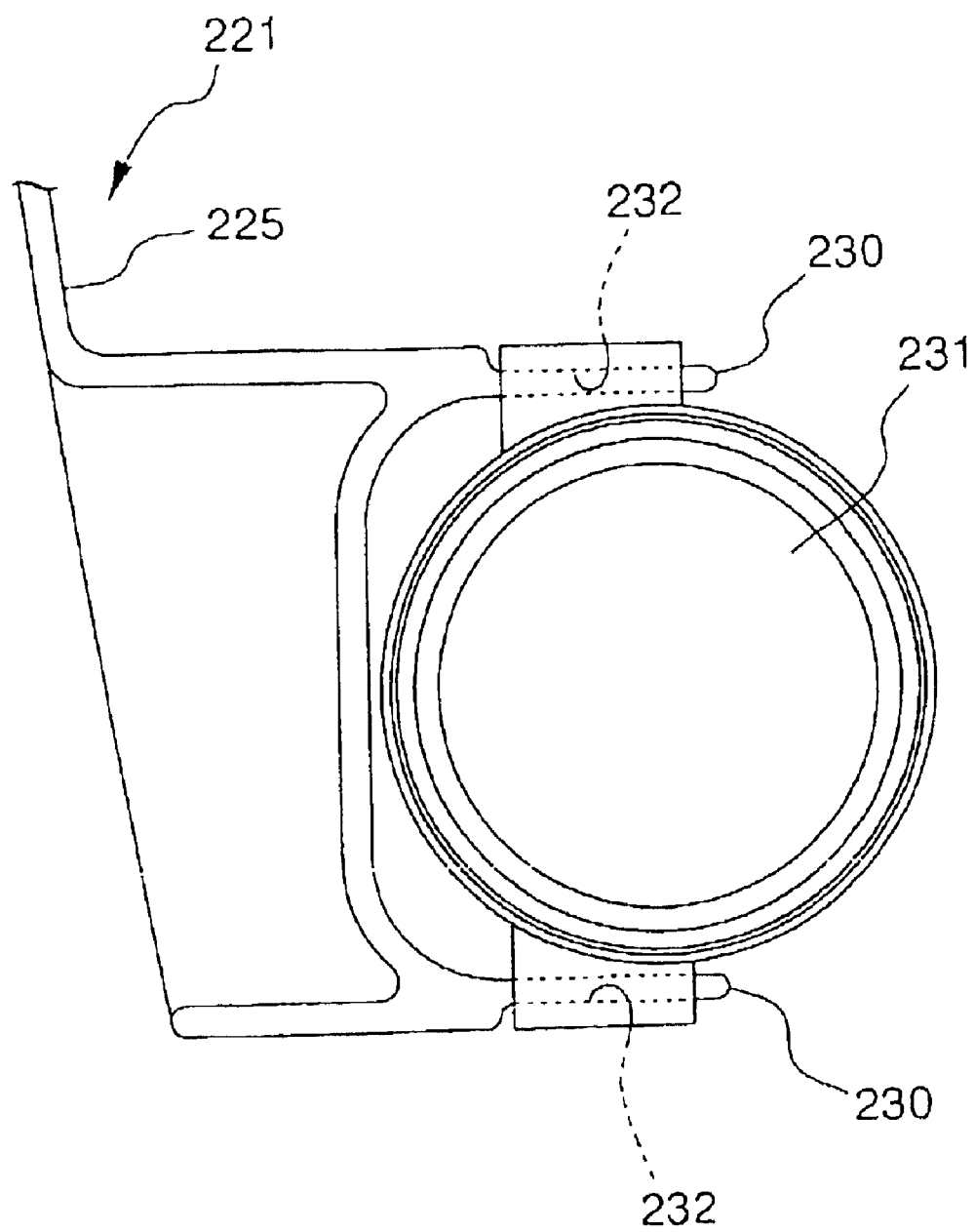
FIG. 18 is a side view showing a state in which a fuel pump is attached on the center cover of the motorcycle according to one embodiment of the present invention.

The center cover 221 is not limited to resin, and may be metal such as aluminum alloy or the like. As shown in FIG. 15, the center cover 221 is formed with two part mounting holes 228 on the upper part of the plate shaped portion 225 at a certain distance with each other, and an ignition coil 229 is mounted to these part mounting holes 228 via fixing means such as bolts. As shown in FIG. 16 to FIG. 18, the lower part of the plate shaped portion 225 is formed with tongue shaped engaging portions 230 extending rearwardly with respect to the vehicle body at a certain distance with each other in the vertical direction. With these tongue shaped engaging portion 230 inserted into and engaged with the engaging holes 232 formed on the sides of the fuel pump 231, the fuel pump 231 is mounted on the center cover 221 in a horizontal posture.

Figure 19:
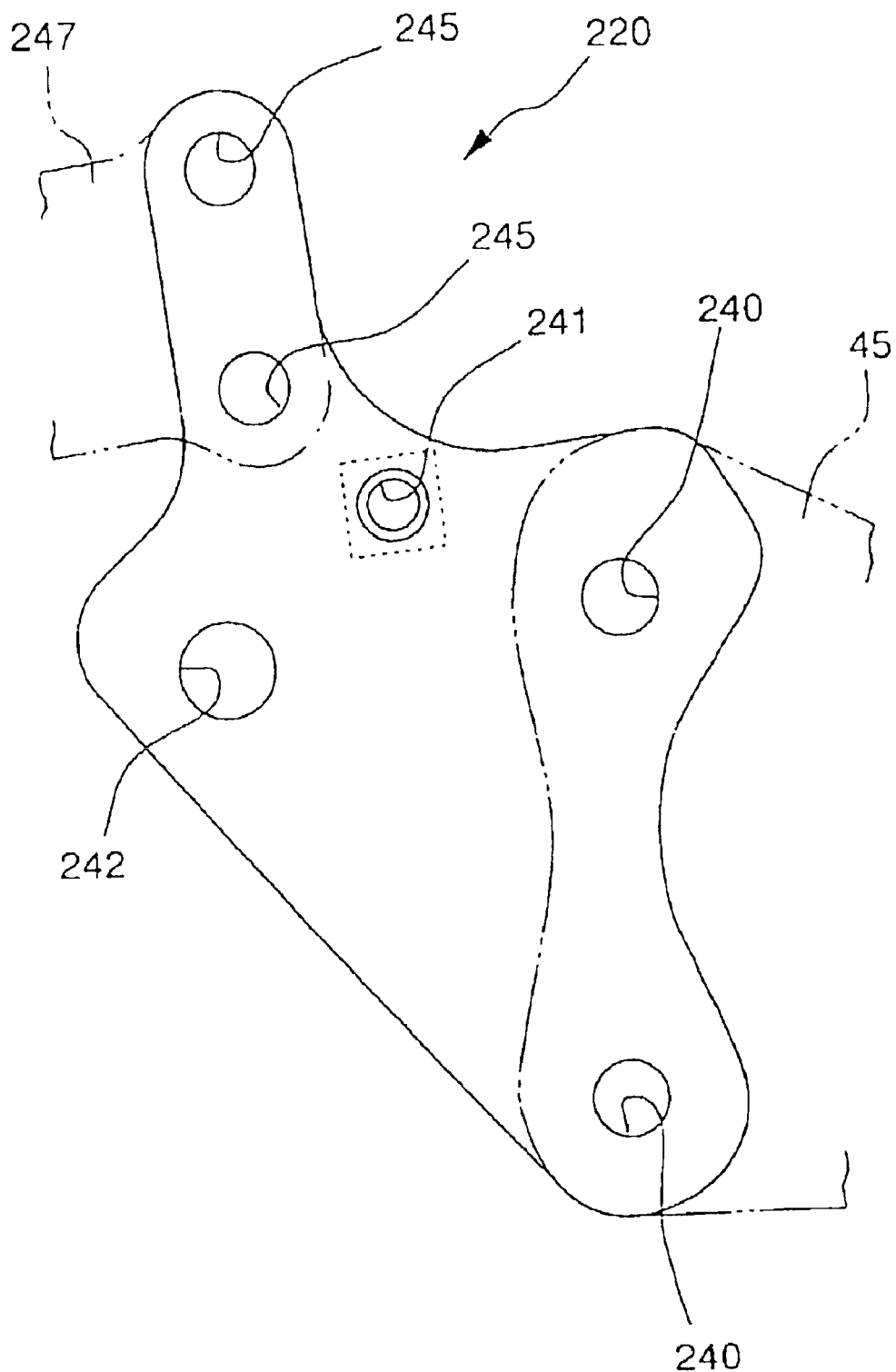
FIG. 19 is a front view of the engine hanger of the motorcycle according to one embodiment of the present invention.

As seen in FIG. 13, a pipe 223 for feeding fuel from the fuel tank 14 through the filter 234 to the fuel pump 231, and a pipe 234 for feeding fuel from the fuel pump 231 to the carburetor 212 are provided. As shown in FIG. 19, the engine hanger 220 is formed into a substantially diamond shape, and is formed with engaged holes 240 in the vertical direction at a prescribed distance in the vicinity of the end portion of the right side (rearwardly of the vehicle body when being assembled to the vehicle body), and with a engaging hole 241 at the upper center thereof, and further with a engaging hole 242 in the vicinity of the left end.

The engaged holes 240 are a portion to be fixed via fastener such as bolts in the state of being aligned with the engaging holes of the bracket 45 mounted on the cross pipe 30 of the vehicle body frame 2. The engaging hole 241 is a portion to engage the lower portion of the center cover 221 via suitable fixing means such as a bolt, and the engaging hole 242 is a portion to engage the engine 9 via fixing means such as a bolt. The engine hanger 220 is provided with an extended portion 244 extending in the direction different from the direction of engine suspension (upward in FIG. 19), and this extending portion 244 is formed with two engaging holes 245 at a distance in the direction of the length. The ignition switch 223 is mounted via a stay 247 to these engaging holes 245 (See FIG. 13).

Figure 20A:
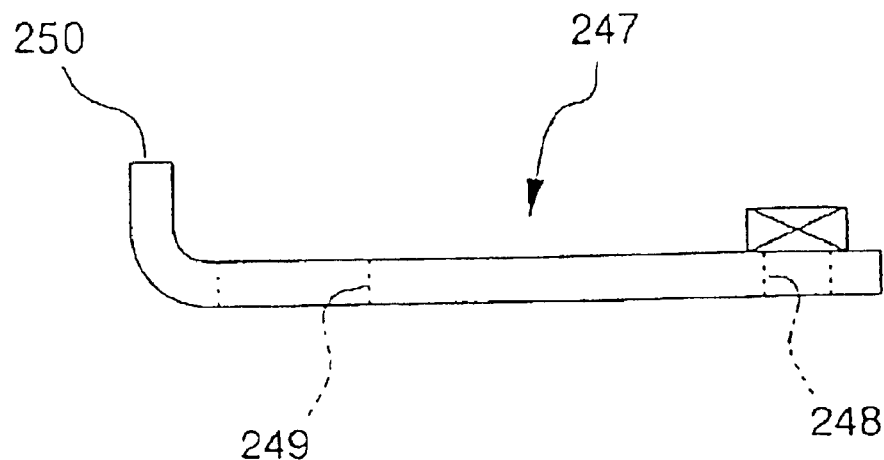
FIGS. 20(a)–(b) are a plan view and a side view, respectively, of a stay for supporting an ignition switch of the motorcycle according to one embodiment of the present invention.
Figure 20B:
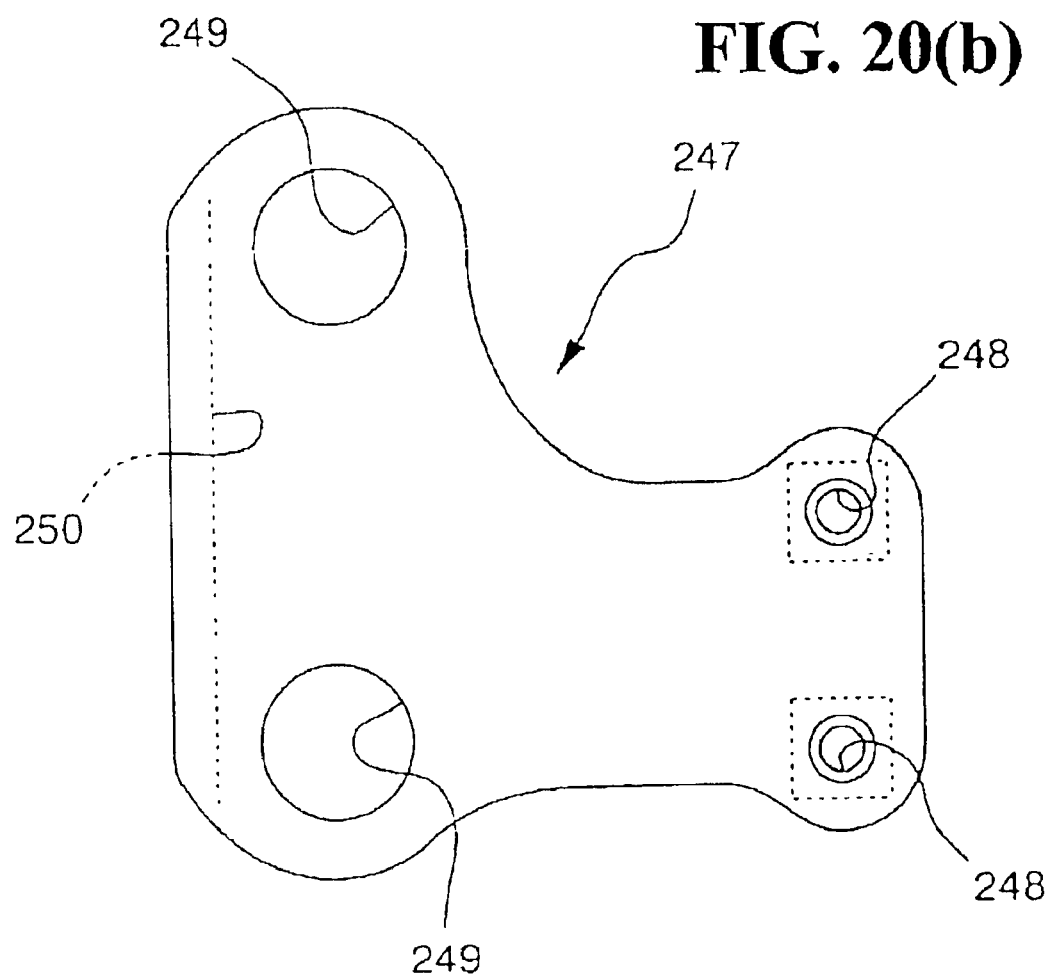

As shown in FIG. 20, the stay 247 is formed with engaged holes 248 to be fixed on the engine hanger 220 at a distance in the vertical direction in the vicinity of the right end (rearward when being assembled), and with engaging holes 249 to be aligned with the mounting hole for the ignition switch 229 at the position in the vicinity of the left end, and further with an reinforcing portion 250 formed by bending the left edge inward so as to be upright when assembling the vehicle body.

Figure 14:
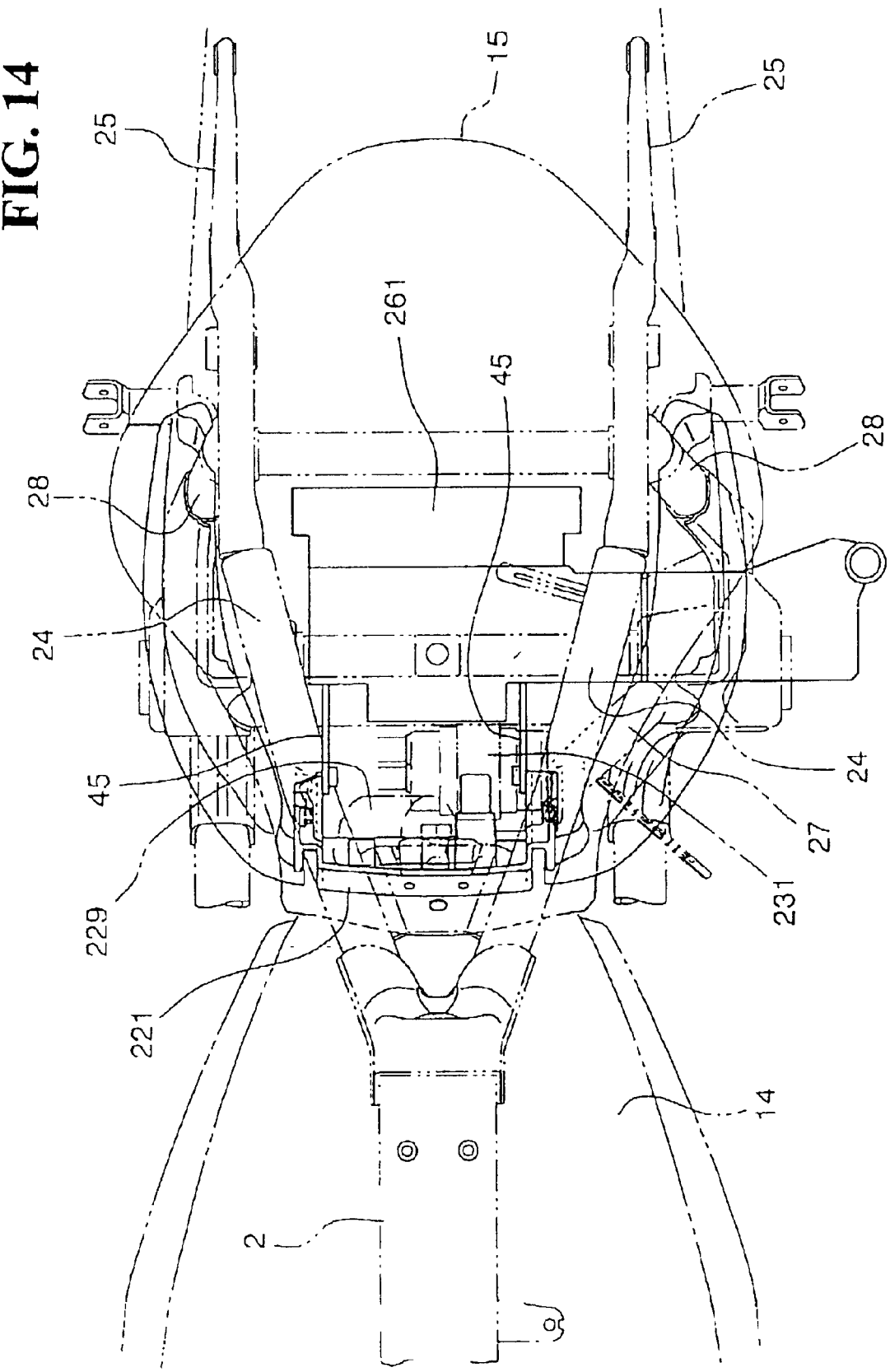
FIG. 14 is an enlarged plan view with a seat at the center portion of the motorcycle removed according to one embodiment of the present invention.

The engaged holes 248 of the stay 247 correspond to the engaging holes 245 of the engine hanger 220. Subsequently, the storage structure for documents or tools will be described. As shown in FIGS. 13 and 14, a battery case 261 is stored rearwardly of the center cover 221 in the portion surrounded by the center pipes 27, the rear pipes 28, and main seat 15 of the vehicle body frame 2. The battery case 261 includes, as shown in FIGS. 21 to 24, a document/tool storage section 263 for storing documents and tools in addition to a battery storage section 262 for storing a battery formed integrally therewith. In other words, in this battery case 261, the right side in FIG. 21 and FIG. 22 (rear side when assembling the vehicle body) is used as the battery storage section 262 and the front side thereof is used as the document/tool storage section 263.

Figure 24A:
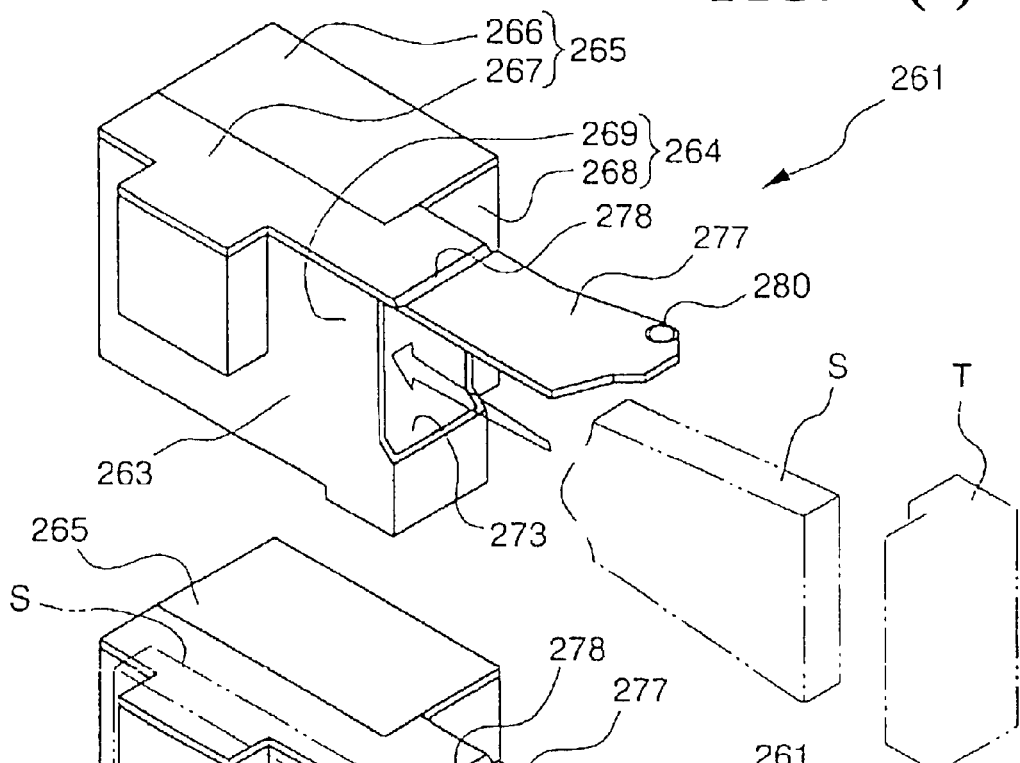
FIGS. 24(a)–(c) are perspective views of an action of the battery case of the motorcycle according to one embodiment of the present invention.
Figure 24B:
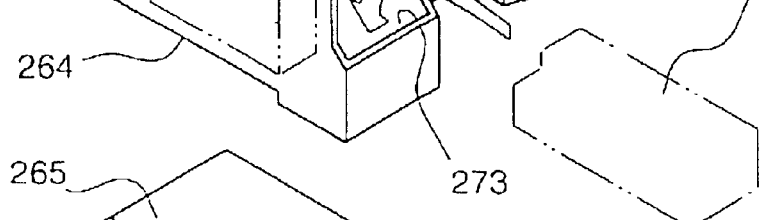
Figure 24C:
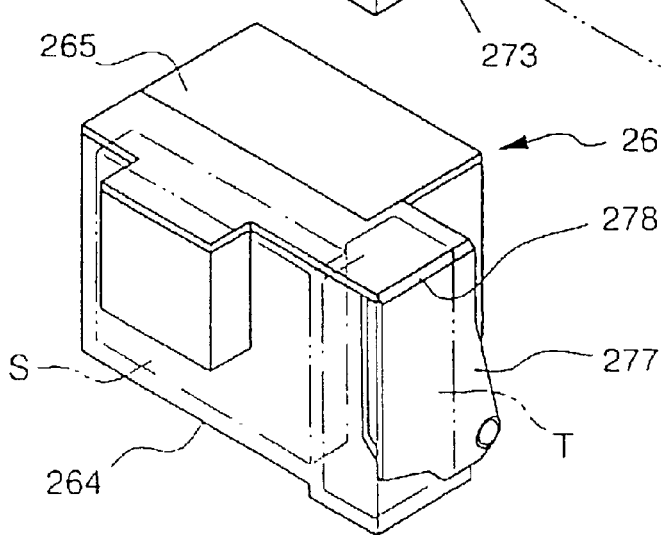

As shown in FIG. 24, the battery case 261 includes a case body 264 on the lower side and a lid 265 to be fixed on the case body 264 by a suitable fixing means so as to cover the open-top of the case body 264. The case body 264, the first lid 266 and the second lid 267 are formed of resin by blow molding. The case body 264 includes a first box-shaped portion 268 for defining the battery storage section 262 and a second box-shaped portion 269 for defining the document/tool storage section 263 formed on the left side in FIG. 21, FIG. 22 of the box-shaped portion 268. A partition 270 is provided between the first box-shaped portion 268 and the second box-shaped portion 269 for parting them. The case body 264 is secured on the vehicle body frame 2 side by a support stay 271 attached on the outside thereof (See FIG. 13).

Figure 21:
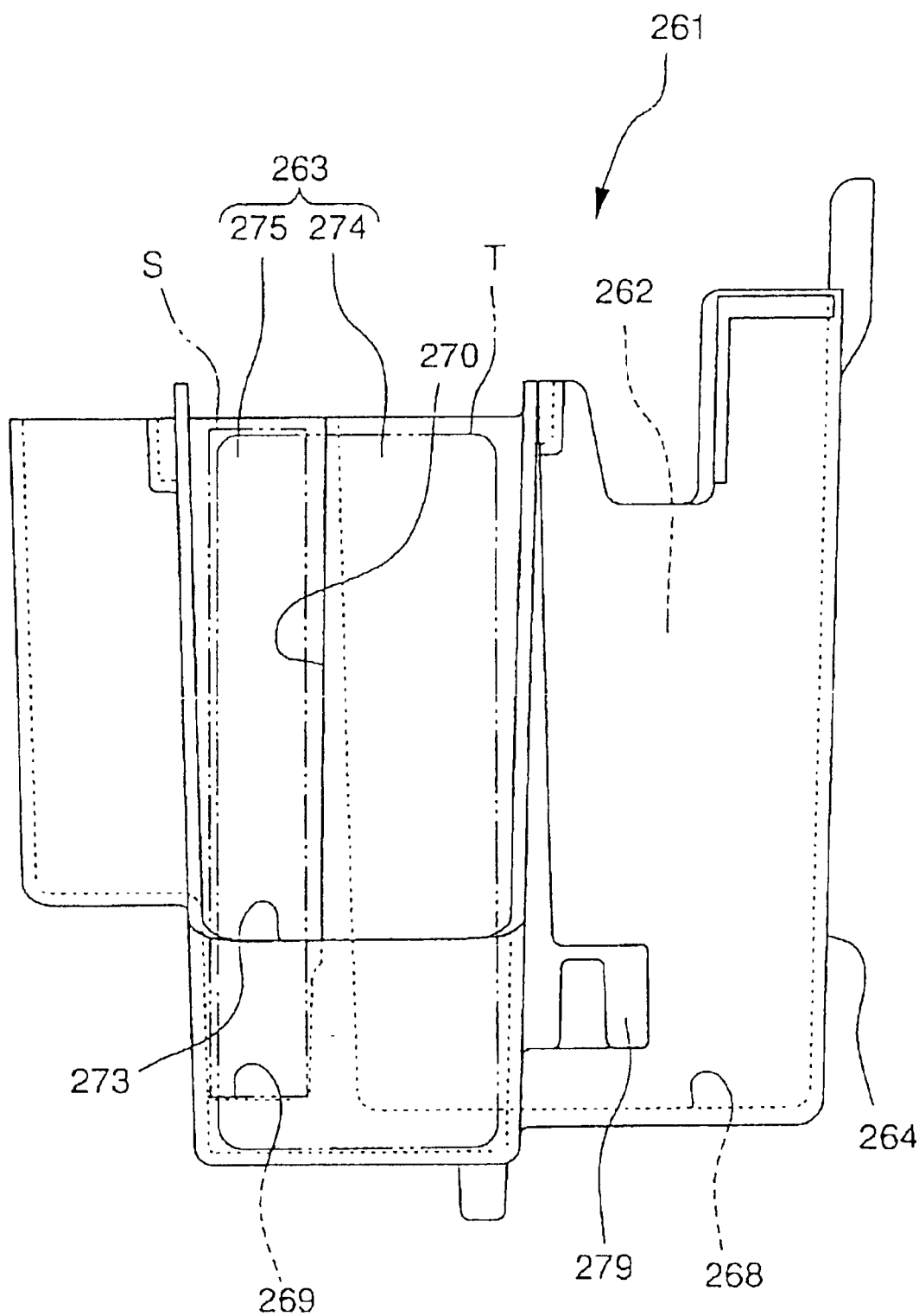
FIG. 21 is a front view of a battery case of the motorcycle according to one embodiment of the present invention.
Figure 22:
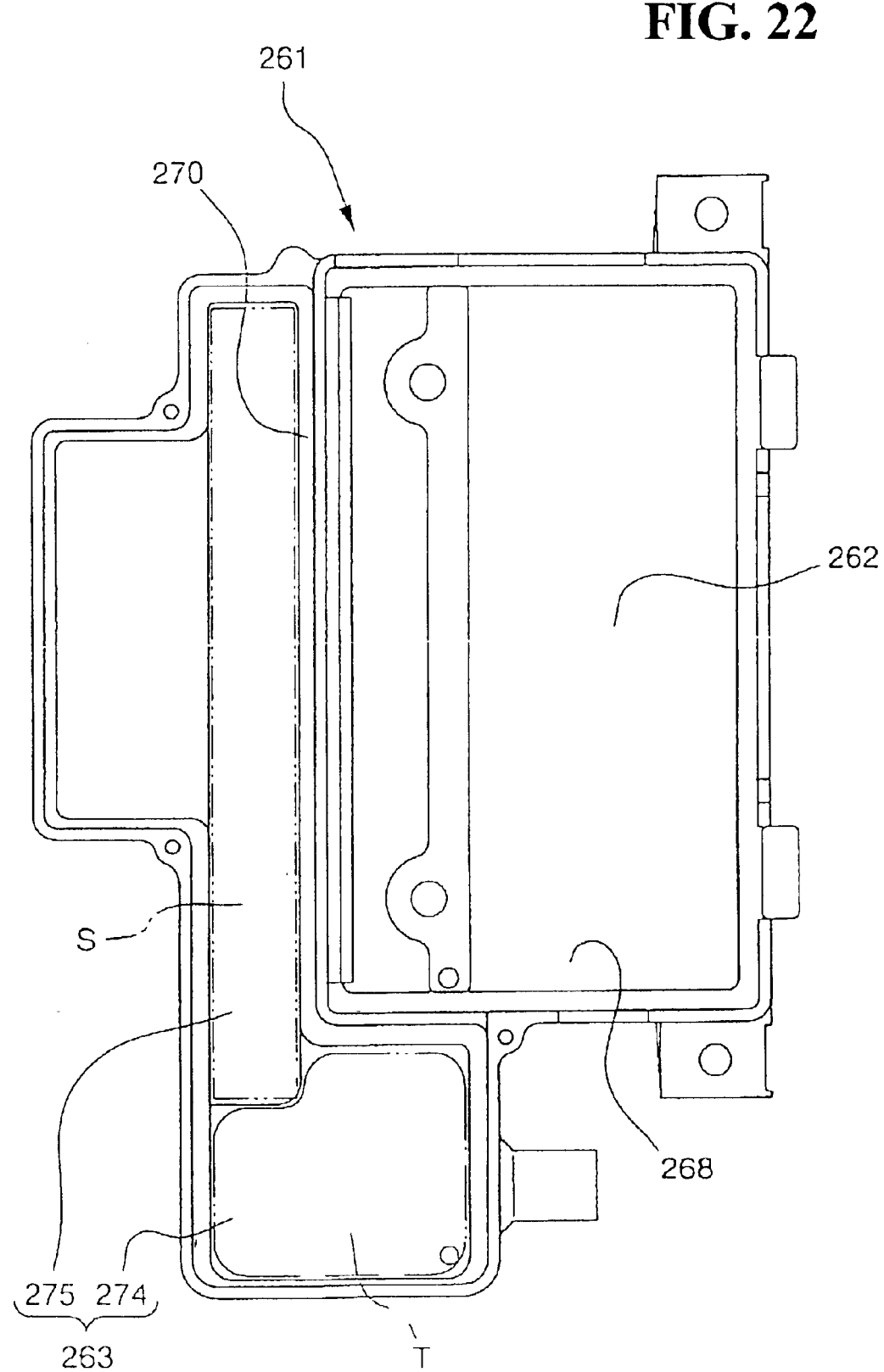
FIG. 22 is a plan view of the battery case of the motorcycle according to one embodiment of the present invention.
Figure 23:
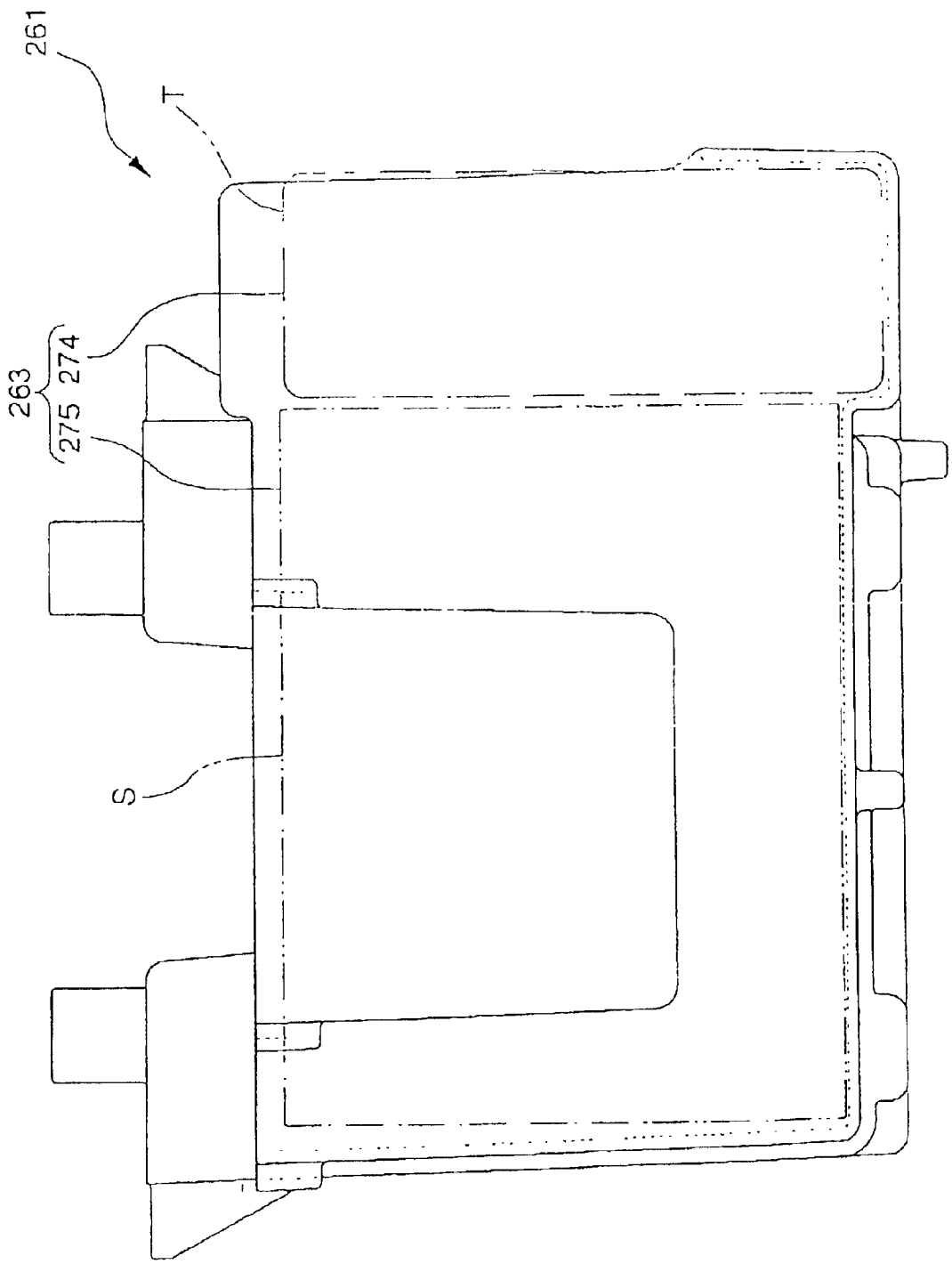
FIG. 23 is a side view of the battery case of the motorcycle according to one embodiment of the present invention.

As shown in FIG. 21 and FIG. 24, the second box-shaped member 269 for defining the document/tool storage section is provided with an opening 273 for storing or taking out documents S or tools T laterally thereof. The document/tool storing section 263 is divided into the near side and the far side with respect to the opening 273, and the near side of the storage section with respect to the opening is used as the tool storage section 274 and the far side with respect to the opening is used as the documents storage section 275.

The second lid 267 is formed with an opening/closing lid 277 integrally therewith for covering the opening 273 formed on the lower sidewall of the tool storage section 274 in FIG. 24. The opening/closing lid 277 has a thinner portion 278 at the position facing toward the outer wall corner of the tool storage section 263 when assembled into the case body 264, so that it can be bent outward from the thinner portion 273. The opening/closing lid 277 is provided with a locking portion 280 that is engaged by the engaging portion 279 on the case body 264, so that the opening 273 can be kept closed via the locking portion 280. FIG. 24 shows a procedure to open the opening 273 and store documents S or tools T in the document/tool storage section 263.

Figure 25:
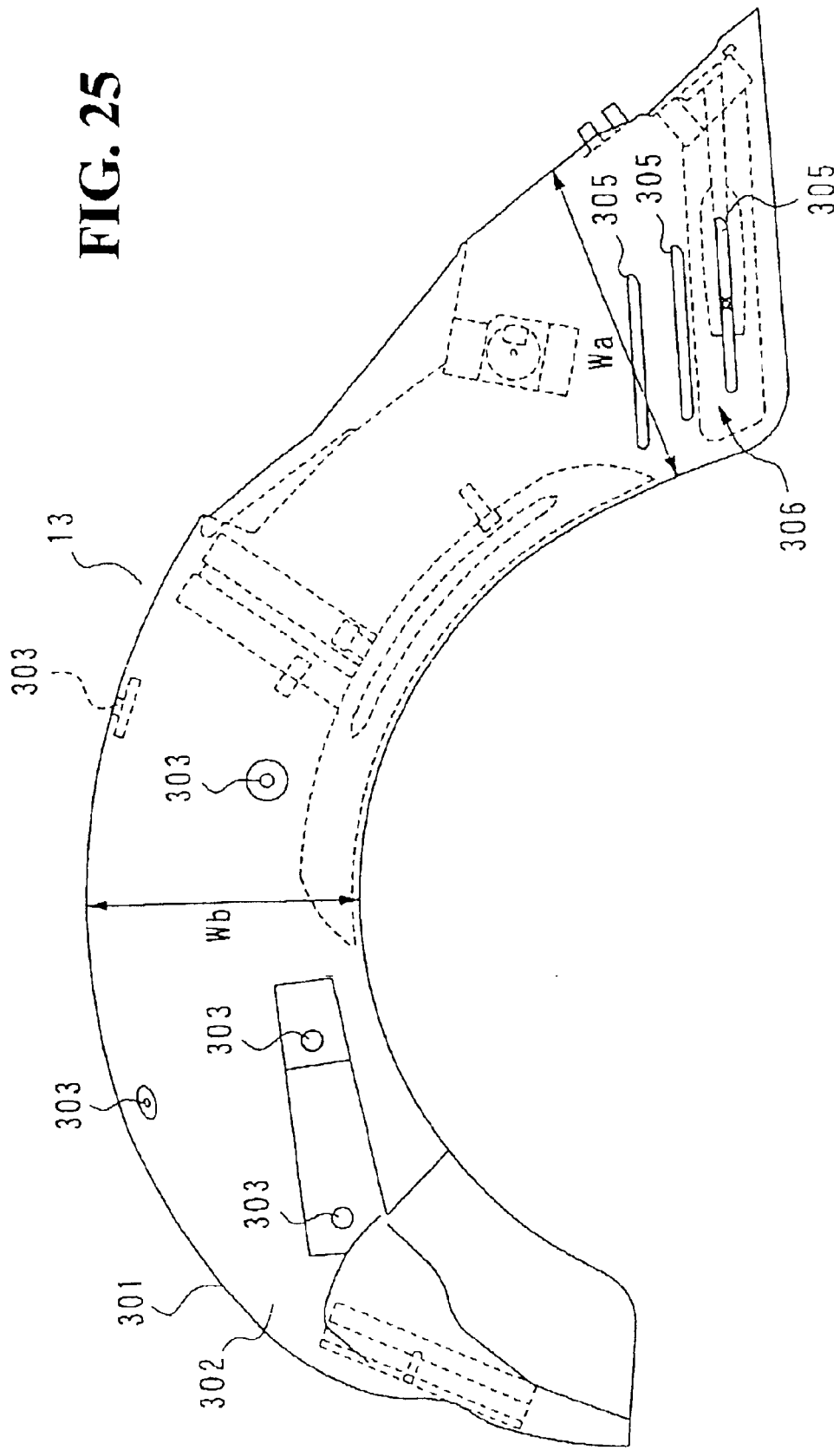
FIG. 25 is a side view of a rear fairing of the motorcycle according to one embodiment of the present invention.

The position of the opening 273 for storing or taking out the documents or the like is determined so that it is exposed toward the outside from the opened portion between the center pipe 27 and the rear pipe 28 when the battery case 261 is assembled to the vehicle body frame 2. The rear fender 13 will now be described hereinafter. As shown in FIG. 25, the rear fender 13 is formed of a thin plate member such as an iron plate by press molding into the U-shape in cross section, and includes an arcuate surface portion 301 to be disposed so as to be laid along the outer peripheral surface of the rear wheel 12 at a suitable distance therefrom. The left and right side surfaces 302 formed into a substantially fan shape extending respectively from the left and right edge of the arcuate surface portion 301 toward the centerline of the rear wheel.

The rear fender 13 is formed with engaging holes 303 as attached portions at required locations on the arcuate surface portion 301 and the left and right side surfaces 302, so that the rear fender 13 can be attached to the vehicle body frame 2 for example by passing a bolt through the engaging hole 303 and tightening it with a nut. The engaging hole 303 is formed substantially at the longitudinally center of the rear fender 13. A wider portion 304 is formed at the rear end portion on the side surface 302 of the rear fender 13 being away from the position at which the engaging hole 303 is formed as the attaching portion. The wider portion 304 has a width Wa, which is wider than the width Wb of the remaining portion of the side surface 302. The wider portion 304 is formed with three rows of recesses 305 at suitable intervals so as to extend longitudinally of the vehicle body. The reinforced portion 306 including these recesses 305 are formed at the inner position, which is the opened edge side, of the side surface 302 of the rear fender with respect to the lateral center thereof.

Figure 26:
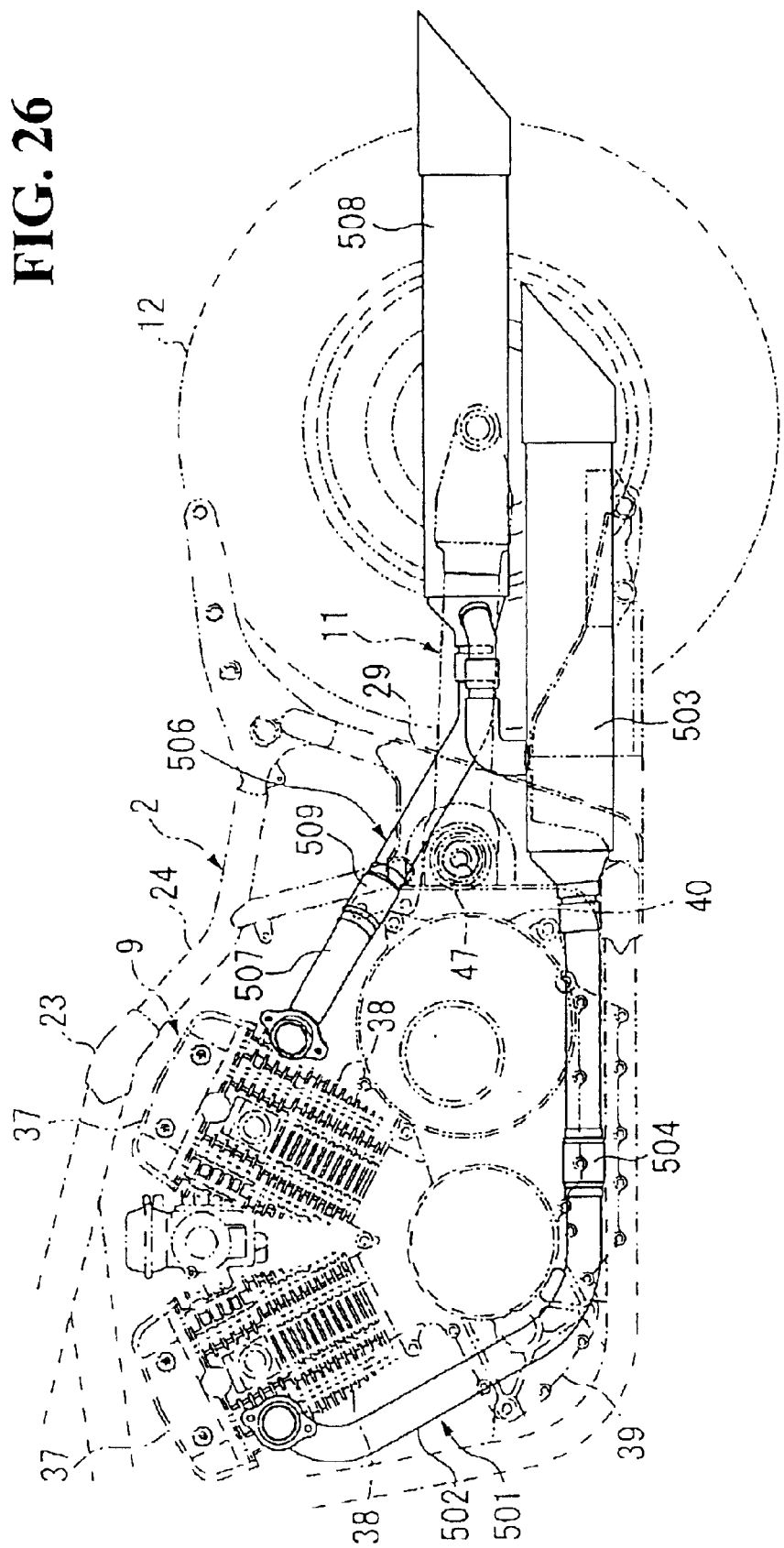
FIG. 26 is a side view of the muffler arrangement structure of the motorcycle according to one embodiment of the present invention.
Figure 27:
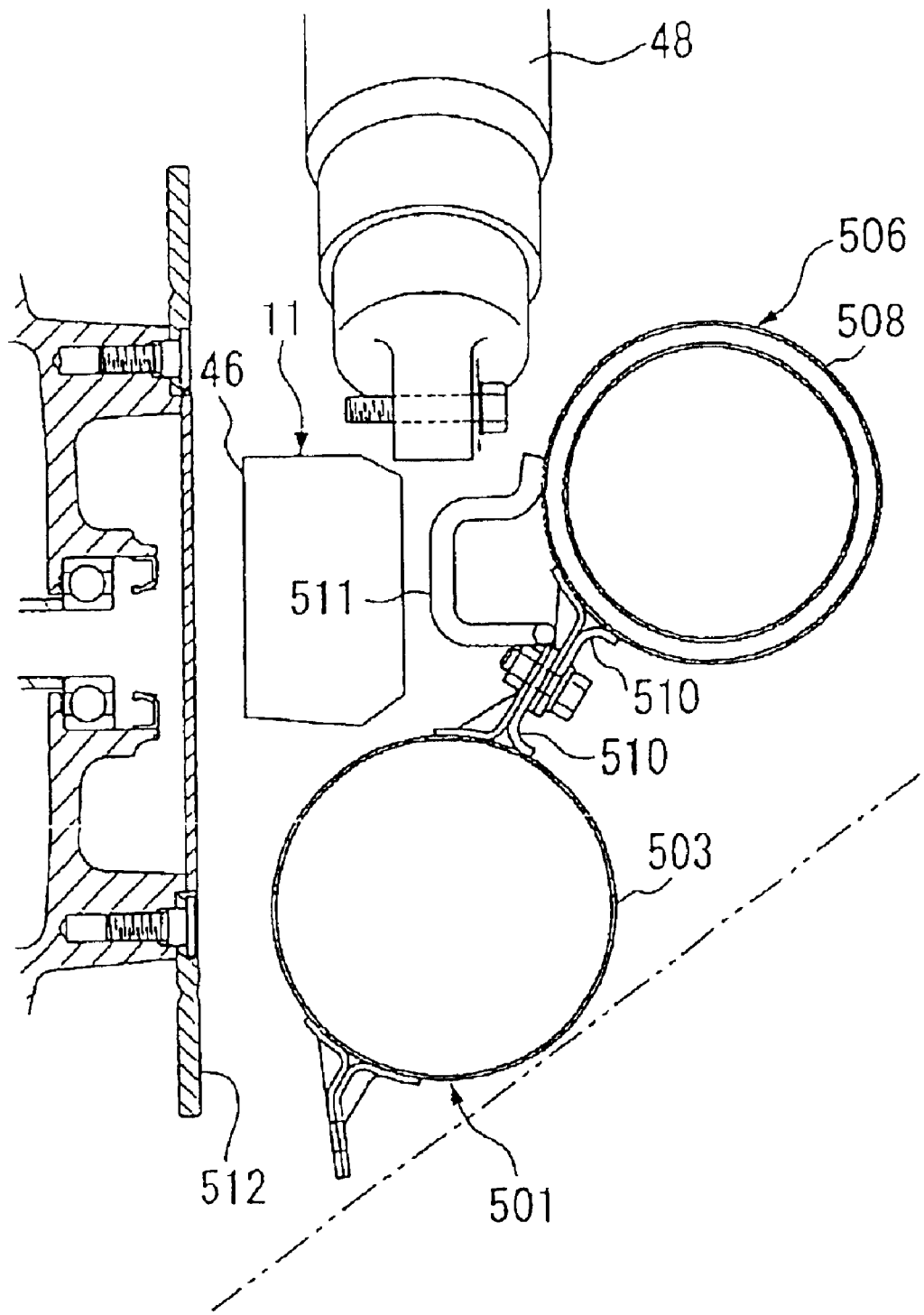
FIG. 27 is a rear view of the muffler arrangement structure of the motorcycle according to one embodiment of the present invention.

These recesses 305 are integrally formed when the rear fender 13 is pressed. As shown in FIG. 26 and FIG. 27, the cylinder head sections 37 of the aforementioned respective cylinder blocks 38 are connected to the mufflers respectively for reducing exhaust sound generated by the engine 9. The muffler 501 to be connected to the cylinder head section 37 of the front cylinder block 38 includes an exhaust pipe unit 502 to be connected to the cylinder head section 37 and a silencer unit 503 having larger diameter than the exhaust pipe unit 502 for reducing sound. The muffler 501 extends downward from the end of the connection between the exhaust pipe unit 502 and the cylinder block 38, then is bent at the position downwardly of the engine 9, and then extends horizontally toward the rear along the lower portion of the crankcase 39 and the transmission 40, and connected to the silencer unit 503 at the position rearwardly of the transmission 40. The silencer unit 503 is disposed on the right side of the vehicle body. The muffler 501 is formed separately from the exhaust pipe unit 502, and is provided with three-dimensional catalyst (not shown) in a catalyst supporting portion 504 that is to be assembled at the midsection of the exhaust pipe unit 502, so that time period that is required until it is activated is reduced and thus catalytic performance at the startup timing is improved.

The muffler 506 connected to the cylinder head section 37 of the rear cylinder block 38 also includes a exhaust pipe unit 507 connected to the cylinder head section 37 and a silencer unit 508 having a larger diameter than the exhaust pipe unit 507 for reducing sound. The muffler 506 extends rearward from the end of connection between the exhaust pipe unit 507 and the cylinder block 38, further extends rearward and obliquely downward along the upper side of the transmission 40 and then horizontally toward the rear. The muffler 506 is connected to the silencer unit 508. The silencer unit 508 is disposed on the right side of the vehicle body, which is the same side as the aforementioned silencer unit 503. The muffler 506 is also formed separately from the exhaust pipe unit 507 and is provided with a three-dimensional catalyst (not shown) in a catalyst supporting portion 509 that is to be assembled with the midsection of the exhaust pipe unit 507. The time period that is required until it is activated is reduced and catalytic performance at the startup timing is improved.

Both of the mufflers 501, 506 have silencer units 503, 508, respectively at a distance in the horizontal direction one over another. The rear end of the lower silencer unit 503 extends horizontally to the position in the vicinity of the axis of the rear wheel 12, and the upper silencer unit 508 extends horizontally to the position further rearward with respect to the silencer unit 503. As shown in FIG. 27, the silencer unit 503 of the lower muffler 501 is disposed vertically below the right fork portion 46 of the rear swing arm unit 11. In other words, the silencer unit 503 is shifted downwardly of the right fork portion 46 of the rear swing arm unit 11 in the vertical direction, and a part of it coincides the right fork portion 46 of the rear swing arm unit 11 in the lateral direction.

The silencer unit 508 of the upper muffler 506 is disposed outside with respect to the lower silencer unit 503 in the lateral direction of the vehicle body, and arranged on the right outside of the fork portion 46 of the rear swing arm unit 11. In other words, the silencer unit 508 coincides partially with the right fork portion 46 of the rear swing arm unit 11 in the vertical direction, and is shifted toward outside with respect to the right fork portion 46 of the rear swing arm unit 11 in the lateral direction The lower silencer unit 503 and the upper silencer unit 508 are fixedly connected with each other by securing the linking members 510 that are fixed to them respectively by with a bolt. The upper silencer unit 508 is provided with a stopper member 511 fixed on the side of the rear swing arm unit 11 thereof. When the upper and lower mufflers 501, 506 are deformed in the lateral direction toward the vehicle body when being toppled, the stopper member 511 abuts against the rear swing arm unit 11 to prevent the upper muffler 506 from being deformed further in the lateral direction toward the vehicle body. This prevents the lower muffler 501 connected to the upper muffler 506 from being deformed further in the lateral direction toward the vehicle body, thereby preventing the silencer unit 503 of the lower muffler 501 from being brought into contact with a disk 512 of a disk brake of the rear wheel 12.

Figure 28:
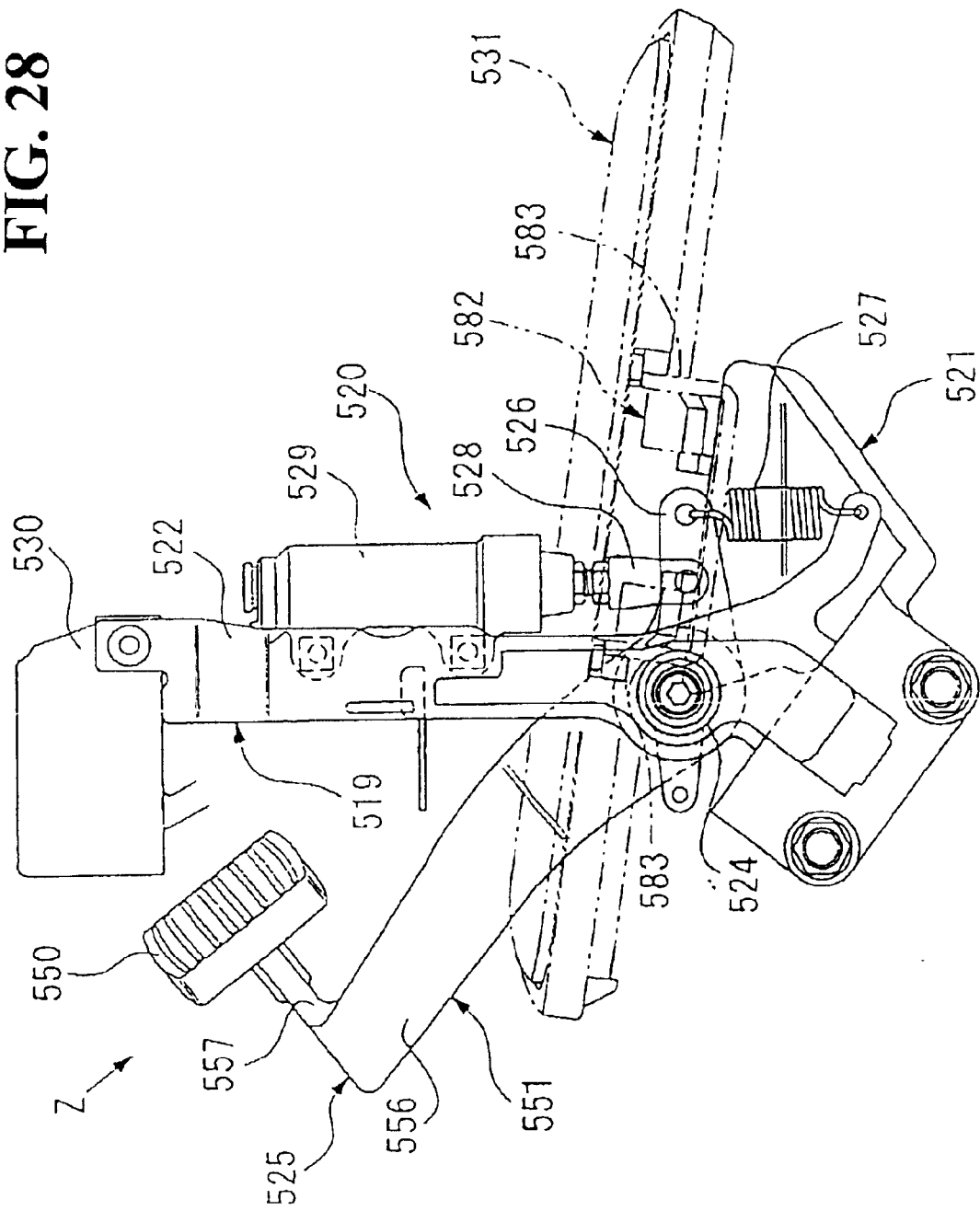
FIG. 28 is a side view of a brake input device of the motorcycle according to one embodiment of the present invention.
Figure 29:
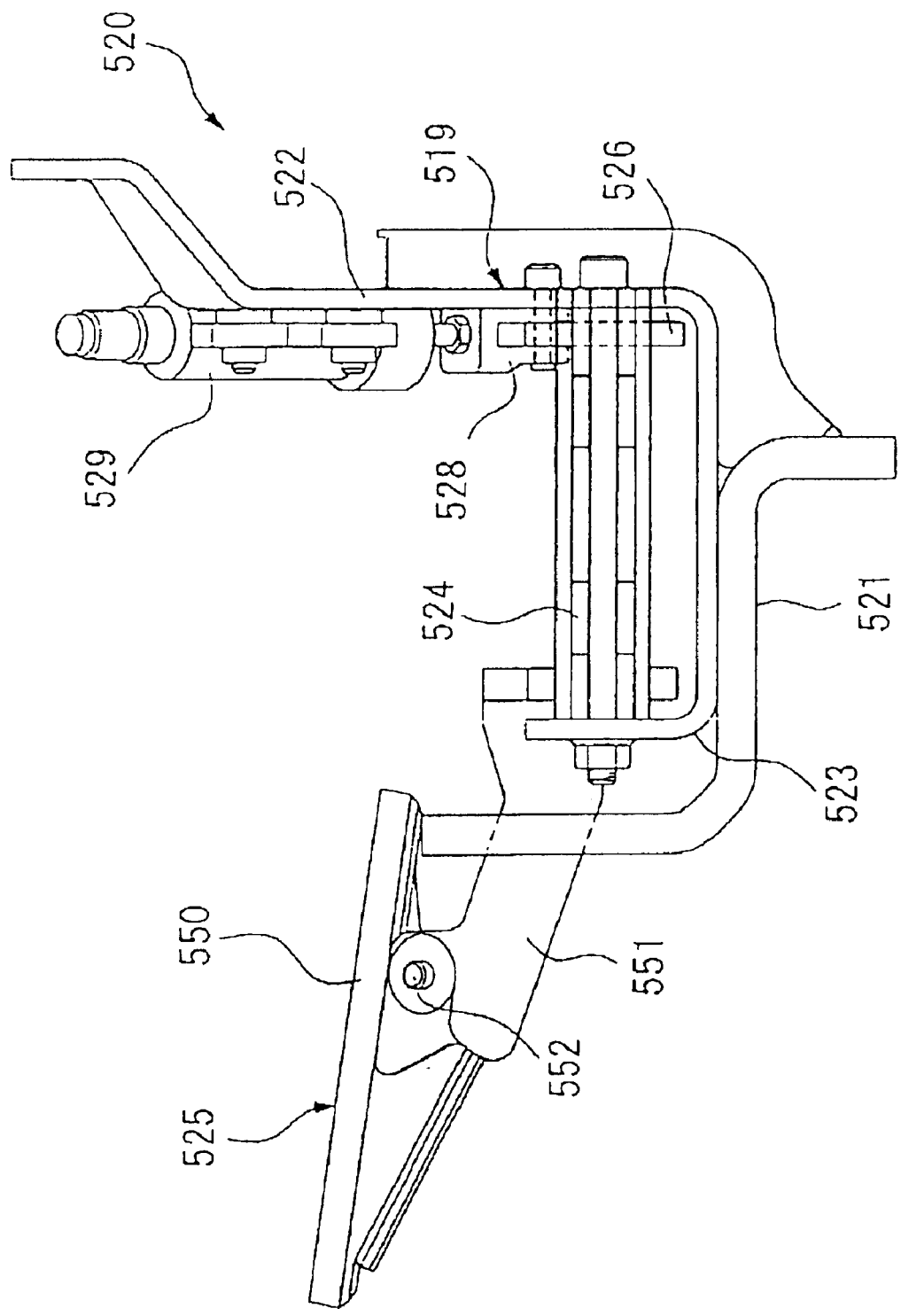
FIG. 29 is a view of the brake input device of the motorcycle according to one embodiment of the present invention when viewed in the direction of the arrow X in FIG. 28.
Figure 30:
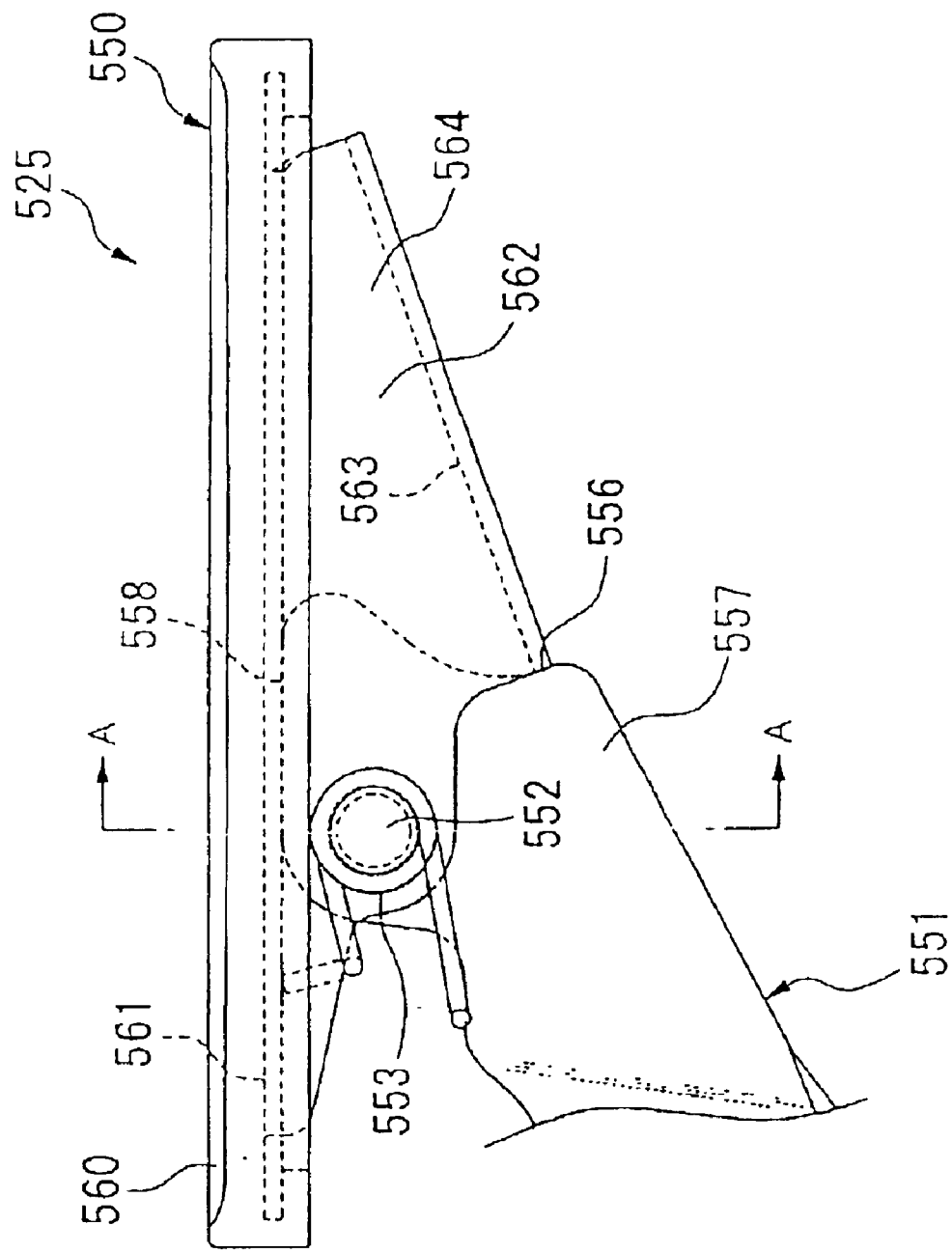
FIG. 30 is a front view of a brake pedal of the motorcycle according to one embodiment of the present invention.
Figure 31:
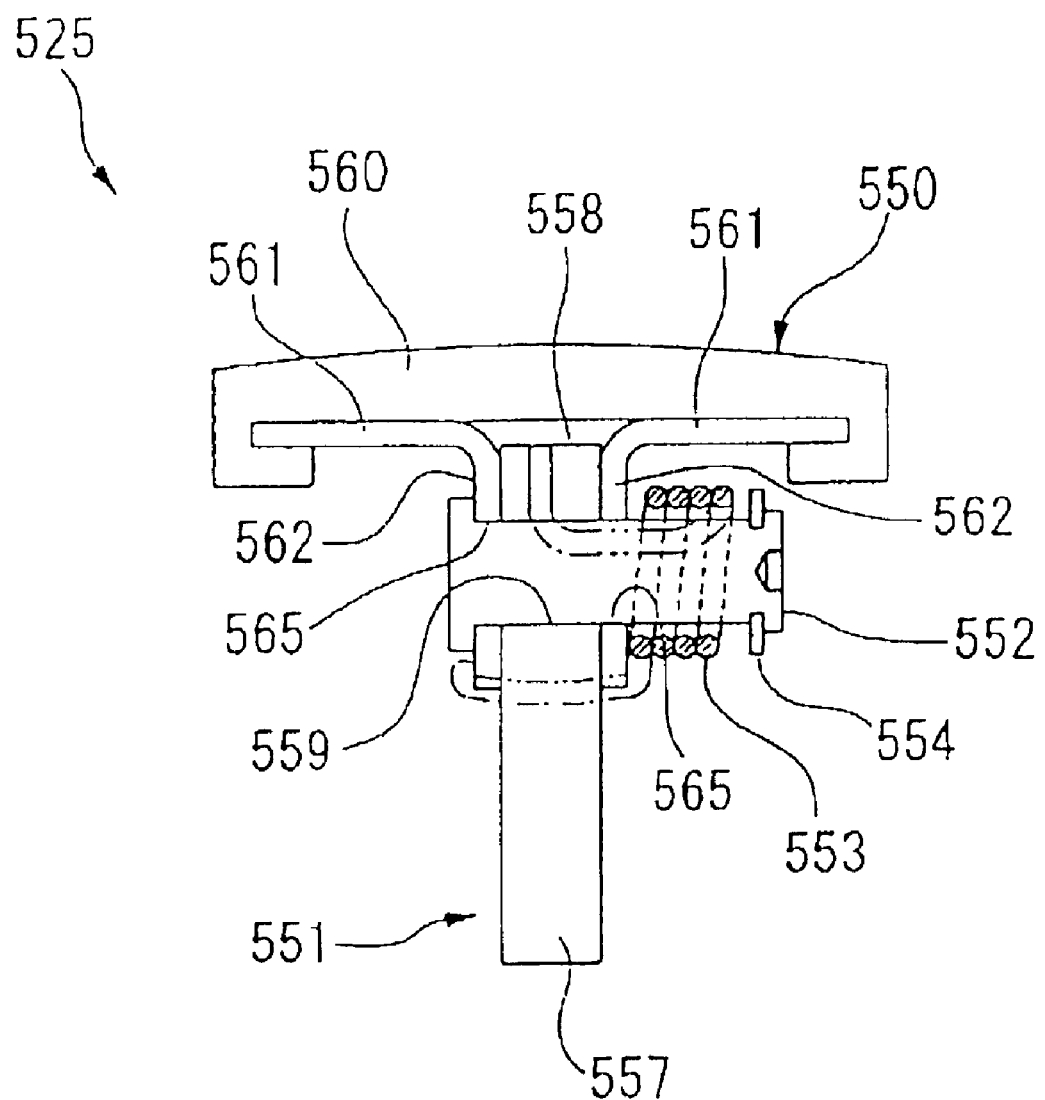
FIG. 31 is a cross sectional view of the brake pedal of the motorcycle according to one embodiment of the present invention taken along the line A—A in FIG. 30.
Figure 32:
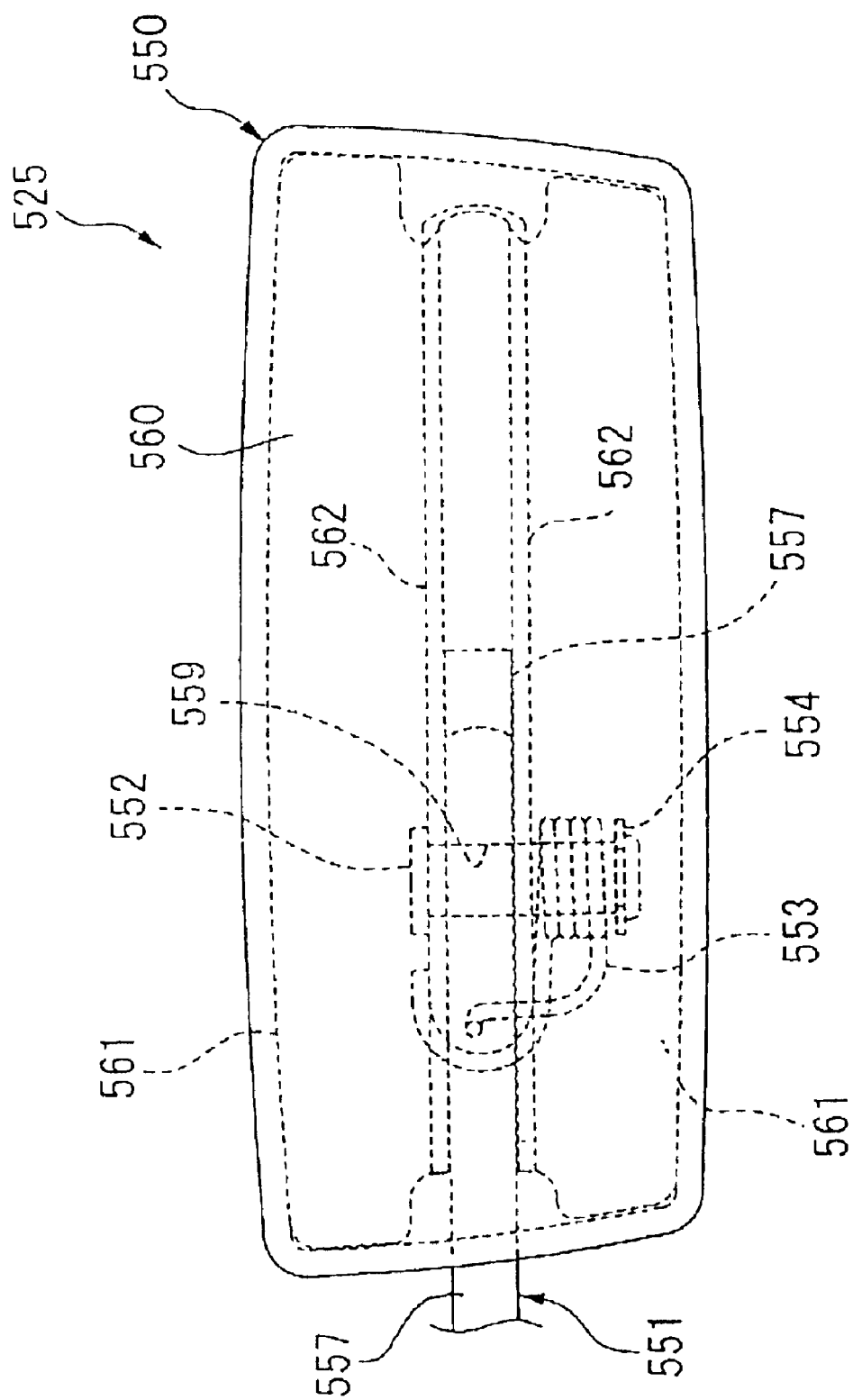
FIG. 32 is a plan view of the brake pedal of the motorcycle according to one embodiment of the present invention.

The right down pipe 33 of the aforementioned vehicle frame 2 is provided with a brake input device 520 shown in FIG. 28 and FIG. 29 at the lower front end thereof. The brake input device 520 includes a step bracket 521 to be fixed to the down pipe 33 with a bolt, and an integral stay 519 to be fixed to the step bracket 521 by welding. The integral stay 519 includes a master cylinder stay portion 522 extending upward, and a brake pivot holder portion 523.

The brake input device 520 includes a brake pivot shaft (supporting shaft) 524 that is rotatably supported by the brake pivot holder portion 523 at both ends in a state of being laid along the same in the lateral direction. A brake pedal 525 is fixed to one end of the brake pivot shaft 524 on the right side of the vehicle body, and a brake arm (operating member) 526 is pivotally connected to the other end of the brake pivot shaft 524 on the side of the vehicle body. The brake pedal 525 is disposed outside the vehicle body on the right side at the position relatively far from the vehicle body.

The brake pedal 525 includes a pedal pad unit 550 to which a foot force from the driver is introduced, a pedal lever unit 551 rotatably supported by the vehicle body side at the proximal end thereof and extending obliquely toward the upper front from the proximal end for pivotally supporting the pedal pad unit 550 at the distal end thereof, and a pin 552 for supporting the pedal pad unit 550 on the pedal lever unit 551.

The brake input device 520 includes a return spring 527 to be interposed between the brake arm 526 and the integral stay 519, a master cylinder (operating portion) 529 to be mounted at the back side of the master cylinder stay portion 522 and connected to the brake arm 526 at the input portion 528 thereof, and a reservoir tank 530 attached to the upper end of the master cylinder stay portion 522 for feeding and discharging brake fluid with respect to the master cylinder 529. The master cylinder 529 in this case is disposed inside the outer end of the down pipe 33 of the vehicle body frame 2 in the lateral direction (the inside the vehicle body), though it is not shown in the figure.

The step bracket 521 supports the step plate (step member) 531 for placing the driver's foot in the state of being disposed in the vicinity of the brake pedal 525. The step bracket 521 is also provided on the left side of the vehicle body where the brake input device 520 is not provided for supporting the step plate 531 for placing the driver's foot by the step bracket 521. In the brake input device 520 described above, when the driver presses the brake pedal 525, the brake pedal 525 is rotated integrally with the brake pivot shaft 524 connected to one end thereof, and thus the brake arm 526 connected to the other end of the brake pivot shaft 524 away from the brake pedal 525 is rotated integrally. As a result, the brake arm 526 presses the input portion 528 of the master cylinder 529 upward and allows the master cylinder 529 to generate a braking fluid pressure.

The brake pedal 525 described above includes, as shown in FIG. 28 to FIG. 32, a pedal pad unit 550 to which a foot force from the driver is introduced, a pedal lever unit 551 rotatably supported by the vehicle body side at the proximal end thereof and extending obliquely toward the upper front from the proximal end for pivotally supporting the pedal pad unit 550 at the distal end thereof, and a pin 552 for supporting the pedal pad unit 550 on the pedal lever unit 551, a spring 553 for allowing the pin 552 to be inserted inward and urging the pedal pad unit 550 to one side of a pivotal movement, and a washer 554 for preventing the pin 552 from coming off.

The pedal lever unit 551 includes an extending portion 556 that is rotatably supported by the vehicle body side as a result that the proximal end thereof is fixed to the end of the laterally oriented brake pivot shaft 524, which is the outer side with respect to the vehicle body. The extending portion 556 has a plate shape and connected to the brake pivot shaft 524 at the proximal end thereof with the direction of thickness oriented in the lateral direction in a state of extending obliquely from the proximal end toward the upper front.

The pedal lever unit 551 includes a supporting member 557 provided at the distal end on the extended side of the extending portion 556 in the direction intersecting the extending portion 556 for pivotally supporting the pedal pad unit 550. The supporting member 557 has a plate shape and extends from the distal end of the extending portion 556 rightward and then projects upward from the distal end thereof with the direction of thickness oriented in the longitudinal direction of the extending portion 556. The extending portion 556 and the supporting member 557 are formed integrally, e.g., specifically are formed by bending a plate shaped member.

The supporting member 557 is formed with a hole 559 extending through the thickness thereof at the projected portion 558 projected upward from the distal end thereof. The pedal pad unit 550 includes a pair of flat depressing surface forming portions 561 to be covered by covers 560, for example, of rubber on the front faces on which the driver depresses, a pair of mounting portions 562 extending from the depressing surface forming portion 561 in the direction opposite from the cover 560 for being pivotally mounted at the supporting member 557 in the state of being disposed on both sides of the supporting member 557 of the pedal lever unit 551, and a connecting portion 563 for connecting a pair of mounting portions 562 with each other on the opposite side thereof from the depressing surface forming portion 561.

A pair of depressing surface forming portions 561 are rectangular in shape, and extend in the opposite directions on the same plane from the opposite edges of the respective mounting portions 562 from the connecting portion 563. The pair of depressing surface forming portions 561 are oriented so that the elongated sides are laid along the extending direction. The pair of mounting portions 562 has inclined portions 564 such that the extending amount from the depressing surface forming portion 561 decreases along the length of the depressing surface forming portion 561 toward one end thereof, and the connecting portion 563 is formed only on the inclined portion 564. A hole 565 passing through both of the mounting portions 562 at the portion where the connecting portion 563 is not formed.

The pair of depressing surface forming portions 561 and the pair of mounting portions 562 and a connecting portion 563 are formed integrally, and more specifically, they are formed by bending a plate shaped member. Then, the pedal pad unit 550 is supported by the pedal lever unit 551 by inserting the pin 552 into the hole 565 on the mounting portion 562 and the hole on the supporting member 557, providing a spring 553 so as to dispose the pin 552 inside, and engaging a washer 554 with the pin 552 in a state in which the pair of mounting portions 562 of the pedal pad unit 550 are disposed on both sides of the supporting member 557 of the pedal lever unit 551.

One of the margins of pivotal motion of the pedal pad unit 550 with respect to the pedal lever unit 551 is determined by abutment of the connecting portion 563 of the pedal pad unit 550 against the abutting portion 566 of the supporting member 557 of the pedal lever unit 551 opposite from the extending portion 556, and in addition to it, the pedal pad unit 550 is urged into the direction to bring the connecting portion 563 into abutment against the abutting portion 566 by an urging force of the spring 553. In other words, the pedal pad unit 550 is in the normal state when it is in the marginal position of the pivotal motion, and in this normal state, the pedal pad unit 550 is laid along the lateral direction of the vehicle body. When a certain force is exerted on the pedal pad unit 550 from underneath thereof, the pedal pad unit 550 rotates in such a manner that the right end is moved upward.

Figure 33:
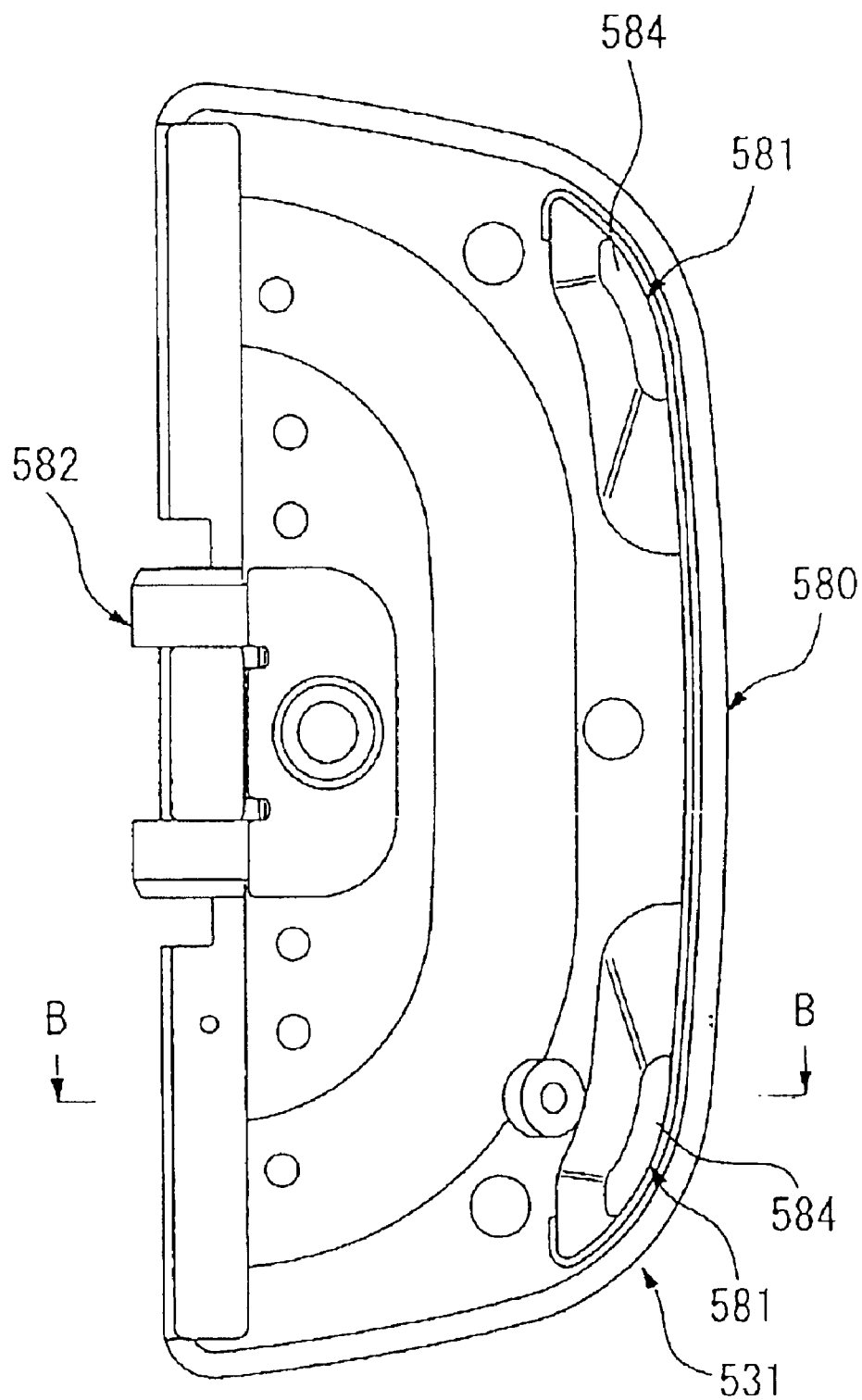
FIG. 33 is a bottom view of a step plate of the motorcycle according to one embodiment of the present invention.
Figure 34:
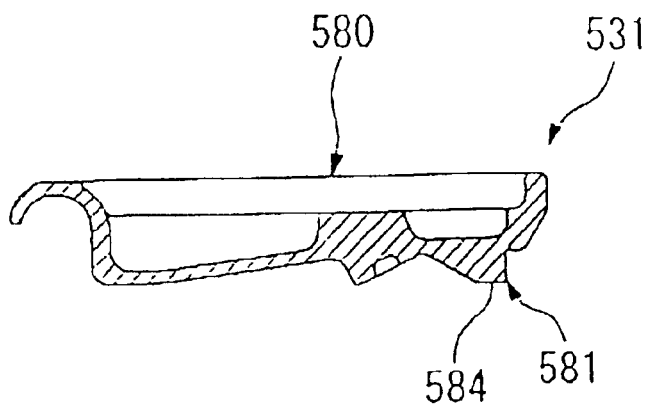
FIG. 34 is a cross sectional view of the step plate of the motorcycle according to one embodiment of the present invention taken along the line B—B in FIG. 33.

As shown in FIG. 33 and FIG. 34, the aforementioned step plate (step member) 531 is for placing the driver's foot, and includes a platform 580 on which the driver places his/her foot, and a back sensor 581 that projects downward from the platform 580 and comes into contact with the ground when the vehicle body is inclined. The platform 580 is substantially flat plate shape with curved corners at both ends of one of the edges in parallel with the length thereof and a mounting portion 582 on the other edge in parallel with the length thereof for being rotatably supported by the step bracket 521. In other words, as shown in FIG. 28, the step bracket 521 is formed with a pair of supporting portions 583 disposed forward and backward in substantially vertically, so that the mounting portion 582 of the step plate 531 is rotatably mounted on supporting portions 583 thereof. The step plate 531 in the state of being mounted on the step bracket 521 is disposed in such a manner that the longitudinal side lies longitudinally of the vehicle body, and projects from the vehicle body toward laterally outside thereof, and from this state, it is capable of pivotal movement in the direction in which the projected extremity is positioned upward.

The platform 580 is formed with bank sensors 581 on the lower side and the opposite side from the mounting portion 582 at the forward and backward positions thereof along the longitudinal direction of the vehicle body so as to project downward from the platform 580 respectively. The respective back sensors 581 are elongated in the direction longitudinally of the vehicle body, slightly curved along the corners of the platform 580, and are mirror symmetry with respect to each other. The back sensor 581 has a substantially flat ground plane 584 on the lower face, which comes into contact with ground when the vehicle body is inclined.

In such step plate 531, the platform 580 and the bank sensors 581 located at two positions are formed integrally with each other. In other words, the step plate 531 is a die cast article of aluminum alloy for example, and thus the platform 580 and the bank sensors 581 at the two locations are formed integrally at the time of die casting. The constructions of the supporting portion 583 of the left and the right step brackets 521 in the vehicle body are the same, and thus the left and the right step brackets 521 have the step plates 531 of the same configuration mounted thereon.

Figure 35:
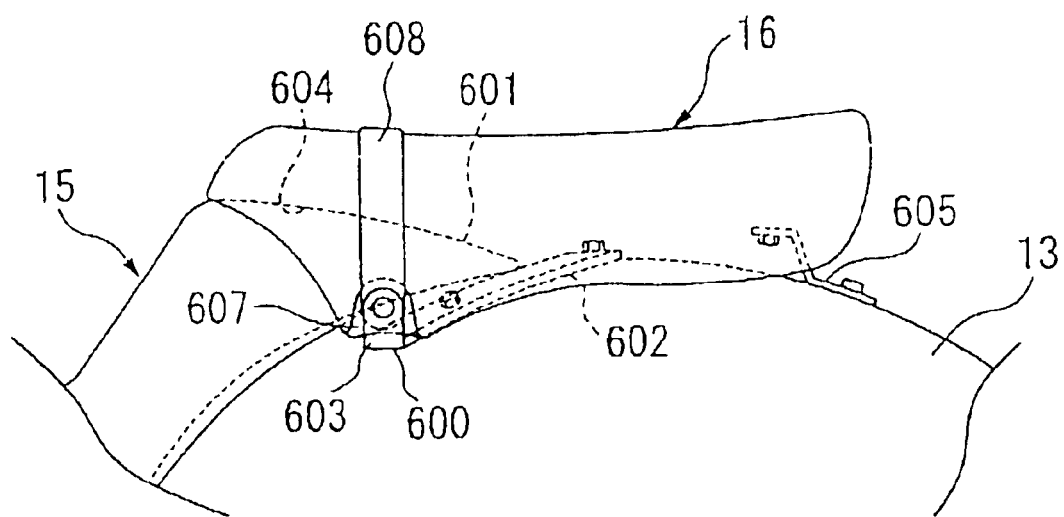
FIG. 35 is a side view of a seat mounting structure of the motorcycle according to one embodiment of the present invention.
Figure 36:
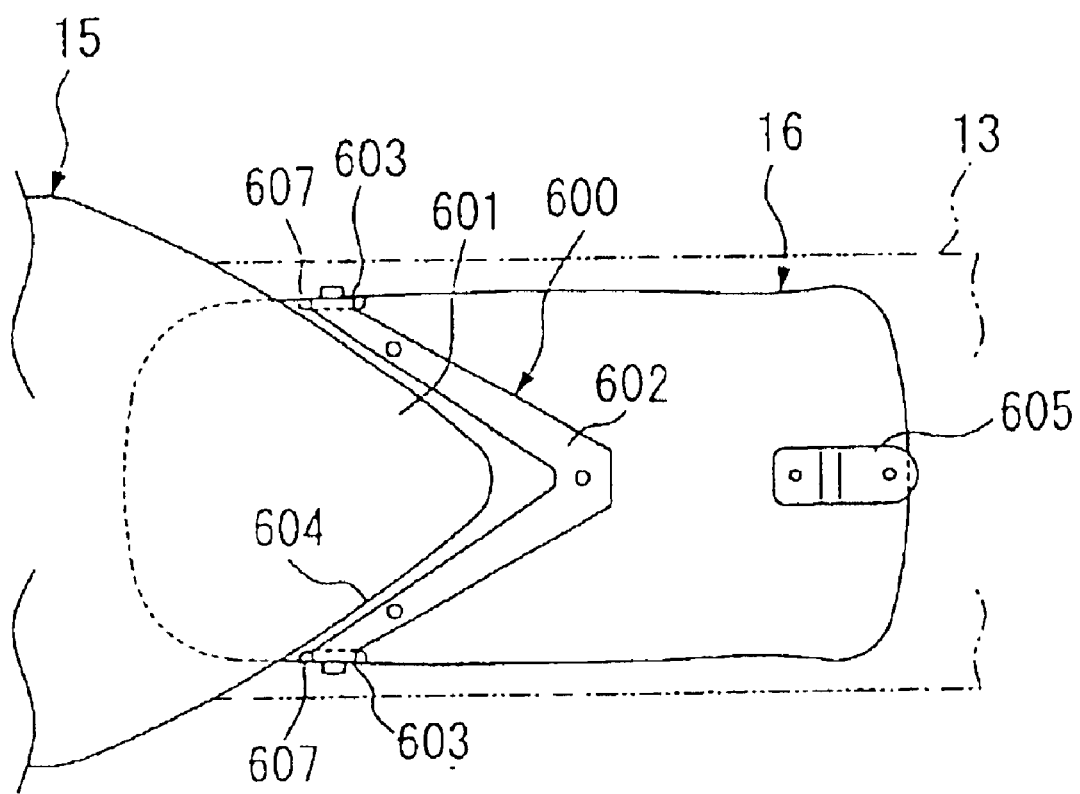
FIG. 36 is a bottom view of the seat mounting structure of the motorcycle according to one embodiment of the present invention.

The pillion seat 16 disposed further rearward of the main seat 15 is placed on the aforementioned rear fender 13 on the rear side thereof. As shown in FIG. 35 and FIG. 36, The seat mounting structure in which the front portion of the pillion seat 16 is mounted on the rear fender 13 is such that a mounting stay 600 is mounted on the rear fender 13 so that the mounting stay 600 supports the left and right sides of the pillion seat 16.

The main seat 15 has a configuration having a pointed projection 601 in V-shape in plan view and in side view at the rear thereof (so-called gun fighter type), and the front portion is placed on the vehicle body frame 2 and the rear portion is placed on the rear fender 13. In this state, the main seat 15 is bolted to the vehicle body frame 2 in the vicinity of the fuel tank 14 on the front side and bolted to the stay or the like that is attached on the vehicle body frame 2 on the rear side, though it is not shown in the figure.

The mounting stay 600 for mounting the pillion seat 16 includes a midsection 602 of V-shape in plan view so as to fit the configuration of the projection 601 of the main seat 15 in plan view, and includes also supporting portions 603 that curve in the same direction respectively from both ends of the midsection 602. The mounting stay 600 is bolted on the rear fender 13 at the midsection 602 thereof in a state in which the midsection 602 is fitted on the outer side of the projection 601 of the main seat 15, that is, in a state in which the supporting portion 603 is disposed forwardly of the midsection 602. In this case, the both supporting portions 603 of the mounting stay 600 project upward in the vertical direction from the rear fender 13 with its thickness oriented in the lateral direction of the vehicle body, and simultaneously coincide with the projection 601 of the main seat 15 in the for-and-aft direction.

The pillion seat 16 is formed with a recess 604 on the front portion thereof so as to be capable of covering the pointed projection 601 of the main seat 15 fixed on the rear fender 13, and is provided with a rear mounting stay 605 on the lower surface of the rear portion thereof. The pillion seat 16 further includes mounting portions 607 on the left and right sides of the front portion thereof. While the pillion seat 16 is attached on the left and right supporting portions 603 of the mounting stay 600 via the left and right of the mounting portion 607 respectively with screws in the state of being placed on the rear fender 3 with the projection 601 of the main seat 15 fitted into the recess 604, the rear portion thereof is attached on the rear fender 13 by means of the rear mounting stay 605. When the left and right mounting portions 607 of the pillion seat 16 are attached to the left and right supporting portions 603 of the mounting stay 600, the both ends of the seat belt 608 that is to be tighten around the surface of the pillion seat 16 are also fixed to the supporting portions 603 together. In other words, the mounting stay 600 also supports the seat belt 608. Though the front portion of the pillion seat 16 formed with a recess 604 is thinner due to formation of recess 604, since it is overlaid on the projection 601 of the main seat 15, the substantial thickness is the sum of these thicknesses.

Figure 37:
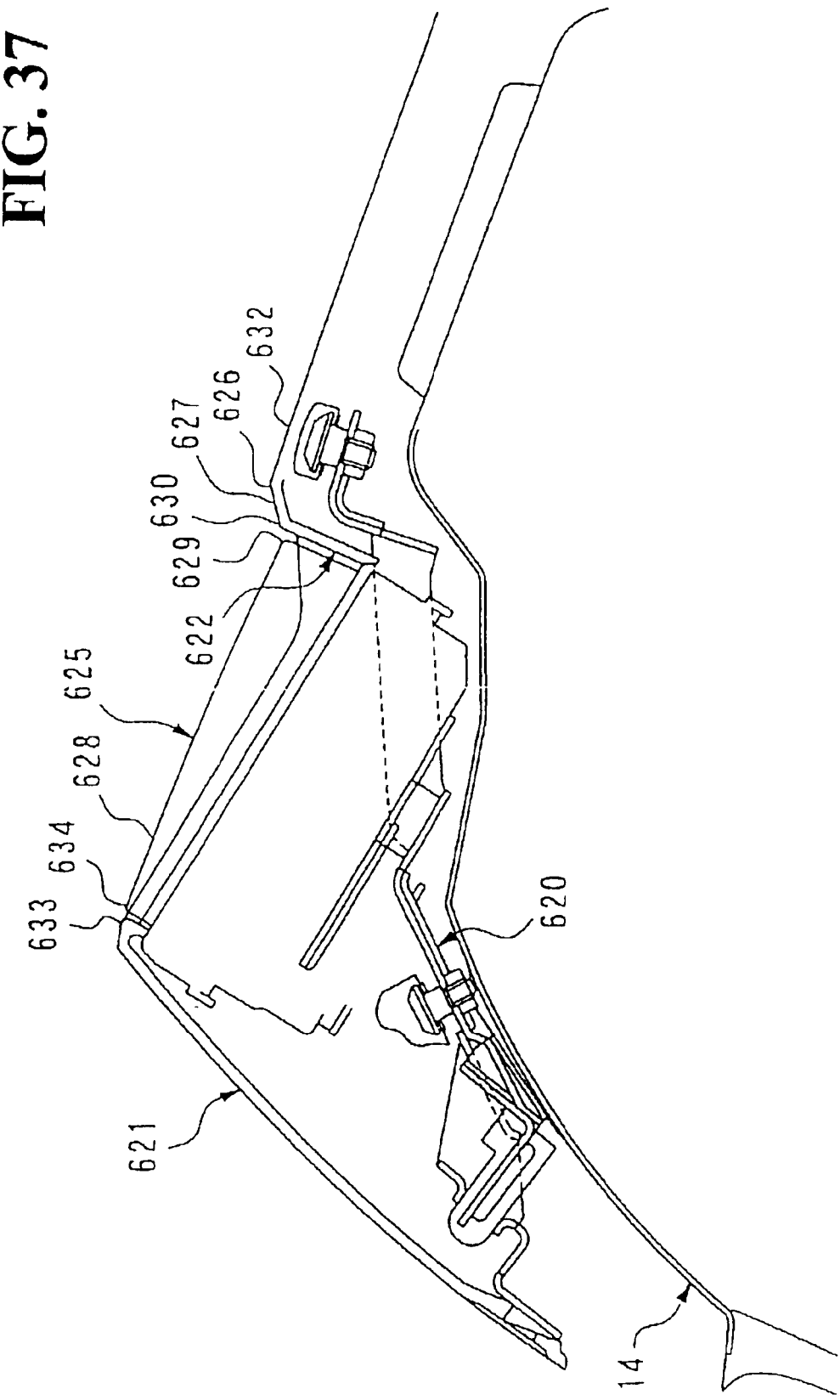
FIG. 37 is a side, cross sectional view of a meter cover of the motorcycle according to one embodiment of the present invention.
Figure 38:
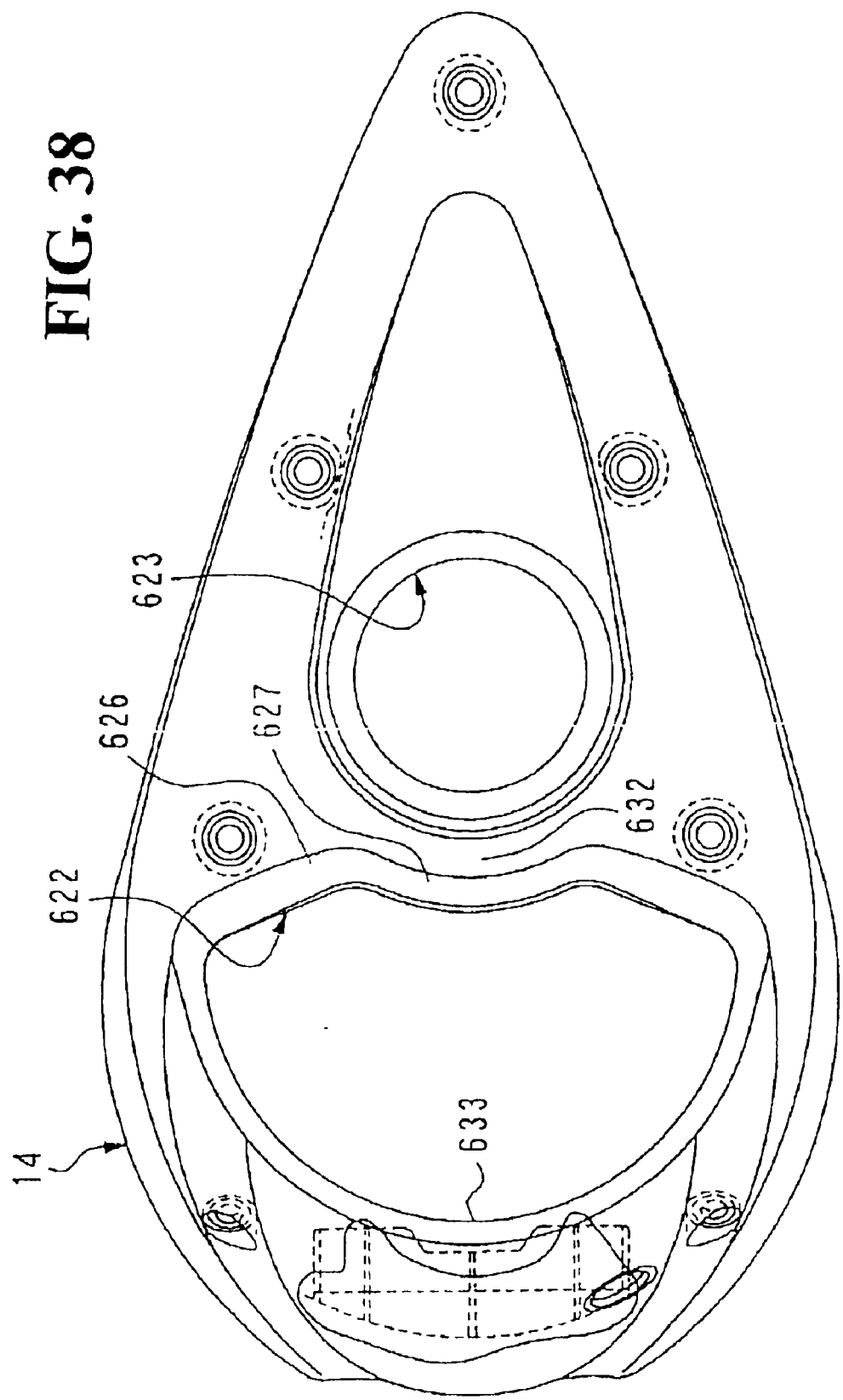
FIG. 38 is a plan view of the meter cover of the motorcycle according to one embodiment of the present invention.

As shown in FIG. 37, the aforementioned fuel tank 14 is attached with a supporting member 620 on the upper side, and a meter cover 621 formed with a plated layer on the surface thereof is attached via the supporting member 620 or the like. The meter cover 621 is, as shown in FIG. 38, provided with openings 622, 623 aligned in the longitudinal direction. The rear opening 623 is circular and the front opening 622 is fan shape but a small fan shape is removed from the center side. These openings 622, 623 are for accommodating meters (in FIG. 37, only a meter 625 that is to be disposed in the front opening 622 is shown).

The front opening 622 of the meter cover 621 is formed along a rear edge 626 with a chamfered portion 627 being linear in cross section (taken along the vertical plane along the longitudinal direction) that is inclined downward toward the front. In addition, the height of the rear edge portion 629 of the upper surface 628 of the meter 625 to be disposed in this opening 622 is determined not to be higher than the lower end 630 of the chamfered portion 627.

The front edge 633 of the opening 622 is disposed on the forward extension of the upper surface 632 continuing into the rear portion of the chamfered portion 627 of the meter cover 621. Further, the front side of the edge 634 of the upper surface 628 of the meter 625 is substantially flush with the front edge 633 of the opening 622. Accordingly, the angle of the upper surface 628 of the meter 625 with respect to the chamfered portion 627 of the meter cover 621 is different from that with respect to the upper surface 632 continuing into the rear portion of the chamfered portion 627, and more specifically, the upper surface 632 continuing into the rear portion of the chamfered portion 627 is inclined at a prescribed angle so that the front side comes higher, the chamfered portion 627 is inclined at a prescribed angle so that the front side comes lower, and the upper surface 628 of the meter 625 is inclined at a prescribed angle larger than the upper surface 632 continuing into the rear portion of the chamfered portion 627 so that the front side comes higher.

Figure 39:
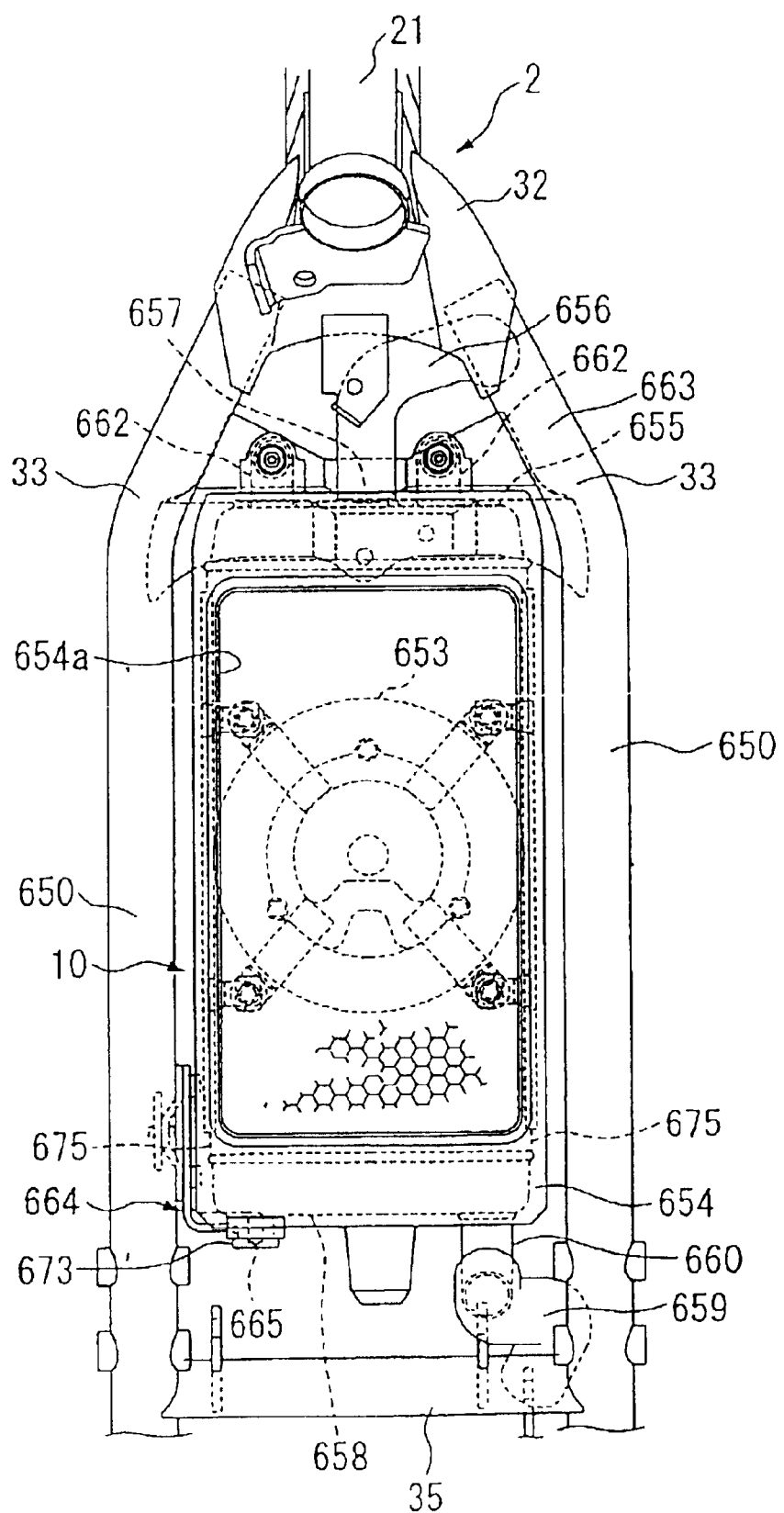
FIG. 39 is a front view of a radiator support structure of the motorcycle according to one embodiment of the present invention.
Figure 40:
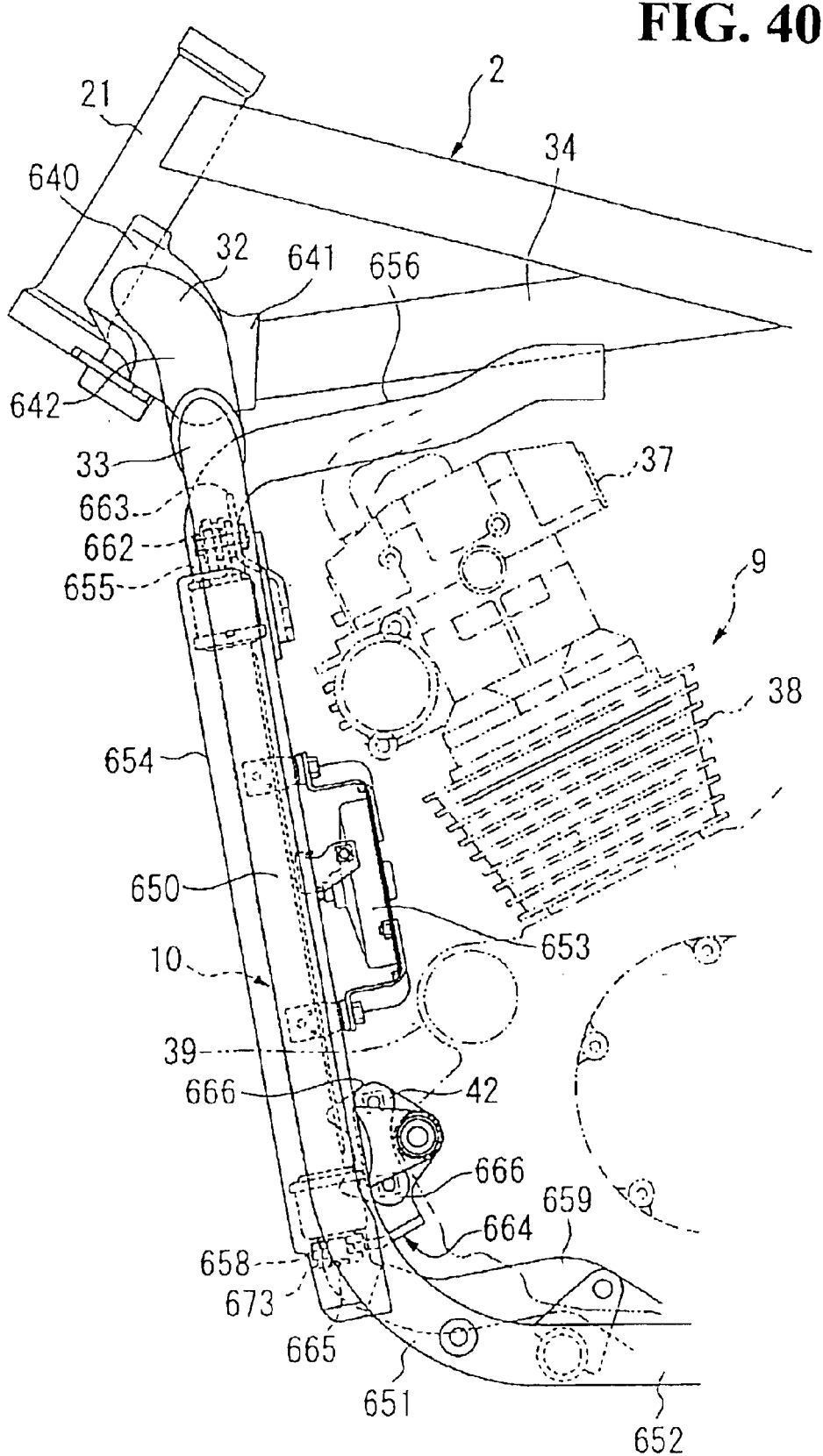
FIG. 40 is a side view of the radiator support structure of the motorcycle according to one embodiment of the present invention.
Figure 41:
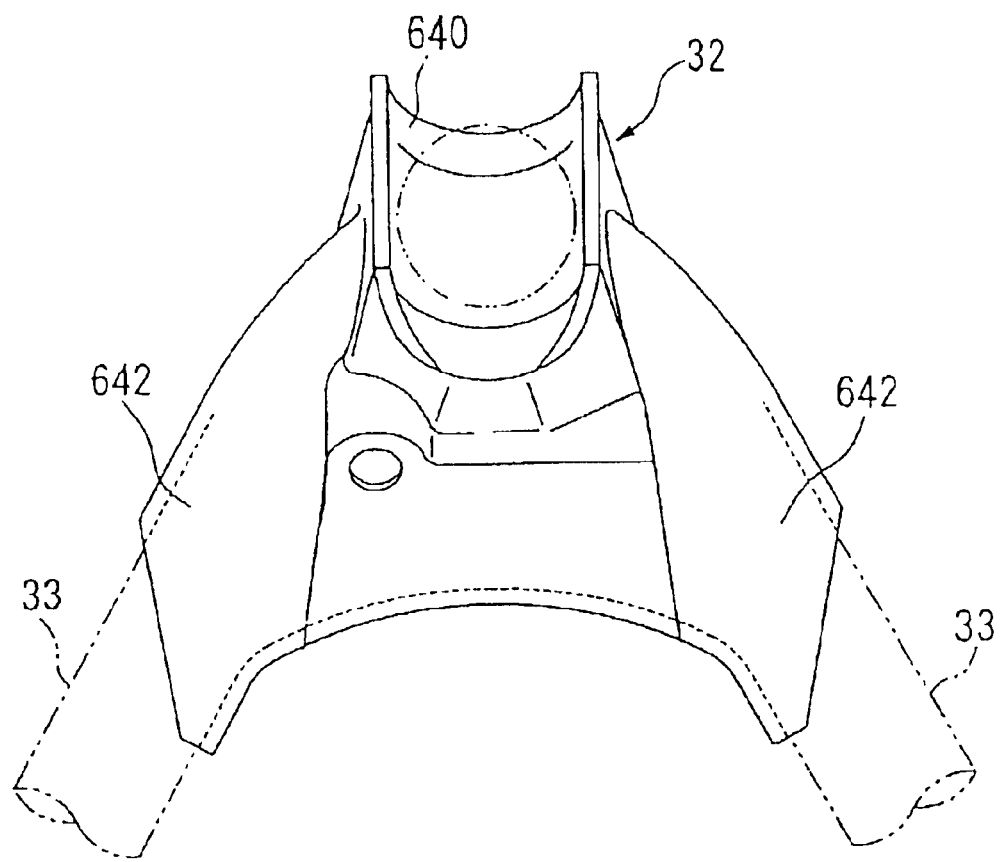
FIG. 41 is a view of a gusset of the motorcycle according to one embodiment of the present invention.

The gusset 32 to be welded to the head pipe 21 of the vehicle body frame 2 supporting the front fork 3 is, as shown in FIG. 39–FIG. 41, provided on one side with a mounting portion 640 in such a shape that a cylinder is cut along the line parallel with the axis thereof, and a rear fitting portion 641 in a square cylindrical shape extending in the opposite direction from the mounting portion 640, and a pair of cylindrical lower fitting portions 642 extending from between the mounting portion 640 and the fitting portion 641 so as to be mirror symmetrical with respect to each other. The gusset 32 is an integrally molded article formed of a white malleable cast iron that can be configured relatively freely by the use of a core cylinder, and that can be provided with a sufficient welding strength by decarburization.

The gusset 32 is secured to the head pipe 21 by joining with the head pipe 21 at its mounting portion 640, and welding along the whole periphery of the mounting portion 640. The gusset 32 is also secured to the sub pipe 34 by fitting the square cylindrical sub pipe 34 on the inner side of the square cylindrical rear fitting portion 641 and by welding the same along the whole periphery thereof. Further, the both down pipes 33 are fixed by fitting the cylindrical down pipes 33 respectively into the cylindrical lower fitting portions 642 of the gusset 32 and welding along the entire periphery thereof. The sub pipe 34 and the down pipe 33 can be welded without alignment by forming the gusset 32 of white malleable cast iron and by inserting the sub pipe 34 and the down pipe 33 therein and joining them by welding as described above. In addition, while the gusset 32 is interposed between the fuel tank 14 and the front fork 3 and thus is disposed at the position which is highly visible in appearance, the sub pipe 34 and the down pipe 33 are integrally configured and thus the appearance is also improved.

The pair of left and right down pipes 33 extending from the head pipe 21 of the vehicle body frame 2 supporting the front fork 3 and being bifurcated via the gusset 32 each includes a downward extension 650 extending downward from the head pipe 21, a bent portion 651 bent from the lower portion of the downward extension 650 rearward, and a rearward extension 652 extending rearward from the lower portion of the bent portion 651, and the radiator 10 is supported between the pair of left and right downward extensions 650 in the stored state.

The radiator 10 is substantially rectangular shape and is supported by the downward extension 650 in such a manner that the elongated side is laid along the downward extension 650 of the down pipe 33, and the whole length coincides longitudinally with the downward extension 650. A fan 653 is provided on the rear side of the radiator 10, or on the side of the engine 9, and a separate cover 654 having an opening 654a is attached on the front side of the radiator 10. An intake port 657 to which a cooling water pipe 656 for flowing cooling water is to be connected is provided at the lateral center of the upper surface 655 of the radiator 10 so as to project upward, and a discharge port 660 to which a cooling water pipe 659 for flowing cooling water is connected is provided at the lateral one side of the lower surface 658 of the radiator 10 so as to project downwardly. In this case, cooling water before cooling is introduced from the side of the engine 9 via the cooling water pipe 656 to the inlet port 657, and from the discharge port 660, cooling water after cooling is discharged via the cooling water pipe 659 toward the side of the engine 9.

The upper surface 655 on the upper part of the radiator 10 that faces upward is provided with a pair of left and right upper part supporting portions 662 so as to project upward. The upper side of the radiator 10 is provided with the upper part mounting member 663 that is to be supported by the downward extensions 650 so as to connect the left and right downward extensions 650 with each other. The pair of left and right upper part supporting portions 662 of the radiator 10 is secured together by bolt to the upper part mounting member 663. Accordingly, the radiator 10 is secured to the downward extensions 650 at the upper part thereof.

The lower surface 658 of lower part of the radiator 10 that faces downward is formed with a lower part supporting portion 665 at one lateral side of the vehicle body, or more specifically, on the right side so as to project downward, and the lower part supporting portion 665 is supported by the engine hanger (supporting member) 664 for supporting the engine 9 on the bracket 42 of the down pipe 33.

Figure 42:
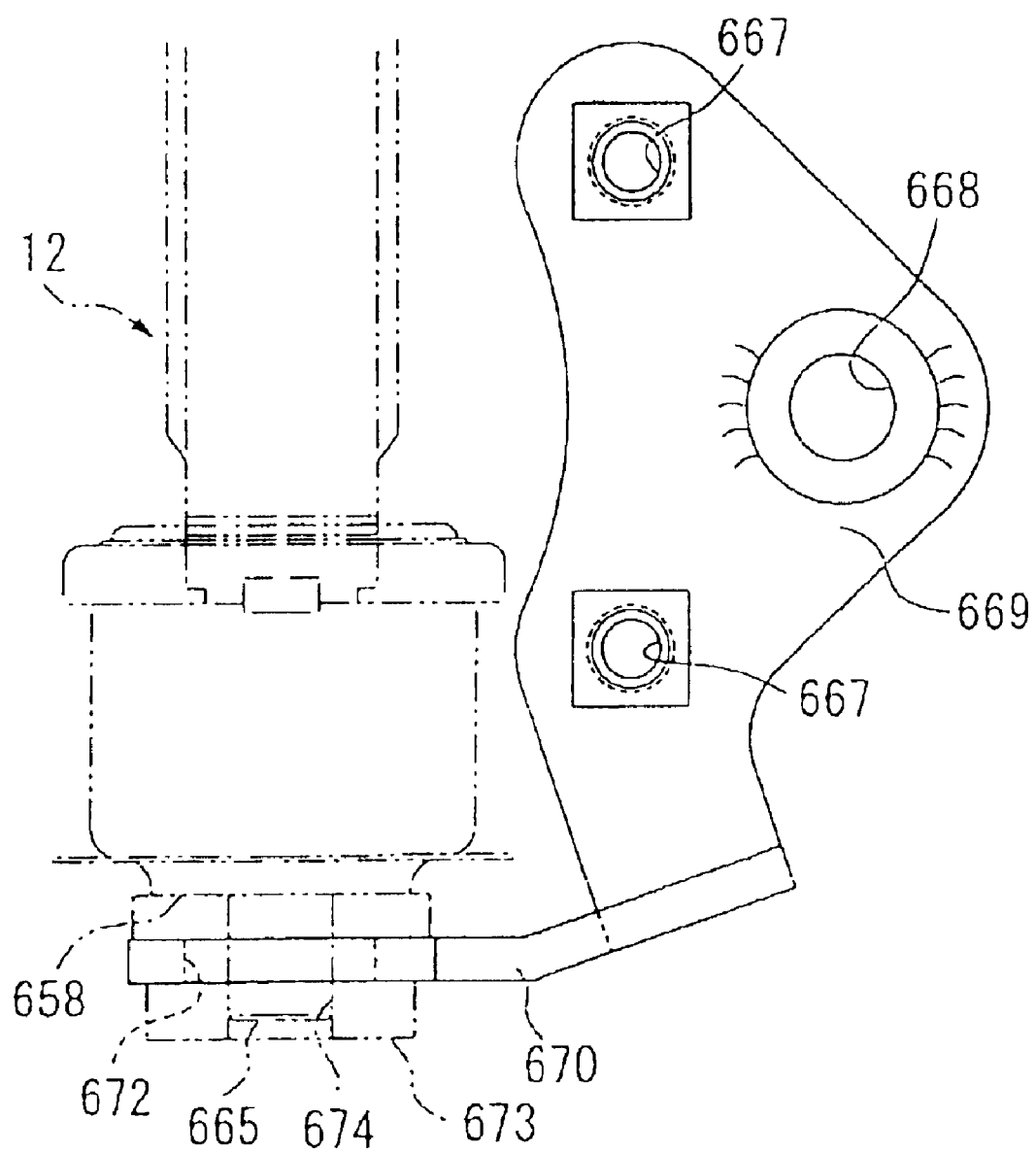
FIG. 42 is a side view of the engine hanger of the motorcycle according to one embodiment of the present invention.

In other words, the engine hanger 664 for supporting the engine 9 on the down pipe 33 is configured as shown in FIG. 42, and is provided with a mounting hole 667 to be bolted on the upper and lower fixing portions 666 of the bracket 42 fixed on the rear side of the downward extension 650 shown in FIG. 40 by welding, a main plate portion 669 disposed rearwardly of the mounting hole 667 in the state of being fixed on the bracket 42 of the down pipe 33 via these mounting holes 667, and formed with a supporting hole 668 to be bolted to the front end portion of the crankcase 39 of the engine 9, and a supporting plate portion 670 extending from the main plate portion 669 forward for supporting the radiator 10.

The supporting plate portion 670 is formed with a supporting hole 672 on the front end side thereof. The supporting hole 672 is attached with a grommet 673, and the lower part supporting portion 665 of the radiator 10 is inserted into the fitting hole 674 inside of the grommet 673. Accordingly, the lower portion of the radiator 10 is supported by the downward extension 650.

As described above, radiator 10 is in the supported state in which the radiator 10 is supported between the left and right downward extensions 650 with the elongated side is laid along the downward extension 650 and the whole length thereof coincides with the downward extension 650 in the fore-and-aft direction in a state in which both of the upper part supporting portions 662 is bolted on the upper part mounting member 663 supported on the both of the downward extensions 650, and the lower part supporting portion 665 is inserted into the grommet 673 of the engine hanger 664 mounted on the down pipe 33 on the right side of the vehicle body. The radiator 10 itself is supported by the down pipe 33 only via the upper part supporting portion 662 and the lower part supporting portion 665.

Therefore, in the supported state as described above, no separate supporting member is provided between the left and right side surface 675 of the radiator 10 and both of the downward extensions 650 of the down pipe 33 for connecting them. In other word, the main plate portion 669 of the engine hanger 664 is positioned rearwardly of the downward extension 650 as a whole in a state of being bolted on the fixing member 666 of the down pipe 33, and thus the engine hanger 664 will never be positioned between the radiator 10 and the downward extension 650.

Figure 43:
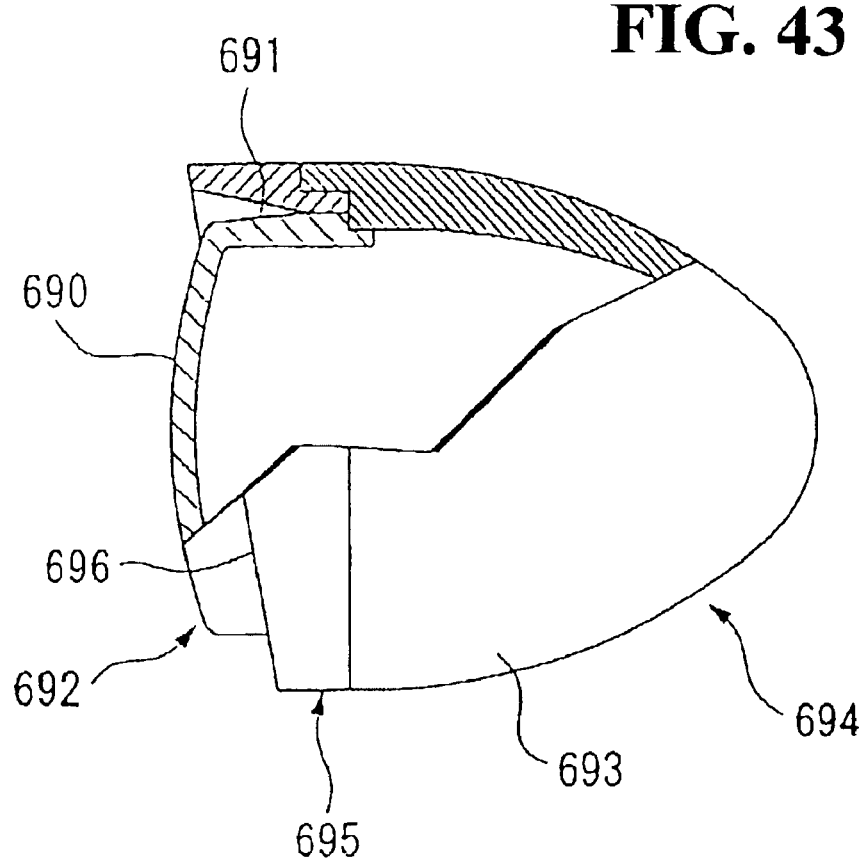
FIG. 43 is a side cross sectional view of a light emitting device of the motorcycle according to one embodiment of the present invention.
Figure 44:
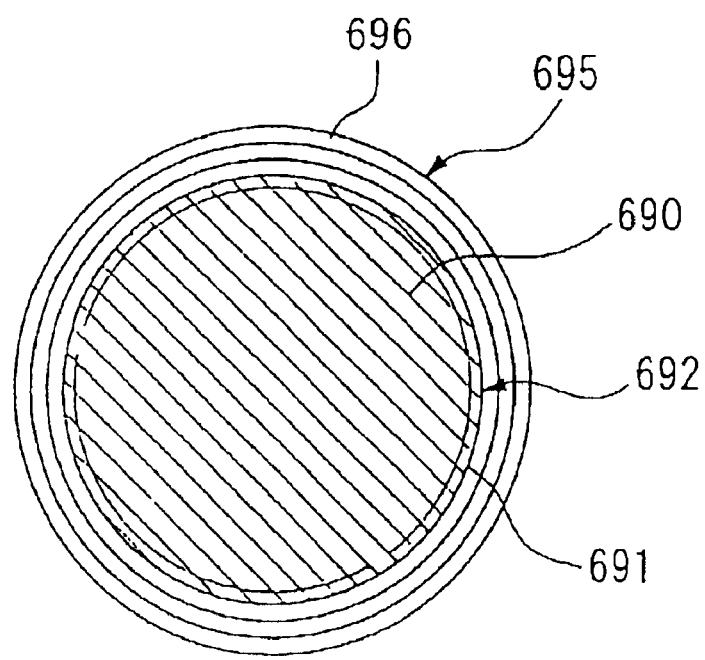
FIG. 44 is a front view of the light emitting device of the motorcycle according to one embodiment of the present invention.
Figure 45:
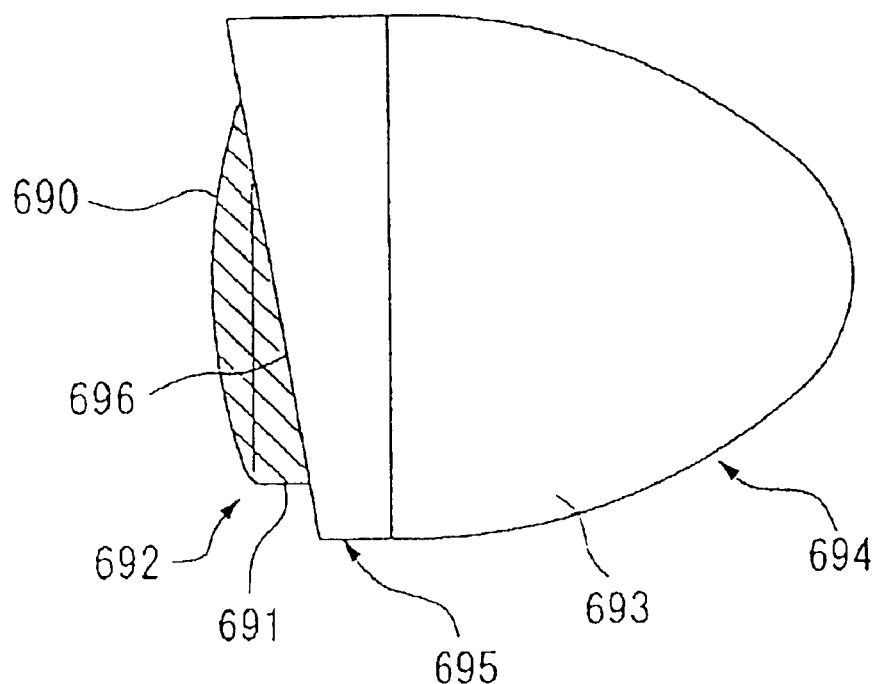
FIG. 45 is a side view of the light emitting device of the motorcycle according to one embodiment of the present invention.

The aforementioned front blinker (light emitting device) 5 and the rear blinker (light emitting device) 17 may be constructed as follows. The front blinker (light emitting device) 5 and the rear blinker (light emitting device) 17 each includes, as shown in FIG. 43 to FIG. 45, a lens 692 formed of transparent synthetic resin including a translucent substantially disk shaped light emitting front section 690 and a translucent substantially cylindrical light emitting side surface section 691, a light emitting device body 694 including a non-transparent housing 693 on which the lens 692 is attached on the side of the light emitting side surface section 691 opposite from the light emitting front section 690 and being provided with a light emitting member, not shown, such as a bulb or the like inside thereof, and a separate non-transparent cover 695 for covering only a part of the light emitting side surface section 691 of the lens 692 on the light emitting device body 694. The translucent light emitting front section 690 and the light emitting side surface section 691 emits a light toward outside by emission of light by the light emitting member provided inside thereof. The term "front" of the light emitting front section 690 means the main light emitting direction, and thus it is forward of the vehicle body in the case of the front blinker 5, and it is rearward of the vehicle body, in the case of the rear blinker 17.

The cover 695 has an inclined front edge 696 so that the extent of exposure of the light emitting side surface section 691 in side view is larger on the lower side. In other words, it is inclined in such a manner that the upper side of the light emitting side surface section 691 is covered by a larger area. The cover 695 is fixed to the housing 693 with the lens 692. For example, a plated layer in the same color is formed on the surface of the cover 695 and on the surface of the housing 693.

Figure 46:
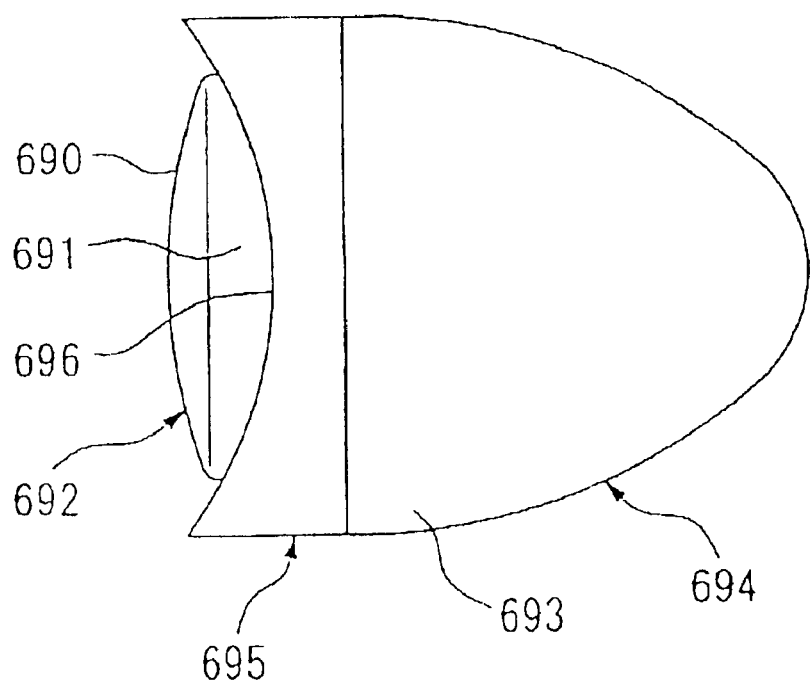
FIG. 46 is a side view of another example of the light emitting device of the motorcycle according to one embodiment of the present invention.

As shown in FIG. 46, the cover 695 may be formed so that the front edge 696 is configured into the shape of a circular arc in side view that the extent of exposure in side view of the light emitting side surface section 691 of the lens 692 is largest at the vertical center. Therefore, according to the arrangement structure of the engine auxiliary equipment in a motorcycle in the above described construction, the center cover 221 is disposed so as to be laid across the pair of left and right pipe members 24, 27 of the vehicle body frame 2, and the ignition coil 229 and the fuel pump 231 as engine auxiliary equipment are supported by the center cover 221. Therefore, it is not necessary to provide a special stay for mounting the engine auxiliary equipment such as the fuel pump 231 or the like. In this manner, the number of components may be reduced by the number corresponding to the number of members required for mounting the special stay.

Even for the layout of other members such as a battery case 261 or the like, it is not necessary to assemble the engine auxiliary equipment on the battery case 261 or the like. Therefore, since provision of the space for arranging the battery case 261 itself is sufficient, the possibility of free layout of the battery case 261 or the like increases. In addition, it is not necessary to provide the vehicle body frame 2 with the specific portion on which the engine auxiliary equipment is to be mounted, thereby increasing the possibility of free design of the vehicle body frame 2.

In addition, since the pair of left and right pipe members 24, 27 of the vehicle body frame 2 are connected by the center cover 221, strength of the vehicle body frame 2 can be enhanced by the center cover 221, which is an exterior member. Furthermore, since the center cover 221 is disposed rearwardly of the engine 9, the center cover 221 prevents hot air from the engine 9 from being flown into the fuel pump 231 or the battery case 261 disposed rearwardly thereof and thus the engine auxiliary equipment and the like are advantageously protected from heat of engine.

The center cover 221 and the ignition switch 233 are supported by the engine hanger 220 for supporting the engine 9, and thus the engine hanger 220 functions to support the center cover 220 and the ignition switch 223 as well as to support the engine 9. Therefore, it is not necessary to provide a special stay for mounting the center cover or a special stay for mounting the ignition switch on the vehicle body frame 2. Accordingly, the number of components can be reduced by the number corresponding to the number of members required for mounting the special stay.

In addition, it is not necessary to provide the vehicle body frame with the specific portion on which the engine hanger 220 is to be mounted, or with the specific portion on which the ignition switch is to be mounted, whereby the possibility of free design of vehicle body frame 2 increases, and the vehicle body frame 2 can be simplified, thereby facilitating the process thereof.

The aforementioned embodiment is illustrative and thus it may be modified as necessary without departing from the scope of the present invention. For example, though the fuel pump 231 and the ignition coil 229 are described as examples of the engine auxiliary equipment to be supported by the center cover 221 in the aforementioned embodiment, it is not limited thereto, and other engine auxiliary equipment such as an air cleaner case, a battery, or the like may be supported by the center cover.

Though the fuel pump 231 is supported by the center cover 221 in the horizontal posture in the aforementioned embodiment, it is not limited thereto, and the fuel pump 231 may be supported in the vertical posture. Though a motorcycle is described as an example in the aforementioned embodiment, the present invention is not limited to motorcycles, and may also be applied to three-wheeled motor vehicles, or buggy-type four-wheeled motor vehicles.

As is described in detail above, according to the arrangement structure of the engine auxiliary equipment in vehicles such as a motorcycle as set forth above, the engine auxiliary equipment is supported by the center cover laid across the pair of the left and right pipe members of the vehicle body frame. Therefore, it is not necessary to provide a special stay for mounting the engine auxiliary equipment, and thus the number of components may be reduced by the number corresponding to the number of members required for mounting the special stay. Even for the layout of other members such as a battery case or the like, it is not necessary to assemble the engine auxiliary equipment on the battery case or the like. Therefore, since provision of the space for arranging the battery case itself is sufficient, the possibility of free layout of the battery case or the like increases. In addition, it is not necessary to provide the vehicle body frame with the specific portion on which the engine auxiliary equipment is to be mounted, thereby increasing the possibility of free design of the vehicle body frame.

In addition, since the left and right pipe members of the vehicle body frame are connected by the center cover, strength of the vehicle body frame can be enhanced by the center cover, which is an exterior member. According to the arrangement structure of the engine auxiliary equipment in vehicles such as a motorcycle as set forth above, the fuel pump or the ignition coil can be disposed in the vicinity of the engine, and thus the length of a fuel pipe and electrical wiring extended therefrom can be shortened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, said vehicle body frame including the pair of right and left pipe members; and a center cover being disposed across said pair of left and right members and forming a support structure for supporting at least one piece of auxiliary equipment for said engine, wherein the at least one piece of auxiliary equipment includes a fuel pump.

2. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, aid vehicle body frame including the pair of right and left pipe members; and a center cover being disposed across said pair of left and right members and forming a support structure for supporting at least one piece of auxiliary equipment for said engine, wherein the at least one piece of auxiliary equipment includes an ignition coil.

3. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, wherein said vehicle body frame is a motorcycle frame and includes the pair of right and left pipe members; and a center cover being disposed across said pair of left and right members and forming a support structure for supporting at least one piece of auxiliary equipment for said engine, wherein the at least one piece of auxiliary equipment includes a fuel pump.

4. The vehicle according to claim 3, wherein the at least one piece of auxiliary equipment includes an ignition coil.

5. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, said vehicle body frame including the pair of right and left pipe members; and a center cover being disposed across said pair of left and right members and forming a support structure for supporting at least one piece of auxiliary equipment for said engine, wherein the at least one piece of auxiliary equipment includes at least one of an ignition coil, a fuel pump, an air cleaner case, and a battery supported by the center cover.

6. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, wherein said vehicle body frame is a motorcycle frame and includes the pair right and left pipe members; and a center cover being disposed across said pair of left and right members and forming a support structure for supporting at least one piece of auxiliary equipment for said engine, wherein the at least one piece of auxiliary equipment includes at least one of an ignition coil, a fuel pump, an air cleaner case, and a battery supported by the center cover.

7. The vehicle according to claim 6, further comprising:

a bracket being mounted on a cross pipe of the vehicle frame, said bracket being attached with an engine hanger for supporting the engine and crossing over the pair of left and right pipe members of the vehicle body frame.

8. The vehicle according to claim 7, wherein the center cover is supported and mounted on the left and right pipe members via the engine hanger.

9. The vehicle according to claim 7, said center cover having a plate shaped portion formed into a substantially square shape, and an upright portion provided on left and right sides of the plate shaped portion so as to extend rearward with respect to the vehicle body frame.

10. The vehicle according to claim 9, wherein the center cover is formed of at least one of a resin, a metal, and an alloy.

11. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, said vehicle body frame including the pair of right and left pipe members; and a center cover being disposed across said pair of left and right members and forming a support structure for supporting at least one piece of auxiliary equipment for said engine, further comprising:

a bracket being mounted on a cross pipe of the vehicle frame, said bracket being attached with an engine hanger for supporting the engine and crossing over the pair of left and right pipe members of the vehicle body frame.

12. The vehicle according to claim 11, wherein the center cover is supported and mounted on the left and right pipe members via the engine hanger.

13. A vehicle comprising:

a pair of left and right pipe members;

a main seat being disposed above the pair of left and right pipe members;

a fuel tank being disposed forward of the main seat;

an engine being disposed below the fuel tank;

a vehicle body frame, said vehicle body frame including the pair of right and left pipe members; and a center cover being disposed across said pair of left and right members and forming a support structure for supporting at least one piece of auxiliary equipment for said engine, said center cover having a plate shaped portion formed into a substantially square shape, and an upright portion provided on left and right sides of the plate shaped portion so as to extend rearward with respect to the vehicle body frame.

14. A vehicle body frame comprising:

a cross pipe having an engine hanger;

a pair of left and right pipe members;

a main seat being disposed above the pair of left and right pipe members;

a fuel tank being disposed forward of the main seat;

a center cover being disposed across said pair of left and right members and forming a support structure for supporting at least one piece of auxiliary equipment for an engine; and a bracket being mounted on the cross pipe of the vehicle frame, said bracket being attached with the engine hanger for supporting the engine and crossing over the pair of left and right pipe members of the vehicle body frame, wherein the center cover is supported and mounted on the left and right center pipes via the engine hanger.

15. The vehicle according to claim 14, said center cover having a plate shaped portion formed into a substantially square shape, and an upright portion provided on left and right sides of the plate shaped portion so as to extend rearward with respect to the vehicle body frame.

16. The vehicle body frame according to claim 14, wherein said vehicle body frame is a motorcycle frame.

17. The vehicle body frame according to claim 14, wherein the at least one piece of auxiliary equipment includes at least one of an ignition coil, a fuel pump, an air cleaner case, and a battery supported by the center cover.

* * * * *